United States Patent [19]
Takemori

[11] Patent Number: 5,889,599
[45] Date of Patent: Mar. 30, 1999

[54] HOLOGRAPHY IMAGING APPARATUS HOLOGRAPHY DISPLAY APPARATUS HOLOGRAPHY IMAGING METHOD AND HOLOGRAPHY DISPLAY METHOD

[75] Inventor: Tamiki Takemori, Hamamtsu, Japan

[73] Assignee: Hamamatsu Photonics K.K., Hamamatsu, Japan

[21] Appl. No.: 807,920

[22] Filed: Feb. 28, 1997

[30] Foreign Application Priority Data

| | | | |
|---|---|---|---|
| Feb. 29, 1996 | [JP] | Japan | 8-043420 |
| Mar. 25, 1996 | [JP] | Japan | 8-068729 |
| Mar. 25, 1996 | [JP] | Japan | 8-068737 |

[51] Int. Cl.$^6$ .............................. G03H 1/04; G03H 1/26
[52] U.S. Cl. ............................................. 359/30; 359/33
[58] Field of Search ................................. 359/30, 32, 33, 359/1, 29, 565

[56] References Cited

U.S. PATENT DOCUMENTS

| | | | |
|---|---|---|---|
| 3,862,357 | 1/1975 | Kanazawa et al. | 178/6.8 |
| 3,941,450 | 3/1976 | Spitz et al. | 359/30 |
| 4,082,415 | 4/1978 | Brooks et al. | 359/30 |
| 4,256,362 | 3/1981 | Bardos | 350/3.86 |
| 5,081,540 | 1/1992 | Dufresne et al. | 359/30 |

FOREIGN PATENT DOCUMENTS

| | | |
|---|---|---|
| 0 679 864 | 11/1995 | European Pat. Off. . |
| 5-119341 | 5/1993 | Japan . |
| 5-127139 | 5/1993 | Japan . |

OTHER PUBLICATIONS

Xu et al, "Pinhole Hologram and Its Applications", Optics Letters, vol. 14, No. 2, Jan. 15, 1989, New York, New York, USA, pp. 107–109.

Database WPI, Section PQ, Weel 8242, Derwent Publications Ltd., London, GB; Classs P81, AN 82–N8762E XP002049854 & SU 892 399 B (BOBROV S T), Dec. 23, 1981, Abstract.

Basic Experiment of Holographic Television by Liquid Crystal Display Device,K.Sato et al, vol. 45, No. 7, pp. 873–875 (1991) with translation.

Spie vol. 1461 Pratical Holography V(1991)/291 "Real–Time Holography Using the High–Resolution LCTV–SLM" N.Hashimoto et al.

The Bell System Technical Journal, Feb. 1966 " Hologram Transimssion Via Television "L.H.Enloe et al, pp. 334–339.

Applied Optics,May 1972/vol. 11,No. 5 Remote Real–Time Reconstruction of Holograms Using the Lumatron,R.J.Doyle et al,pp. 1261–1254.

Television Bases Fourier Holographic Suystem D.Casasent et al Applied OPtics/vol. 13 No. 10, Oct. 1974, pp. 2268–2273.

*Primary Examiner*—Jon Henry
*Attorney, Agent, or Firm*—Pillsbury Madison & Sutro LLP

[57] ABSTRACT

A diaphragm having an aperture, the size of which is equal to or smaller than $\lambda f/p$ ($\lambda$ is the wavelength, p is the imaging resolution, and f is the focal length of an imaging optical system) is arranged on the focal plane of the object space of the imaging optical system, and object light via the aperture is imaged by the imaging optical system. The object light via the imaging optical system and reference light are brought to interference to form interference fringes, and an image of the interference fringes is sensed. Using the hologram sensed in this manner, the image of the object to be sensed is reconstructed by adopting an imaging optical system equivalent to that upon imaging, and setting the positional relationship between the formed hologram and the imaging optical system in correspondence with that between the imaging optical system and the imaging surface upon imaging. In this way, a holography imaging apparatus which can vary the field of view and can sense a high-quality hologram using an imaging device having a relatively low spatial resolution is realized, and a holography display apparatus which can display an image by eliminating distortion with respect to the original image from a hologram sensed by the holography imaging apparatus of this invention is realized.

11 Claims, 34 Drawing Sheets

HOLOGRAPHY IMAGING APPARATUS HOLOGRAPHY DISPLAY APPARATUS HOLOGRAPHY IMAGING METHOD AND HOLOGRAPHY DISPLAY METHOD

BACKGROUND OF THE INVENTION

1. Field of the Invention

The present invention relates to a holography imaging apparatus for recording three-dimensional information of an object, and a holography display apparatus for reading out the three-dimensional information of an object from the holography imaging apparatus and displaying a three-dimensional image of the object.

2. Related Background Art

Holography has received considerable attention as a technique for displaying a three-dimensional image of an object, a. The holography technique includes a holography imaging technique for recording three-dimensional information of an object, and a holography display technique for reading out the three-dimensional information of an object recorded by the holography imaging technique and displaying the three-dimensional image of the object.

The conventional holography technique is designed based on the premises that the imaging device has a high resolution upon holography imaging, and most of holography imaging apparatuses use a high-resolution photography dryplate or thermoplastic as imaging devices.

Since such imaging technique is basically a high-level photography technique because of the high resolution, holography imaging labor intensive. In view of this problem, the holography techniques using a CCD camera as a relatively low-resolution imaging device are proposed in "Sato et. al., Journal of Television Society, Vol. 45, No. 7, pp. 873–875 (1991)" (hereafter referred to as prior art 1) and "N. Hashimoto et. al., SPIE, Vol. 1461, Practical Holography V (1991), pp. 291–302" (hereafter referred to as prior art 2).

Prior art 1 corresponds to an example of a Fresnel type holography technique which does not use any lenses that are normally used in the holography imaging technique. In the holography imaging technique disclosed in prior art 2, an imaging lens is used so that the spatial resolution of a real image matches that of an imaging device, and a diaphragm is arranged immediately before the position of the object space of the imaging lens.

Interference fringes bearing both the distance information in the optical axis direction and the position information in a direction perpendicular to the optical axis are sensed, and an image to be reconstructed is read out from the interference fringes.

When holography imaging apparatuses of prior arts 1 and 2 are adopted, since the spatial resolution of a CCD is about 10 μm in general, the angle object light and reference light make must fall within the range from 2° to 3°. If the angle object light and reference light make becomes large, the spacing between adjacent interference fringes becomes smaller than the resolution of the imaging device and, hence, the interference fringes cannot be sensed with high contrast.

In the holography imaging apparatuses of prior arts 1 and 2, the pixel pitch and pixel size of the CCD as the imaging device are different from those of a spatial modulation device used in image reconstruction, and the optical system upon holography imaging is different from that upon reconstruction. As a consequence, the enlargement factor of the reconstructed display image essentially varies depending on the position.

SUMMARY OF THE INVENTION

It is an object of the present invention to obtain a high-quality holography image.

A holography imaging apparatus according to the present invention uses an optical system having a positive refractive power, e.g., a convex lens, to vary the field of view, and reflects the distance, in the optical axis direction, to the object on the spacing between adjacent interference fringes and the position, in a direction perpendicular to the optical axis direction, of the object on the distribution range of the interference fringes, so as to assure a required spacing between adjacent interference fringes. Hence, the apparatus has the reflection function of the distance, in the optical axis direction, to the object independently of the reflection function of the position, in the direction perpendicular to the optical axis direction, of the object, and adjusts the position, in the optical axis direction, of an imaging device, thereby suppressing generation of interference fringes, the spacing of which is smaller than the resolution of the imaging device.

More specifically, the holography imaging apparatus according to the present invention comprises (a) diaphragm means having an aperture for passing object light reflected by the object to be sensed as a result of irradiation of the light output from a first light source onto the object to be sensed, (b) a first imaging optical system arranged at a position corresponding to the focal plane of an object space of the diaphragm means, (c) an interference optical system for converting the coherent light output from a second light source into reference light as plane waves, and bringing the object light via the first imaging optical system and the reference light to interference, and (d) image sensing means, having an imaging surface perpendicular to the optical axis of the first imaging optical system at a position separated by a first distance from the focal plane of an image space of the first imaging optical system in the propagation direction of the reference light output from the first imaging optical system, for sensing an image formed by interference light output from the interference optical system, wherein the following relation holds:

$$a \leq \lambda \cdot f/p \qquad (1)$$

where $\lambda$ is the wavelength of the object light, a is the aperture size of the aperture of the diaphragm means, f is the focal length of the object space of the first imaging optical system, and p is the spatial resolution of the image sensing means.

Note that the first and second light sources can be realized by a single light source.

Also, the apparatus may further comprise first moving means for changing the first distance. In this case, an optimal imaging position can be set in correspondence with the distance to the object to be sensed and the resolution of the imaging surface.

The imaging result of the image sensing means may be either (i) the intensity of light on the imaging surface or (ii) the amplitude and phase of waves of light on the imaging surface. In the former case, an intensity hologram is obtained, and in the latter case, a complex hologram is obtained. The complex hologram is obtained by a fringe scanning method.

In the holography imaging apparatus of the present invention, the object to be imaged is irradiated with light output from the first light source. Object light, reflected by the object is input to the first imaging optical system via the aperture having a size that satisfies relation (1) above.

Of the light rays input to the imaging optical system, a principal ray that has passed through the focal point of the object space of the imaging optical system is output from the exit position of the first imaging optical system, which position is separated by a predetermined distance from the central axis (to be also simply referred to as an optical axis hereinafter) of the first imaging optical system, in correspondence with the incident angle to the first imaging optical system, and is perpendicularly incident on the imaging surface along an optical path parallel to the optical axis. The light that has passed through the aperture is converted into light propagating toward the imaging point, having passed through the imaging optical system. Accordingly, wavefronts that have passed through the aperture become spherical waves that converge from the passing point of the imaging optical system to the imaging point, and become spherical waves that diverge after passing through the imaging point.

Coherent light output from the light source is input to the interference means (optical system). The interference means converts the coherent light output from the second light source into reference light as plane waves, and brings the object light via the imaging optical system and the reference light to interference.

Note that the first and second light sources may be realized by a single light source, and light output from the light source may be split by a beam splitter into light to be irradiated onto the object to be sensed and the coherent light as a source of the reference light.

When the object spherical waves that have passed through the imaging optical system are brought to interference with plane waves having the same wavelength as that of the spherical wave, and interference waves are observed in a section perpendicular to the optical axis at a position behind the imaging optical system, the section becomes a cosine wave Fresnel zone plate having the principal ray as the center, and a line connecting the centers of cosine wave Fresnel zone plates at various positions is parallel to the optical axis.

As a consequence, when the distance in the optical axis direction remains the same, the distances, in the direction perpendicular to the optical axis, to bright points of the object to be sensed define the distribution range of interference fringes coming from the bright points. Also, the distances, in the optical axis direction, to the bright points of the object to be sensed define the spacing between adjacent interference fringes of the cosine Fresnel zone plate.

The imaging apparatus of the present invention adopts an aperture having an aperture size a that satisfies relation (1) above so as to suppress generation of interference fringes, the spacing of which is smaller than the spatial resolution of the image sensing means, i.e., the size (to be also referred to as a pitch hereinafter) p of the unit of an imaging device used in the image sensing means.

If the reference light is perpendicularly incident on the imaging device, the incident angle, $\theta$, of object light at which interference fringes generated on the imaging device having the pitch p can be sensed at the Nyquist spacing or less must satisfy:

$$\theta \leq \sin^{-1}((\lambda/2)/p) \qquad (2)$$

On the other hand, in the imaging apparatus of the present invention having an aperture with an aperture size a that satisfies relation (1) above, the angle (to be also referred to as the incident angle to the imaging point hereinafter), $\theta i$, the object light and the optical axis make satisfies:

$$\theta i < \tan^{-1}((\lambda/2)/p) \qquad (3)$$

Since $\lambda > 0$, the angle $\theta i$ also satisfies:

$$\theta i < \sin^{-1}((\lambda/2)/p) \qquad (4)$$

Therefore, the imaging apparatus of the present invention can sense interference fringes at the Nyquist spacing, and information can be stored with high reproducibility owing to the sampling theorem.

If the aperture size a of the aperture of the imaging apparatus does not satisfy relation (1), unresolved interference fringes may be produced. In this case, the light amount of unresolved interference fringes is recognized as a DC component, and lowers the contrast of the resolved interference fringes. It is convenient and practical to select a rectangular or circular aperture.

The operation principle adopted in the holography imaging apparatus of the present invention will be briefly described below.

FIG. 1 explains the principle of the holography imaging apparatus of the present invention. As shown in FIG. 1, the holography imaging apparatus of the present invention comprises (a) an imaging optical system 110 having a positive refractive power, (b) a diaphragm 210 having an aperture 211 at a position near the focal point of the object space of the imaging optical system 110, (c) an interference optical system 300 for bringing object light and reference light to interference, and (d) an imaging device 400 which has an imaging surface 410 perpendicular to the optical axis and senses interference fringes of interference light output from the interference optical system 300.

In the imaging apparatus shown in FIG. 1, object light rays from bright points (P1, P2, P3, . . . ) of the object to be sensed pass through the aperture 211 and then enter the imaging optical system 110.

Of light rays entering the imaging optical system 110, a principal ray that has passed through the center of the aperture 211, i.e., the focal point of the object space of the imaging optical system 110, is output from the exit position of the imaging optical system, which position is separated by a predetermined distance from the optical axis of the imaging optical system 110, in correspondence with the incident angle to the imaging optical system 110, and is perpendicularly incident on the imaging surface 410 along an optical path parallel to the optical axis. On the other hand, the light rays that have passed the aperture 211 are converted into light rays which propagate toward imaging points (Q1, Q2, Q3, . . . ) corresponding to the bright points (P1, P2, P3, . . . ) when they have passed through the imaging optical system 110. Hence, wavefronts that have passed through the aperture 211 become spherical waves that converge from their passing points of the imaging optical system 110 to the imaging points (Q1, Q2, Q3, . . . ), and become spherical waves that diverge after passing through the imaging points (Q1, Q2, Q3, . . . ).

FIG. 2 explains the incident angle of object light at the imaging point. Object light that has the bright point P as a start point and enters the imaging optical system 110 via the aperture 211 converges to the imaging point Q. Let L be the aperture size of the aperture 211 that is given by:

$$L = \lambda \cdot f / P$$

where $\lambda$: the wavelength of the object light
   f: the focal length of the object space of the imaging optical system
   p: the spatial resolution of the imaging device Then, each of the angles, $\theta_{i0}$, light rays, which have passed through the two end points of the aperture 211 and the imaging optical system, and the optical axis make is given by:

$$\theta_{i0}=\tan^{-1}((\lambda/2)/p)$$

Accordingly, the angle, $\theta_i$, a light ray, which has passed through the aperture 211 and the imaging optical system, and the optical axis make satisfies:

$$\theta_i \leq \tan^{-1}((\lambda/2)/p)$$

When A>0, $$\tan^{-1}A < \sin^{-1}A$$

then, $$\theta_i < \sin^{-1}((\lambda/2)/p)$$

Hence, the angle $\theta_i$ satisfies the condition given by relation (2) above.

The object light via the imaging optical system 110 and reference light (coherent light having the same wavelength as that of the object light) as plane waves enter the interference optical system 300 and brought to interference. Note that the propagation direction of the reference light is set by the interference optical system so that the reference light via the interference optical system 300 propagates parallel to the optical axis and is perpendicularly incident on the imaging surface 410.

Since (the aperture size a of the aperture in the present invention) <L, the holography imaging apparatus of the present invention can sample at the Nyquist spacing or less interference fringes produced as a result of interference between the object light via the imaging optical system 110 and the reference light (coherent light having the same wavelength as that of the object light) in the interference optical system 300 since the incident angle at the imaging point always satisfies the condition given by relation (2) above.

A holography display apparatus according to the present invention is a holography display apparatus for reconstructing and displaying an image of the object to be sensed on the basis of optical information sensed by the holography imaging apparatus of the present invention, and comprises (a) information input means for inputting the imaging result in the holography imaging apparatus of the present invention, (b) a hologram forming unit for forming a hologram on the imaging surface at the imaging timing of the holography imaging apparatus of the present invention on the basis of information supplied from the information input means, (c) a second imaging optical system which has a focal plane of the object space (the hologram site) at a position separated by the first direction in the holography imaging apparatus of the present invention from the position of the hologram in the average propagation direction of hologram forming light, and (d) 0th-order light shielding means arranged at the focal point of the image space of the second imaging optical system.

The apparatus preferably further comprises second moving means for changing the distance between the position of the hologram and the focal plane of the object space of the second imaging optical system. In this case, in the holography imaging apparatus of the present invention, even when the selected first distance changes, the layout of the reconstruction optical system that can reconstruct an image free from any distortion can be set again in accordance with the changed first distance.

In the case of an intensity hologram, the hologram forming means can be preferably constituted by optical members by comprising (i) display means for displaying an optical image of the imaging result supplied from the information input unit (means), (ii) a spatial light modulator in which a spatial light modulated image corresponding to the optical image displayed on the display means is written, (iii) a light source for producing read light to be irradiated onto the spatial light modulator, and (iv) a hologram forming optical system for receiving phase- or amplitude-modulated light obtained by phase- or amplitude-modulating the read light via the spatial light modulator, and forming a hologram having the same size as that of the imaging device of the holography imaging apparatus.

When the imaging result in the holography imaging apparatus of the present invention is a complex hologram that contains the amplitude information and phase information of incident light at the respective points on the imaging surface, the hologram forming unit can be preferably constituted by optical members by comprising (i) a phase & amplitude modulation unit for phase- and amplitude-modulating incident light in accordance with the amplitude information and phase information supplied from the information input unit and outputting the modulated light, (ii) a light source for producing read light to be irradiated onto the phase & amplitude modulation unit, (iii) a hologram forming optical system for receiving phase- and amplitude-modulated light obtained by phase- and amplitude-modulating the read light via the phase & amplitude modulation unit, and forming a hologram having the same size as that of the imaging device of the holography imaging apparatus.

The functions of the hologram forming unit, the second imaging optical system, and the 0th-order light shielding plate (means) can also be realized by calculation processing using a computer.

The principle of hologram reconstruction utilized in the holography display apparatus of the present invention will be briefly described below. The holography display apparatus of the present invention reads out an interference fringe image sensed by the above-mentioned principle and displays a hologram.

A case will be explained below wherein the imaging surface is set at the far focal plane in holography imaging.

FIG. 3 shows the arrangement of the most basic reconstruction optical system. As shown in FIG. 3, this optical system comprises (a) an imaging optical system 120 equivalent to the imaging optical system 110 used in the imaging optical apparatus, (b) a complex hologram 510 arranged at a position corresponding to the imaging surface 410 with respect to the imaging optical system 110, i.e., on one focal plane of the imaging optical system 120, and (c) a diaphragm 220 which is arranged at a position corresponding to the diaphragm 210 with respect to the imaging optical system 110, i.e., on the other focal plane of the imaging optical system 120, and has an aperture 221 equivalent to the aperture 211.

In this reconstruction optical system, when collimated light as conjugate waves of the reference light upon imaging, i.e., read light, is irradiated onto the complex hologram 510, light, the reconstruction wavefronts of which have an object image formed by the imaging optical system 110 upon imaging as a virtual image IM1, is produced. This light enters the imaging optical system 120 and forms a real image RL1 via the aperture 221 at a position corresponding to the position of the object to be sensed upon imaging.

In reconstruction, since a reconstruction light beam is concentrated at the position near the aperture 221 in the reconstruction optical system shown in FIG. 3, the diaphragm 220 is not always necessary.

Since the complex hologram 510 does not produce any conjugate image, no images other than the above-mentioned virtual image IM1 and the real image RL1 are reconstructed.

The real image RL1 is observed from a view point P11 or P12 located at the position behind the object to be sensed upon imaging. Hence, the image to be observed is the reverse site of the reconstructed image.

At the view point P11 or P12, the observer can only observe a portion of the real image RL1 associated with only reconstruction light incident on each view point.

The drawbacks of the reconstruction optical system shown in FIG. 3 can be removed. FIG. 4 shows the arrangement of a reconstruction optical system that can remove the drawbacks of the reconstruction optical system shown in FIG. 3.

As shown in FIG. 4, this reconstruction optical system comprises (a) an imaging optical system 120 equivalent to the imaging optical system 110 used in the imaging optical apparatus, (b) a complex hologram 510 which is arranged at a position corresponding to the imaging surface 410 with respect to the imaging optical system 110, i.e., on one focal plane of the imaging optical system 120, and is rotated through 180° about a direction perpendicular to the plane of the drawing of FIG. 4 as the rotation axis, and (c) a diaphragm 220 which is arranged at a position corresponding to the diaphragm 210 with respect to the imaging optical system 110, and has an aperture 221 equivalent to the aperture 211.

In this reconstruction optical system, when collimated light as conjugate waves of the reference light upon imaging, i.e., read light, is irradiated onto the complex hologram 510, light, the reconstruction wavefronts of which form a real image RL2 at a symmetrical position with respect to the focal plane of the virtual image IM1, is produced. This light enters the imaging optical system 120, and is converted into light having wavefronts that form a virtual image IM2 between the imaging optical system 120 and the diaphragm 220. By observing the virtual image IM2 from the aperture 221 as the view point, the entire image in a normal image direction free from any distortion can be observed.

A case will be explained below wherein a hologram is recorded by an intensity recording type hologram apparatus.

FIG. 5 shows the arrangement of the most basic reconstruction optical system of an intensity hologram. As shown in FIG. 5, this reconstruction optical system has substantially the same arrangement as that of the reconstruction optical system shown in FIG. 3, except that an intensity hologram 560 replaces the complex hologram 510.

When read light is irradiated onto the intensity hologram 560 of the reconstruction optical system shown in FIG. 5, reconstruction light, which has wavefronts that form a virtual image IM1 at the imaging position upon imaging as in the reconstruction optical system shown in FIG. 3, and wavefronts that form a virtual image RL3 at a symmetrical position of the virtual image IM1 about the intensity hologram 560 as the plane of symmetry, is produced.

The light having the wavefronts that form the virtual image IM1 is reconstructed by the imaging optical system 120 as a real image RL1 at the position of the object to be sensed upon imaging. On the other hand, the light having the wavefronts that form the virtual image RL3 is reconstructed by the imaging optical system 120 as a virtual image IM3 at the symmetrical position of the real image RL1 about the diaphragm 220 as the plane of symmetry.

By observing the virtual image IM3 from the aperture 221 as the view point, the entire reconstructed image can be obtained.

However, the observed image is vertically inverted as in FIG. 3.

This problem can be solved by the same method as that which solves the similar problem in the reconstruction optical system shown in FIG. 3 by the reproduction optical system shown in FIG. 4.

FIG. 6 shows the arrangement of the reconstruction optical system that solves the problem of the reconstruction optical system shown in FIG. 5. As shown in FIG. 6, this reproduction optical system has substantially the same arrangement as that of the system shown in FIG. 5, except that the intensity hologram 560 is arranged to be rotated through 180° about the direction perpendicular to the plane of the drawing of FIG. 6 as an axis.

When read light is irradiated onto the intensity hologram of the reconstruction optical system shown in FIG. 6, reconstruction light which has wavefronts that form a real image RL2 at the same position as that in the reconstruction optical system shown in FIG. 4, and wavefronts that form a virtual image IM4 at a symmetrical position of the real image RL2 about the intensity hologram 560 as the plane of symmetry, is produced.

The light having the wavefronts that form the virtual image IM4 is reconstructed by the imaging optical system 120 as a real image RL4 at the position of the object to be sensed upon imaging. On the other hand, the light of the wavefronts that form the real image RL2 is reconstructed by the imaging optical system 120 as a virtual image IM2 at a symmetrical position of the real image RL4 about the diaphragm 220 as the plane of symmetry.

By observing the virtual image IM2 from the aperture 221 as the view point, the entire reconstructed image can be observed with the same directional relationship as that of the image upon imaging as in the reconstruction optical system shown in FIG. 4.

In the above description, the imaging surface is set at the focal plane (focal length=f) of the imaging optical system upon imaging. A case will be explained below wherein the imaging surface is not set at the focal plane of the imaging optical system upon imaging. In the following description, assume that the imaging surface upon imaging is separated by z from the rear focal plane of the imaging optical system.

FIG. 7 shows the arrangement of a reconstruction optical system in which the complex hologram 510 is set at the position of the imaging surface upon imaging in accordance with FIG. 3. When read light is irradiated onto the reconstruction optical system shown in FIG. 7, light having wavefronts that form a virtual image IM1 is reconstructed at the imaging position of the imaging optical system upon imaging (the distance from the imaging optical system to the imaging position is b). At this time, the distance, c, between the complex hologram 510 and the virtual image IM1 is:

$$c = b - (f + z) \tag{5}$$

Subsequently, the light having the wavefronts that form the virtual image IM1 is imaged by the imaging optical system 120 at the position of the object to be sensed upon imaging, thus reconstructing a real image RL1. In this reconstruction optical system, the real image RL1 as the reconstructed image does not suffer any distortion upon imaging.

However, since the same problem as in the case of FIG. 3 above is also posed upon observing the real image RL1 in FIG. 7, a reconstruction optical system that takes the same measure as that of the reconstruction optical system in FIG. 4 with respect to the reconstruction optical system in FIG. 3 is adopted.

In the reconstruction optical system shown in FIG. 7, the complex hologram 510 is rotated through 180° about the direction perpendicular to the plane of the drawing of FIG. 7 as an axis, and is moved by a distance y. When read light is irradiated in this reconstruction optical system, a real image RL2 is reconstructed at the position, where the virtual image IM1 rotated through 180° about the same axis as the rotation axis of the complex hologram is reconstructed. The distance, d, between this real image RL2 and the imaging optical system 120 is:

$$d=f+z-c-y=2f+2z-b-y \quad (6)$$

In order to reconstruct a virtual image IM2 free from any distortion by imaging wavefronts that form the real image RL2 by the imaging optical system 120, the position of the real image RL2 must be formed at a symmetrical position of the virtual image IM1 about the focal plane in FIG. 7. This condition is:

$$d=2f-b \quad (7)$$

Hence, from equations (6) and (7), the condition for obtaining the virtual image IM2 independently of the enlargement factor difference depending on the position is:

$$y=2z \quad (8)$$

FIG. 8 shows the arrangement of a reconstruction optical system that satisfies the condition given by equation (8).

When an intensity hologram is used, the entire image in a normal image direction free from any distortion can be also be observed by the same reconstruction optical system as that shown in FIG. 8.

In the holography imaging apparatus of the present invention, the image sensing means can comprise the imaging surface, which is separated by the first distance from the focal plane of the image space of the first imaging optical system in the propagation direction of the reference light output from the first imaging optical system, is arranged at the position where it does not receive any principal ray of light that comes from the object to be sensed and passes through the focal point of the object space of the first imaging optical system, and is perpendicular to the optical axis of the first imaging optical system.

The holography display apparatus, which reconstructs and displays the image of the object to be sensed on the basis of optical information sensed by the holography imaging apparatus, preferably further comprises principal ray shielding means which is arranged on the focal plane of the image space (opposite to the hologram site) of the second imaging optical system, and shields the principal ray of light having wavefronts that form a real image, which light is obtained by converting light having wavefronts, which form a hologram, via the second imaging optical system.

In the holography imaging apparatus and the holography display apparatus, which do not use the principal ray, a conjugate image generated in the case of the intensity hologram can be effectively removed, as will be described below.

FIG. 9 shows the arrangement of an imaging optical system suitable for removing a conjugate image upon reconstruction. As shown in FIG. 9, this optical system comprises (a) an imaging optical system 110 having a positive refractive power, (b) a diaphragm 210 having an aperture 211 at a position near the focal point of the object space of the imaging optical system 110, (c) an interference optical system 300 for bringing object light and reference light to interference, and (d) an imaging device 400 which has an imaging surface 410 perpendicular to the optical axis, and senses interference fringes of interference light output from the interference optical system 300. The entire optical system is designed, so that the principal ray of object light that has passed through the focal point of the object space of the imaging optical system 100 is not incident on the imaging surface 410.

Such arrangement can be attained by only the geometric arrangement of an object 900 to be sensed, the diaphragm 210, the imaging optical system 110, and the imaging surface 410, or can be attained by arranging a filter 419, the transmittance of which gradually becomes 0 at the incidence position, on the imaging surface 3410, of the principal ray of the object light that has passed through the focal point of the object space of the imaging optical system 110. With this arrangement, the influence of diffraction at a position near the end point can be prevented, and image quality can be improved.

According to the imaging optical system shown in FIG. 9, interference fringes formed by object light that does not include any principal ray of the object light, which has passed through the focal point of the object space the imaging optical system 110, and the reference light, are sensed.

A reconstruction optical system for reconstructing an image from the hologram sensed by the optical system shown in FIG. 9 will be described below.

FIG. 10 shows the arrangement of such reconstruction optical system. Note that FIG. 10 depicts the optical path of light suitable for observing the reconstructed image.

As shown in FIG. 10, this reconstruction optical system comprises (a) an imaging optical system 120 equivalent to the imaging optical system 110, a hologram 510 which is arranged at a position corresponding to the imaging surface 410 with respect to the imaging optical system 110, i.e., on one focal plane of the imaging optical system 120, and is rotated through 180° about the direction perpendicular to the plane of the drawing of FIG. 4 about the rotation axis, (c) a 0th-order light shielding plate 251 arranged near the focal point of the image space of the imaging optical system 120, and (d) a planar light shielding plate 252 arranged at a position below, on the plane of the drawing, the focal point of the image space of the imaging optical system 120. Note that the layout position of the hologram 510 is the same as that in FIG. 8.

In this reconstruction optical system, when collimated light as conjugate waves of the reference light upon imaging, i.e., read light is irradiated onto the hologram 510, light having wavefronts that form a real image RL2 is produced as in FIG. 5. This light enters the imaging optical system 120 and is converted into light having wavefronts that form a virtual image IM2. As shown in FIG. 10, since the light having wavefronts that form the virtual image IM2 passes through a position above, on the plane of the drawing, the focal point on the focal plane of the image space of the imaging optical system 120, the entire image in a normal image direction free from any distortion can be satisfactorily observed by observing this light, i.e., the virtual image IM2, from the position behind the focal plane of the image space of the imaging optical system 120.

FIG. 11 is an explanatory view of removal of a conjugate image by the optical system shown in FIG. 10. As shown in FIG. 11, when collimated light as conjugate waves of the reference light upon imaging, i.e., read light is irradiated onto the hologram 510, light having wavefronts that form a virtual image IM1 as a conjugate image of a real image RL2 is produced as in FIG. 6. This light enters the imaging optical system 120, and is converted into light having wavefronts that form a real image RL1. As shown in FIG. 11, since the light having wavefronts that form the virtual image IM2 passes through a position below, on the plane of the drawing, the focal point on the focal plane of the image space of the imaging optical system 120, it is shielded by the 0th-order light shielding plate 251 or the light shielding plate 252. As a consequence, upon observing the virtual image IM2 from the position behind the focal plane of the image space of the imaging optical system 120, no light having the wavefronts that form the virtual image RL1 is mixed, thus allowing satisfactory image observation.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
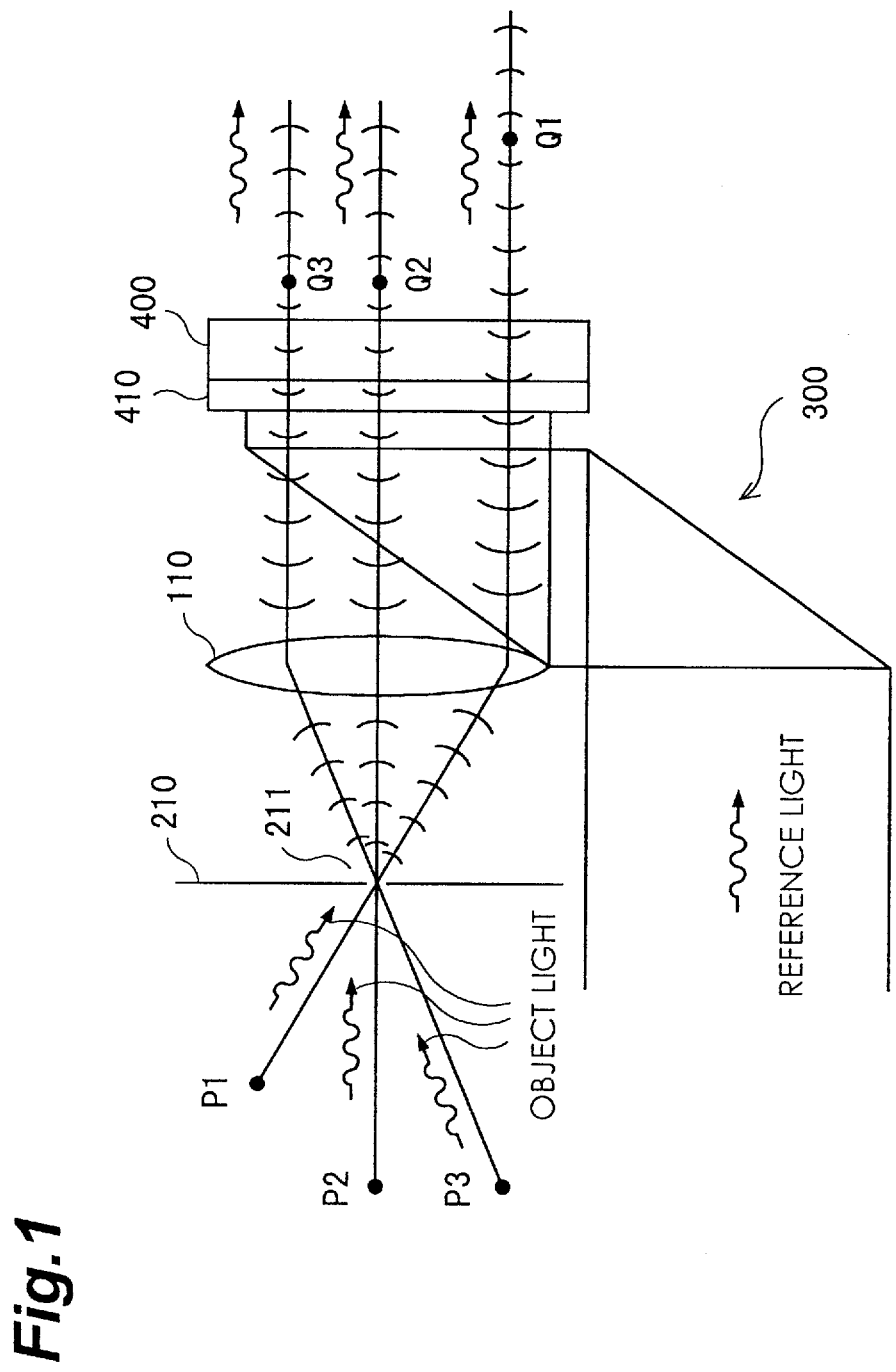
FIG. 1 explains the principle of a holography imaging apparatus according to the present invention.
Figure 2:
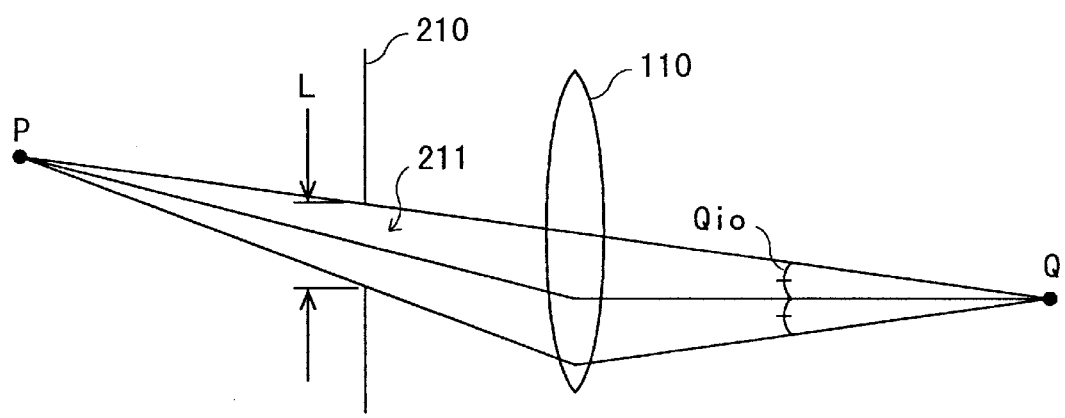
FIG. 2 explains the incident angle of object light at the imaging point.
Figure 3:
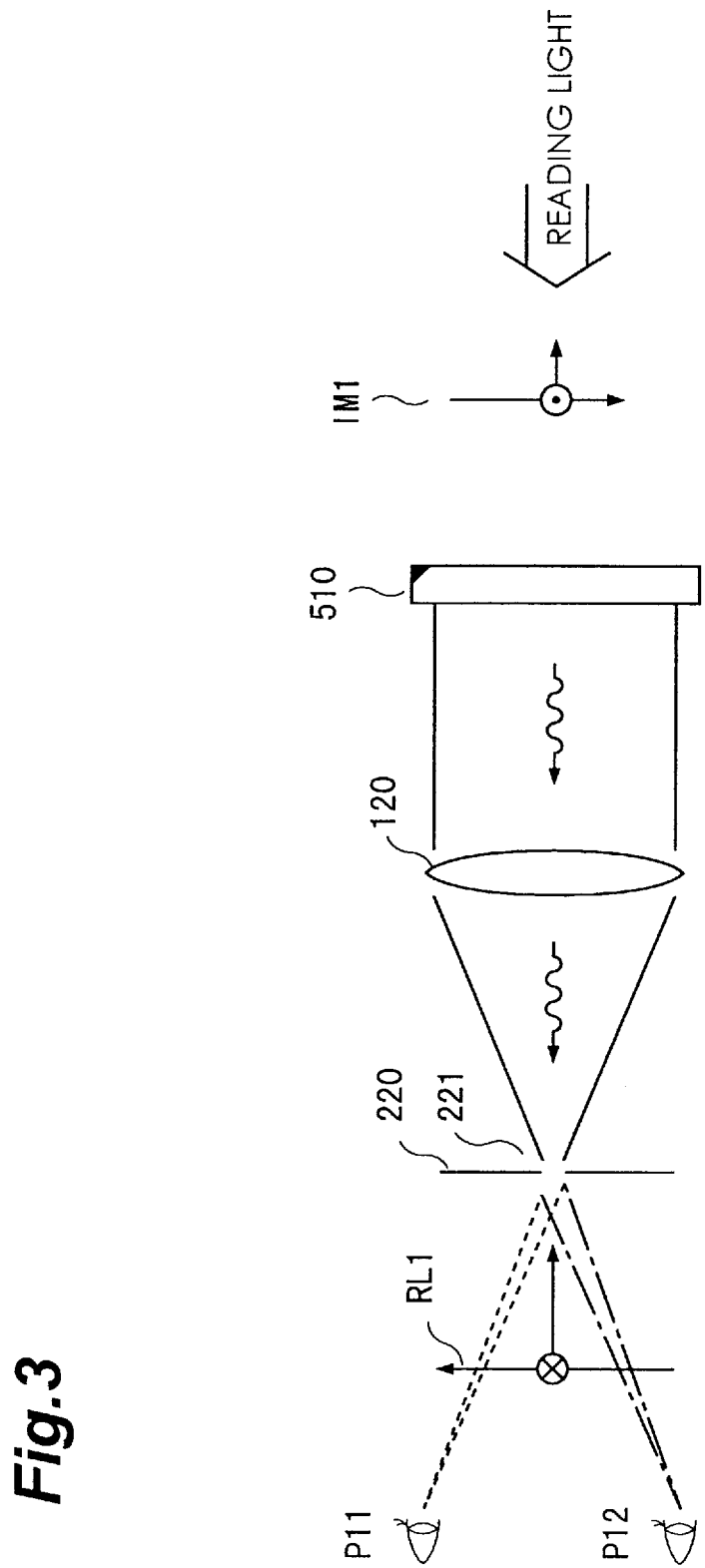
FIG. 3 shows the arrangement of a basic reconstruction optical system of a complex hologram (the hologram is set at the focal plane)
Figure 4:
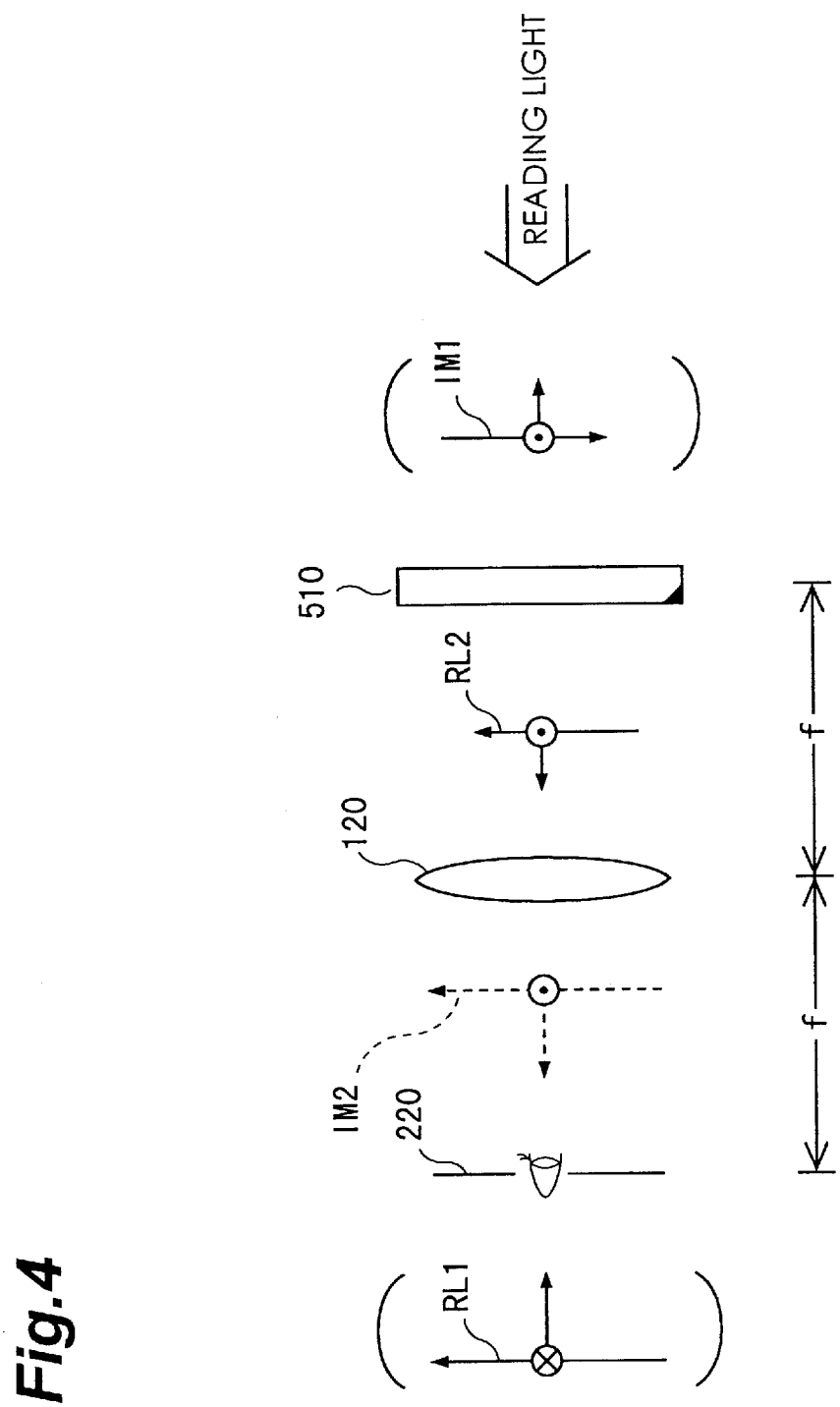
FIG. 4 shows the arrangement of a reconstruction optical system that improves the reconstruction optical system shown in FIG. 3.
Figure 5:
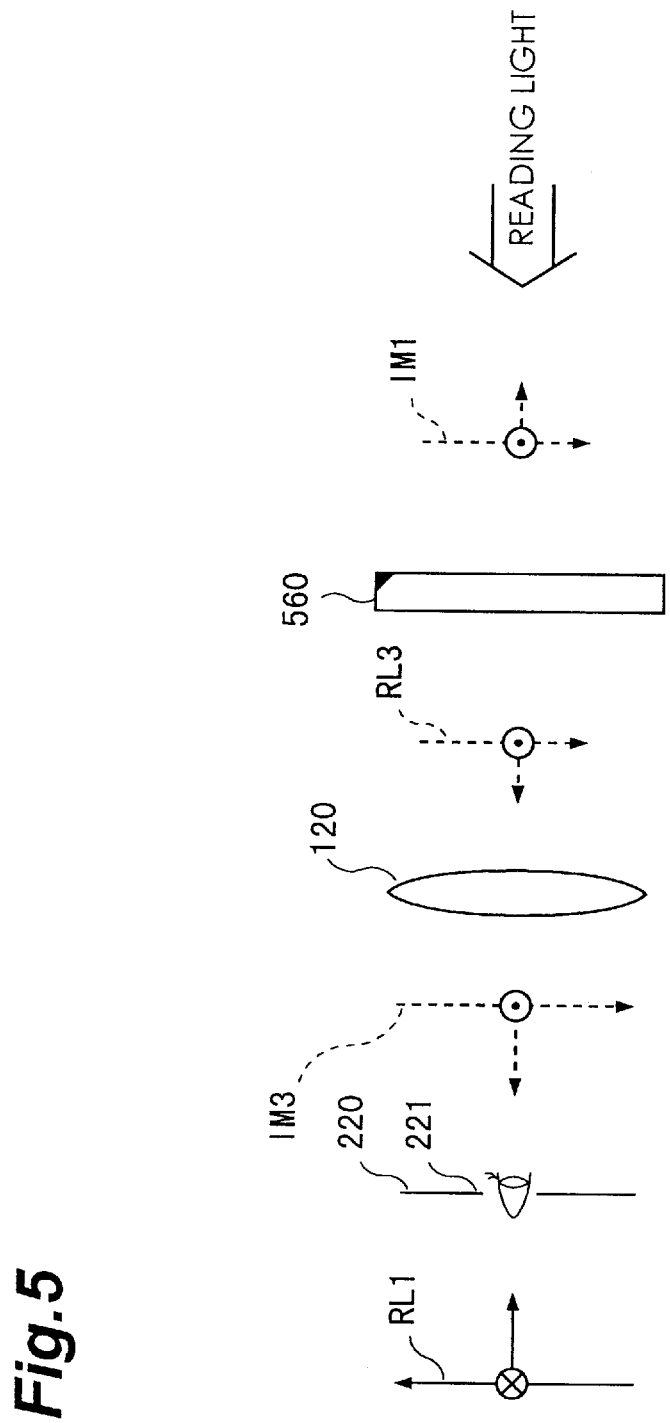
FIG. 5 shows the arrangement of a basic reconstruction optical system of an intensity hologram (the hologram is set at the focal plane)
Figure 6:
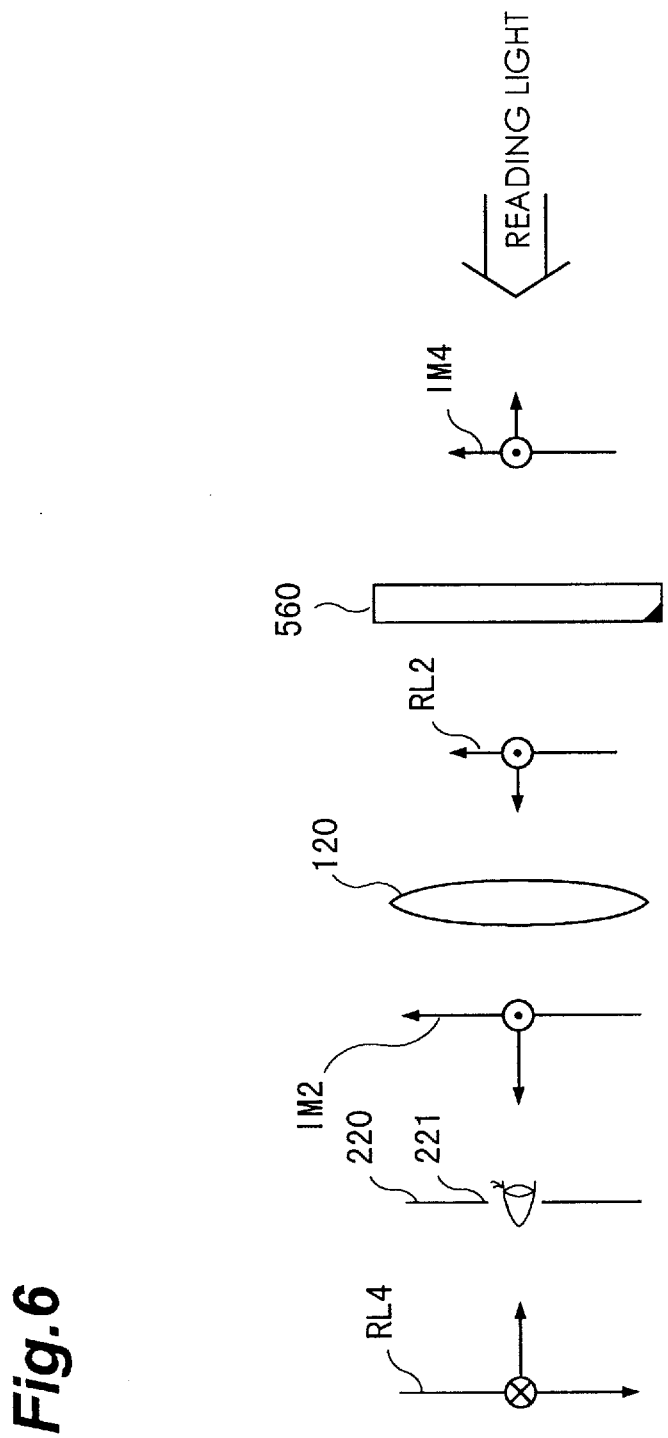
FIG. 6 shows the arrangement of a reconstruction optical system that improves the reconstruction optical system shown in FIG. 5.
Figure 7:
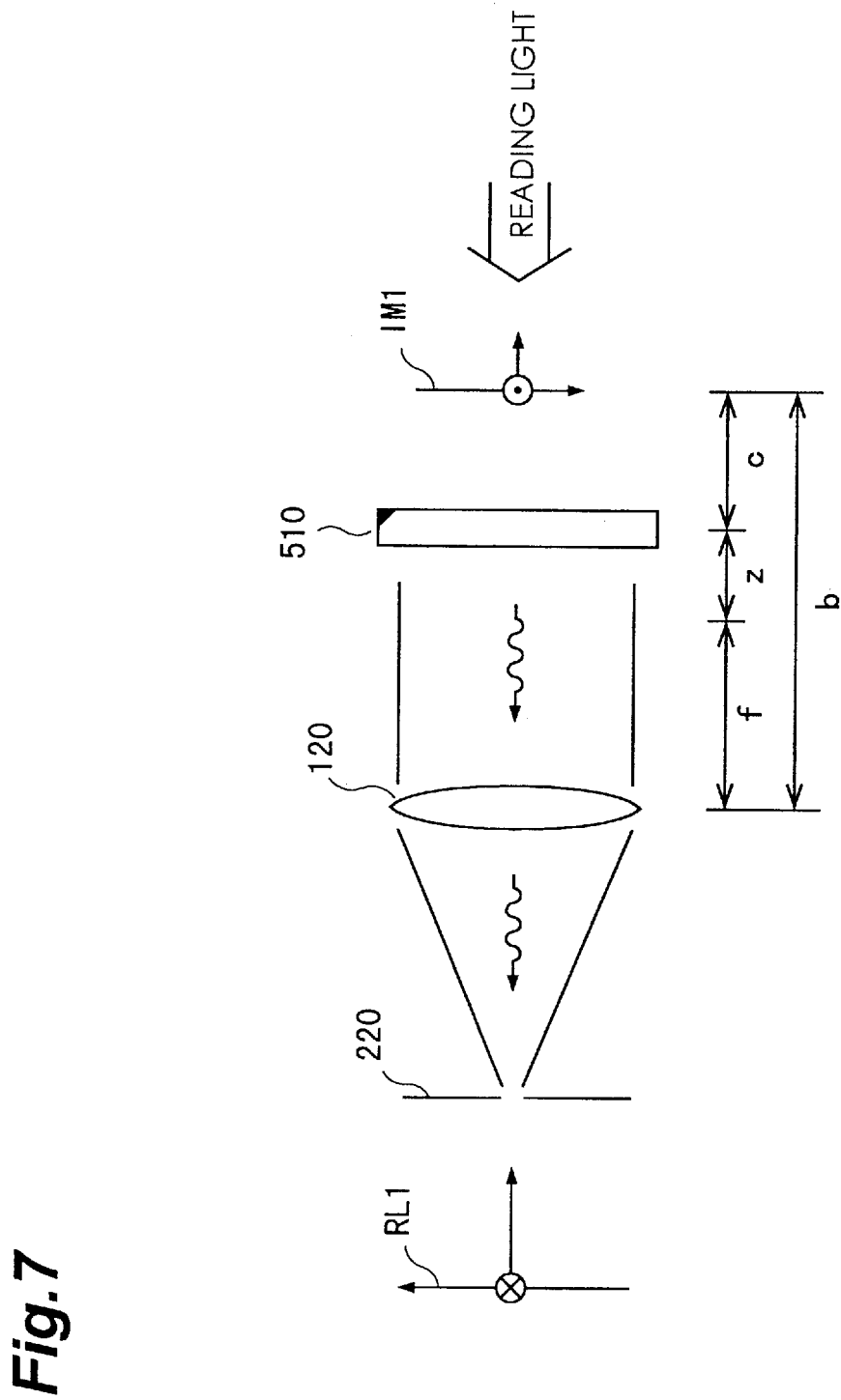
FIG. 7 shows the arrangement of a basic reconstruction optical system (the hologram is set at a position other than the focal plane)

The preferred embodiments of the holography imaging apparatus and the holography display apparatus according to the present invention will be described hereinafter with reference to the accompanying drawings. Note that the same reference numerals denote the same parts throughout the drawings, and a repetitive description thereof will be avoided.

[Embodiments of Holography Imaging Apparatus]

(First Embodiment)

Figure 12:
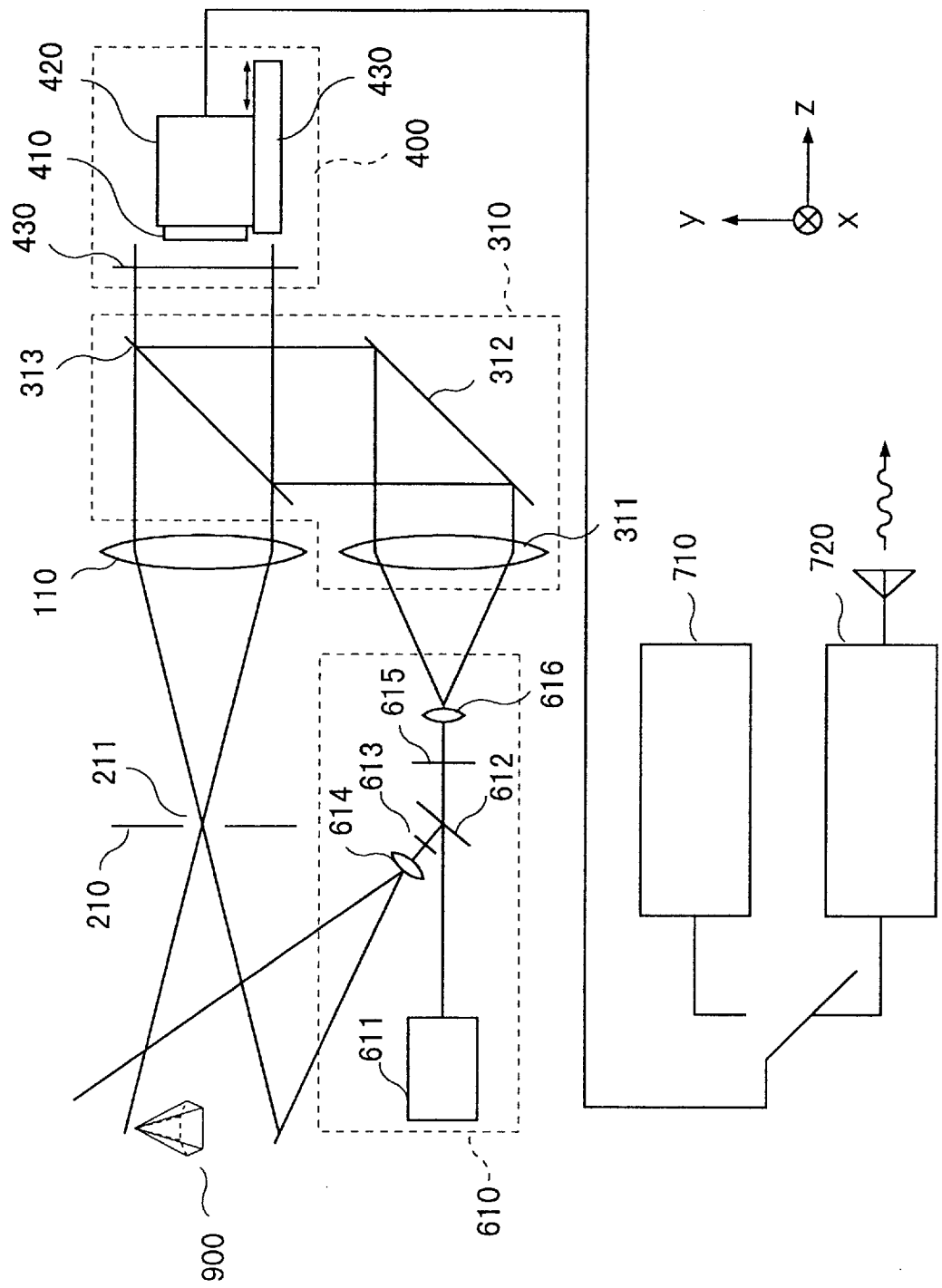
FIG. 12 is a diagram showing the arrangement of the first embodiment of a holography imaging apparatus according to the present invention.

FIG. 12 shows the arrangement of the first embodiment of a holography imaging apparatus according to the present invention. The holography imaging apparatus of this embodiment is an intensity recording type imaging apparatus. As shown in FIG. 12, this apparatus comprises (a) a light source unit 610 for producing irradiation light to be irradiated onto an object 900 to be sensed and reference light, (b) a diaphragm 210 having an aperture 211 which transmits the object light reflected by the object 900 to be sensed as a result of irradiation of light output from the light source unit 610 onto the object 900 to be sensed, (c) an imaging optical system 110 arranged at a position corresponding to the focal plane of the object space of the diaphragm 210 and having a positive refractive index, (d) an interference optical system 310 for bringing the object light via the imaging optical system 110 and the reference light to interference, (e) an imaging sensing means 400 which has an imaging surface 410 perpendicular to the optical axis of the imaging optical system 110 and sense an image formed by interference light output from the interference optical system 310, (f) a storage means 710 for receiving and storing imaging information output from the image sensing means 400, and (g) a transmission means 720 for receiving the imaging information output from the image sensing means 400 and transmitting it to a holography display apparatus.

When the wavelength of the object light=$\lambda$, the aperture size of the aperture of the diaphragm=a, the focal length of the object space of the imaging optical system=f, and the spatial resolution of the image sensing means=p, the following relation holds:

$$a \leq \cdot f/p \qquad (1)$$

The light source unit 610 comprises (i) a laser light source 611 for producing coherent light, (ii) a beam splitter 612 for splitting light output from the laser light source 611 into two beams, (iii) a D polarizer 613 for receiving one of the beams output from the beam splitter 612, selecting the direction of polarization, and outputting the polarized beam, (iv) an optical system 614 for outputting the light via the polarizer 613 toward the object 900 to be sensed as irradiation light of spherical waves, (v) a polarizer 615 for receiving the other beam output from the beam splitter 612, selecting the direction of polarization, and outputting the polarized beam, and (vi) an optical system 616 outputting the light via the polarizer 615 toward the interference optical system 310 as light of spherical waves.

The interference optical system 310 comprises (i) an optical system 311 for receiving the light via the optical system 616 and converting it into plane waves, (ii) a mirror 312 for reflecting the light via the optical system 311 and setting an optical path, and (iii) a half mirror 313 for receiving the object light via the imaging optical system 110 and the reference light via the mirror 312, and outputting these two beams in substantially the same directions to bring them to interference.

The image sensing means 400 comprises (i) an analyzer 430 for receiving interference light output from the interference optical system 310, selecting the direction of polarization, and outputting the light, (ii) an imaging device 420 which has the imaging surface 410 for receiving the light via the analyzer 430, and senses an optical image on the imaging surface 410, and (iii) a moving means 440 for moving the position of the imaging surface 410 relative to the interference optical system 310.

When the imaging device 420 adopts a CCD camera, the camera is set in a direction so as to scan an image formed by the imaging optical system 110 to be inverted in the horizontal and vertical directions. In order to prevent reflection by the protection glass of the imaging surface 410, an optical fiber plate having a core diameter equal to or smaller than the imaging resolution is preferably used in place of the normal protection glass.

A case will be exemplified below wherein the imaging optical system 110 adopts a convex lens having a focal length f=18 cm, the imaging surface 410 is defined by an array of 512 (=N)×512 imaging devices at a pitch p=11 $\mu$m, the light to be used has a wavelength $\lambda$=0.628 $\mu$m, and the object 900 is set at a position about 46.6 cm ahead of the imaging optical system 110. In this case, the imaging point of the object 900 to be sensed by the imaging optical system 110 corresponds to a position separated by 29.4 cm from the imaging optical system 110. Also, the circular aperture 211 is adopted to have its size a defined by:

$$a = \lambda f/p = 1.0 \text{ cm}$$

The optical axis of the object light is defined as the z-axis, the up-and-down direction of the plane of the drawing of FIG. 12 is defined as the y-direction, and the direction perpendicular to the plane of the drawing of FIG. 12 is defined as the x-direction.

The holography imaging apparatus of this embodiment senses an intensity hologram of the object 900 to be sensed as follows.

The imaging surface 410 is set at a position separated by an appropriate distance L from the object 900 to be sensed using the moving means 440 in accordance with the resolution of the image sensing means while maintaining the positional relationship between the diaphragm 210 and the imaging optical system 110 unchanged.

The distance L can be obtained as follows.

A cosine wave Fresnel zone plate F(x, y, L), produced on the imaging surface 410 by interference between spherical wave light after the object light as the irradiation light output from the light source unit 610 and reflected by the object 900 to be sensed has passed through the imaging optical system 110, and plane wave light obtained by converting the reference light output from the light source unit 610 into plane waves, is given by:

$$F(x,y,L) = 1 + \cos\left((2\pi/\lambda)(x^2+y^2+L^2)^{1/2}\right) \qquad (9)$$

For the sake of simplicity, the distance L is assumed to be an integer multiple of the wavelength $\lambda$ by approximation, and $r_{xy}$ represents the distance from the center of the imaging plane 410 in the x-y plane. In this case, equation (9) is rewritten as:

$$F(x,y,L) = 1 + \cos\left((2\pi/\lambda)(r_{xy}^2+L^2)^{1/2}\right) \qquad (10)$$

Accordingly, the position, $r_{xyb}(n)$, of the nth-order light portion of the cosine wave Fresnel zone plate F(x, y, L) is given by:

$$r_{xyb}(n) = (2Ln\lambda + n^2\lambda^2)^{1/2} \qquad (11)$$

On the other hand, the position, $r_{xyd}(n)$, of the nth-order dark portion of the cosine wave Fresnel zone plate F(x, y, L) is given by:

$$r_{xyd}(n) = (2Ln(\lambda+\frac{1}{2}) + (n+\frac{1}{2})^2\lambda^2)^{1/2} \qquad (12)$$

The condition for resolving the cosine wave Fresnel zone plate F(x, y, L) up to a maximum of nth order by the imaging surface 410 having the resolution p is:

$$r_{xyd}(n) - r_{xyb}(n) > p \tag{13}$$

If n that makes the right- and left-hand sides of relation (13) equal to each other is assumed to be a maximum resolution order $n_{maxp}$, the maximum resolution order $n_{maxp}$ is as a function of the distance L, and is nearly inversely proportional to the distance L.

Also, when the following relation holds:

$$r_{xyb}(n) = (N/2)p \tag{14}$$

i.e., if n that roughly sets the position of the nth-order light portion at the two ends of the imaging surface 410 is assumed to be a maximum imaging order $n_{maxd}$, the maximum imaging order $n_{maxd}$ is a function of the distance L and is proportional to the distance L.

Figure 13:
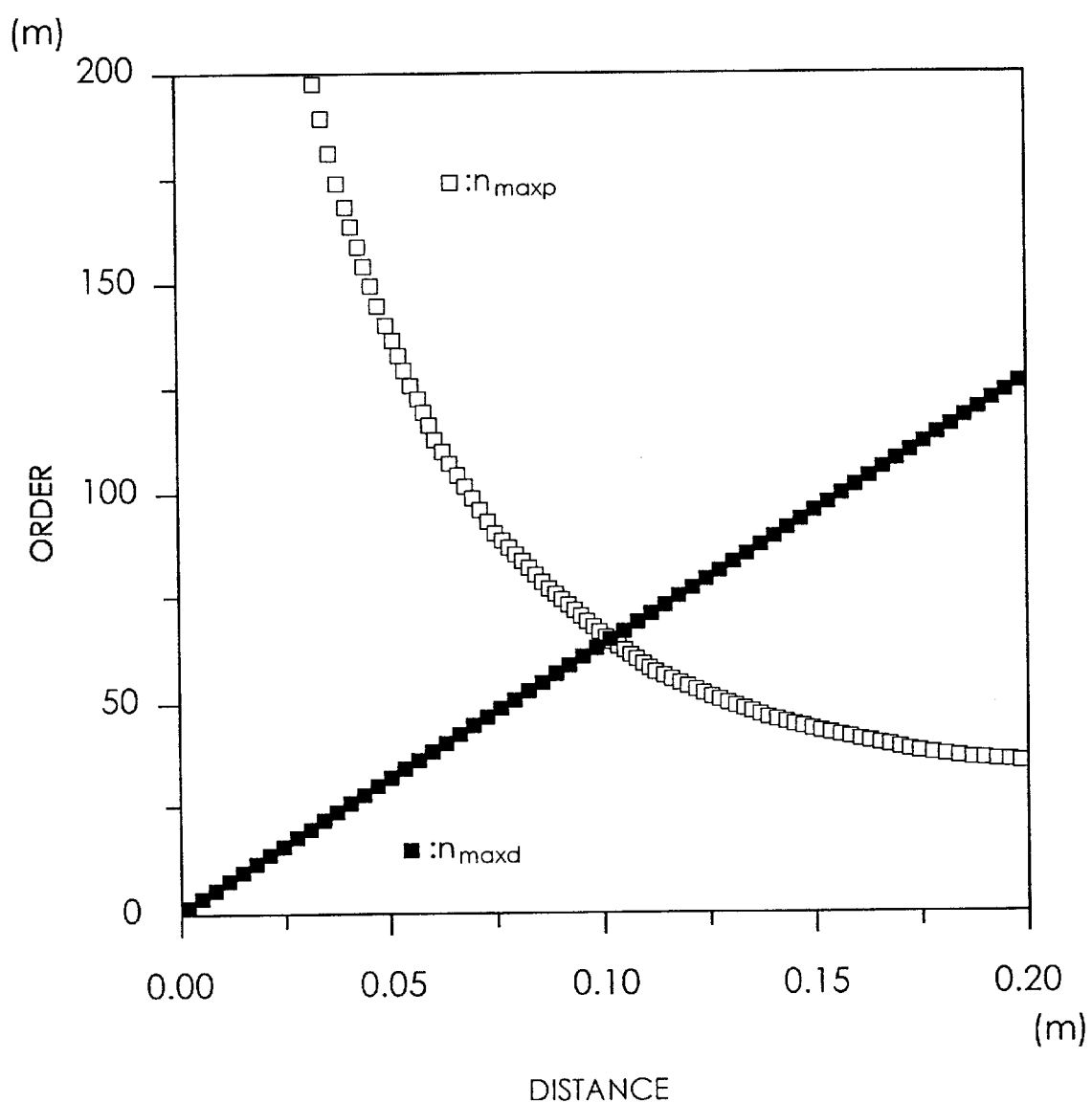
FIG. 13 is a graph showing changes in maximum resolution order and maximum imaging order upon changes in distance L in the first embodiment of the holography imaging apparatus according to the present invention.

FIG. 13 is a graph showing the dependence of the maximum resolution order $n_{maxp}$ and the maximum imaging order $n_{maxp}$ on the distance L in this embodiment.

The distance L that can satisfy the following relation becomes an optimal distance:

$$n_{maxp} = n_{maxd} \tag{15}$$

By setting this optimal distance, the light portions of the maximum resolution order $n_{maxp}$ appear at the two ends of the imaging surface 410, and the spacing between adjacent interference fringes within these light portions is larger than the resolution p. That is, the imaging surface 410 can be used with maximum efficiency.

As can be seen from FIG. 13, in this embodiment, n that satisfies the condition of equation (15) is 64, and an optimal distance Lopt is about 9.8 cm.

In the holography imaging apparatus of this embodiment, the optimal distance Lopt can be set as the distance from the imaging point by the imaging optical system 110 to the imaging surface 410.

When the distance L is set to be larger than 9.8 cm, information that can be originally sensed cannot be received, but fringe information that can be resolved by the entire imaging surface can be received.

More specifically, the moving means 440 sets the distance L between the imaging point of the object 900 to be sensed and the imaging surface 410 to be 10 cm, i.e., sets the imaging surface 410 at a position separated by 19.4 cm from the imaging optical system 110.

Subsequently, the light source unit 610 outputs irradiation light for the object 900 to be sensed, and reference light. The object 900 to be sensed irradiated with the irradiation light causes reflection, thus producing object light as spherical waves.

Some light components of the object light enter the imaging optical system 110 via the aperture 211, are output toward the imaging point, and enter the interference optical system 310. On the other hand, the reference light output from the light source unit 610 enters the interference optical system 310 and interferes with the object light.

Interference light output from the interference optical system 310 is received by the imaging surface 410 after the object light and the reference light are selected by the analyzer 430. A fringe image formed by the light received by the imaging surface 410 is sensed by the imaging device 420, and the imaging result is stored in the storage means 710 together with the information of the distance L or is transmitted from the transmission means 720 toward the holography display apparatus.

Note that a laser light source that can output the three primary colors of light in turn may be prepared as the laser light source 611, and holograms of the respective colors may be sensed in turn to acquire imaging information that can reconstruct a color image.

As the laser light source that can output the three primary colors of light in turn, laser devices which output the respective color beams may be prepared and be driven sequentially, or a laser light source which outputs light including the three primary colors of light may be prepared and filters each for selecting one of the three primary colors of light may be used in turn.

(Second Embodiment)

Figure 14:
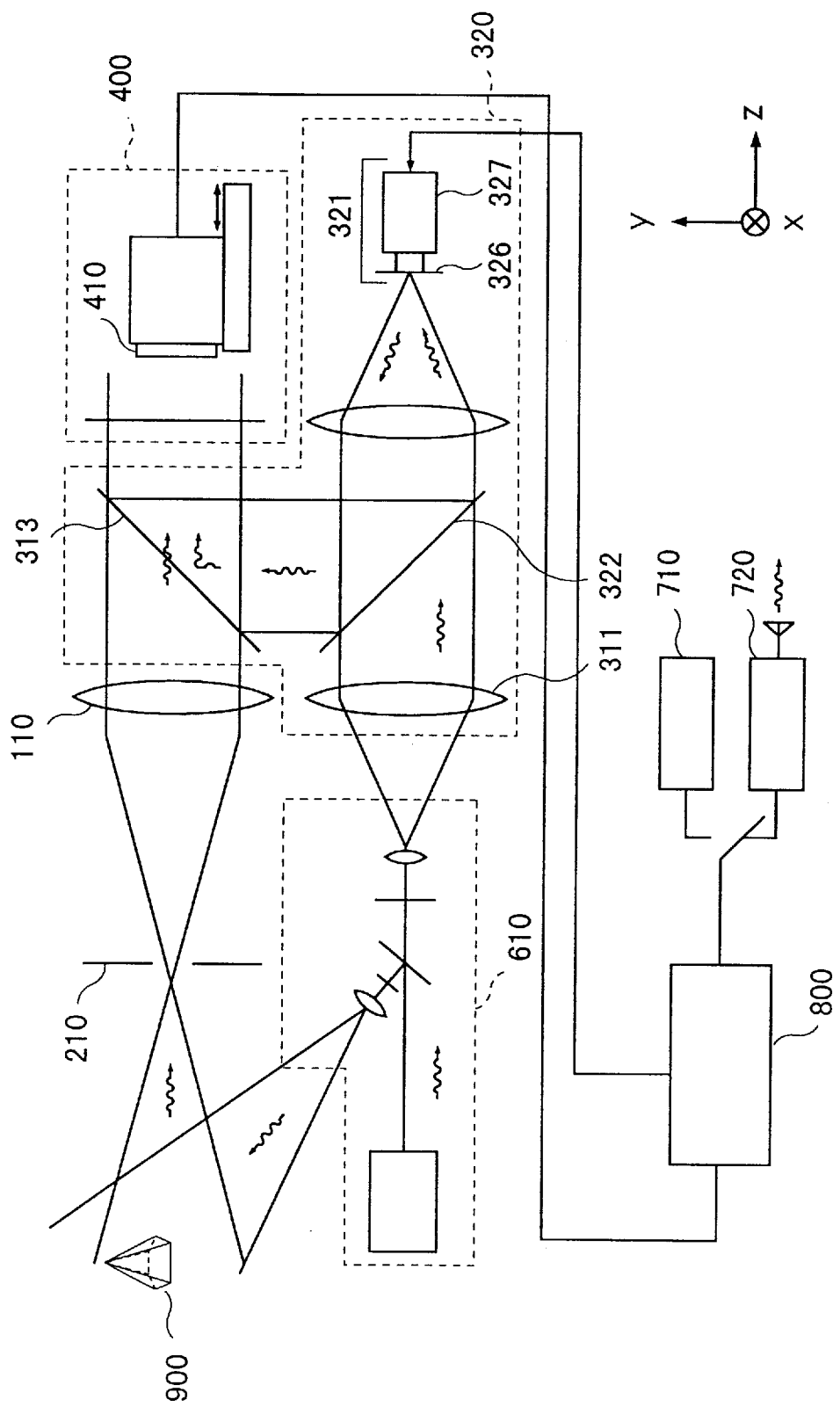
FIG. 14 shows the arrangement of a second embodiment of a holography imaging apparatus according to the present invention.

FIG. 14 shows the arrangement of a second embodiment of a holography imaging apparatus according to the present invention. The holography imaging apparatus of this embodiment is a complex hologram recording type holography imaging apparatus. As shown in FIG. 14, this apparatus comprises (a) a light source unit 610 for producing irradiation light to be irradiated onto an object 900 to be sensed, and reference light, (b) a diaphragm 210 having an aperture 211 that transmits object light reflected by the object 900 to be sensed as a result of irradiation of the light output from the light source unit 610 onto the object 900 to be sensed, (c) an imaging optical system 110 arranged at a position corresponding to the focal plane of the object space of the diaphragm 210 and having a positive refractive index, (d) an interference optical system 320 for bringing the object light via the imaging optical system 110 and the reference light to interference, (e) an imaging sensing means 400 which has an imaging surface 410 perpendicular to the optical axis of the imaging optical system 110 and senses an image formed by interference light output from the interference optical system 310, (f) a processing unit 800 for receiving and processing the imaging information output from the image sensing means 400 to obtain the intensity and phase of the object light on the imaging surface 410, and instructing the interference optical system 320 of the phase of the reference light, (g) a storage means 710 for storing the intensity information and phase information obtained by the processing unit 800, and (h) a transmission means 720 for receiving the imaging information output from the image sensing means 400 and transmitting it toward the holography display apparatus.

When the wavelength of the object light=λ, the aperture size of the aperture of the diaphragm=a, the focal length of the object space of the imaging optical system=f, and the spatial resolution of the image sensing means=p, the apparatus satisfies:

$$a \leq \lambda \cdot f/p \tag{1}$$

The interference optical system 320 comprises (i) an optical system 311 for receiving light via an optical system 616 and converting the light into plane waves, (ii) a phase adjuster 321 for receiving the light via the optical system 311, adjusting the phase of output light by the amount instructed from the processing unit 800, and outputting the adjusted light, (iii) a half mirror 322 for setting the optical path of light via the phase adjuster 321, and (iv) a half mirror 313 for receiving the object light via the imaging optical system 110 and the reference light via the half mirror 322, and outputting these two beams in substantially the same directions to bring them to interference. Note that the phase adjuster 321 performs phase adjustment in four steps for every λ/4.

The phase adjuster 321 comprises (i) a mirror 326 for reflecting the incident light, and (ii) a piezoelectric device 327 for moving the mirror 326 in accordance with an instruction from the processing unit 800.

Figure 15:
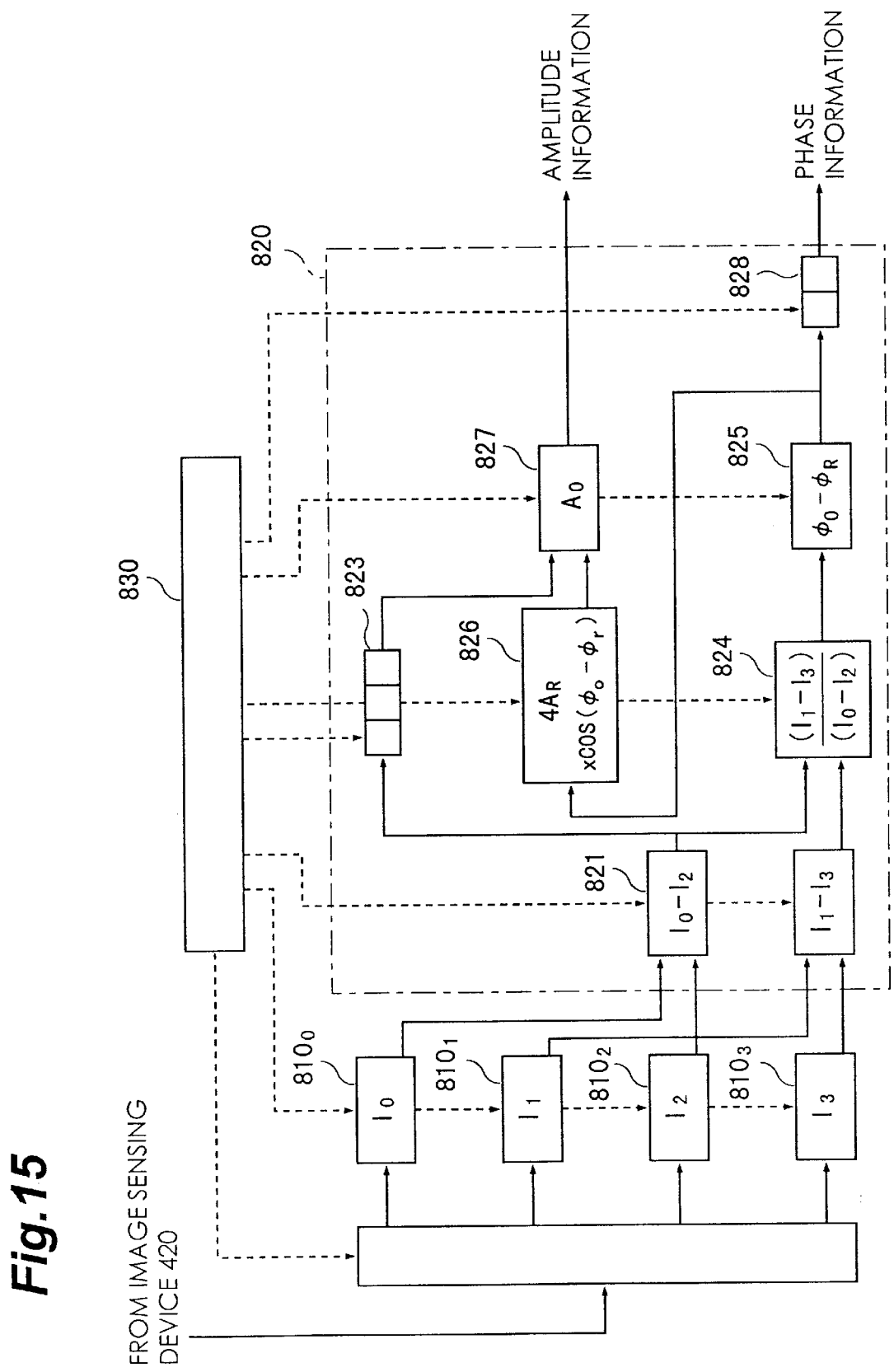
FIG. 15 is a block diagram showing the arrangement of a processing unit of the second embodiment of the holography imaging apparatus according to the present invention.

FIG. 15 is a block diagram of the processing unit 800. As shown in FIG. 15, the processing unit 800 comprises (i) frame memories $810_0$ to $810_3$ for storing light intensity data of the respective pixels on the imaging surface 410 in units of phase adjustment amounts, (ii) a calculation unit 820 for calculating the amplitudes and phases of object light at the respective pixel positions on the basis of the data of the pixels stored in the frame memories $810_0$ to $810_3$, and (iii) a control unit 830 for controlling the frame memories $810_0$ to $810_3$ and the calculation unit 820, and issuing a phase adjustment instruction signal of the phase adjuster 321.

The holography imaging apparatus of this embodiment senses a complex hologram as follows.

As in the first embodiment, the imaging surface 410 is set at a position separated by an appropriate distance L from the object 900 to be sensed using the moving means 440 in accordance with the resolution of the image sensing means while maintaining the positional relationship between the diaphragm 210 and the imaging optical system 110.

The processing unit 800 issues a phase adjustment instruction of a phase adjustment amount=0, and the phase adjuster 321 sets the mirror 326 at the position of the phase adjustment amount=0.

Subsequently, the light source unit 610 outputs irradiation light for the object 900 to be sensed, and reference light. The object 900 to be sensed irradiated with the irradiation light causes reflection, thus producing object light as spherical waves.

Some light components of the object light enter the imaging optical system 110 via the aperture 211, are output toward the imaging point, and enter the interference optical system 320. On the other hand, the reference light output from the light source unit 610 enters the interference optical system 320, and interferes with the object light by the phase adjustment amount=0.

Interference light output from the interference optical system 320 is received by the imaging surface 410 after the object light and the reference light are selected by an analyzer 430. A fringe image formed by the light received by the imaging surface 410 is sensed by an imaging device 420, and the imaging result is stored in the frame memory $810_0$ as data (I,) of the phase adjustment amount=0.

The processing unit 800 issues phase adjustment instructions of phase adjustment amounts=π/2, π, and 3π/2 in turn, and stores the corresponding imaging results ($I_1$, $I_2$, and $I_3$) in the frame memories $810_1$ to $810_3$.

Let φΩ be the phase adjustment amount, $A_O \exp[j\Omega_O]$ be the object light, and $A_R \exp[\Omega_R+\Omega\Delta]$ be the reference light. Then, the light intensity, I, on the imaging surface 410 is described by:

$$I = A_O^2 + A_R^2 + 2A_O A_R (\cos(\Omega_O-\Omega_R)\cos \Omega\Delta + \sin(\Omega_O-\Omega_R)\sin \Omega\Delta) \quad (16)$$

Therefore, $I_0$ to $I_3$ corresponding to $\Omega\Delta$=0, π/2, π, and 3π/2 are respectively given by:

$$I_0 = A_O^2 + A_R^2 + 2A_O A_R \cos (\Omega_O-\Omega_R) \quad (17)$$

$$I_1 = A_O^2 + A_R^2 + 2A_O A_R \sin (\Omega_O-\Omega_R) \quad (18)$$

$$I_2 = A_O^2 + A_R^2 - 2A_O A_R \cos (\Omega_O-\Omega_R) \quad (19)$$

$$I_3 = A_O^2 + A_R^2 - 2A_O A_R \sin (\Omega_O-\Omega_R) \quad (20)$$

From equations (17) to (20), we have:

$$I_0 - I_2 = 4A_O A_R \cos (\Omega_O-\Omega_R) \quad (21)$$

$$I_1 - I_3 = 4A_O A_R \sin (\Omega_O-\Omega_R) \quad (22)$$

From equations (21) and (22), the phase of the object light with respect to the reference light is:

$$\Omega_O-\Omega_R = \tan^{-1}((I_1-I_3)/(I_0-I_2)) \quad (23)$$

Since the reference light is plane waves and hence, the phase $\Omega_R$ of the reference light is constant at every points on the imaging surface 410, the relative phase between adjacent pixels is obtained by $\Omega_O-\Omega_R$ of the respective pixels given by equation (23).

From equations (21) and (23), the amplitude, $A_O$, of the object light is defined by:

$$A_O = (I_0-I_2)/(4A_R \cos(\Omega_O-\Omega_R)) \quad (24)$$

The calculations of equations (21) to (24) above are performed by the calculation unit 820 as follows under the sequence control of the control unit 830.

The imaging results $I_i$ are simultaneously read out from the frame memories $810_i$ (i=0, 1, 2, 3) at the video rate.

$I_0$ and $I_2$ are input to a subtracter 821 to calculate ($I_0-I_2$), and ($I_0-I_2$) is input to a synchronization register 823 and a divider 824. $I_1$ and $I_3$ are input to a subtracter 822 to calculate ($I_1-I_3$), and ($I_1-I_3$) is input to the divider 824. The divider 824 calculates ($I_1-I_3$)/($I_0-I_2$), and inputs the calculation result to an inverse tangent calculator 825. The inverse tangent calculator 825 executes the calculation of equation (23), inputs ($\Omega_O-\Omega_R$) as the calculation result to a cosine calculator 826, and outputs it as the first calculation result of the calculation unit 820 via a synchronization register 828.

The cosine calculator 826 calculates $4A_R \cos(\Omega_O-\Omega_R)$, and inputs the calculation result to a divider 827. The divider 827 receives the storage data ($I_0-I_2$) in the register 823 in addition to the calculation result of the cosine calculator 826, and executes the calculation of equation (24). The amplitude $A_O$ of the object light as the calculation result is output as the second calculation result of the calculation unit 820.

The calculation results of the calculation unit 820 are stored in the storage means 710 together with the information of the distance L or are transmitted from the transmission means 720 to the holography display apparatus.

As in the first embodiment, a laser light source that can output the three primary colors of light in turn may be prepared as the laser light source 611, and holograms of the respective colors may be sensed in turn to acquire imaging information that can reconstruct a color image. As the laser light source that can output the three primary colors of light in turn, laser devices which output the respective color beams may be prepared and be driven sequentially, or a laser light source which outputs light including the three primary colors of light may be prepared and filters each for selecting one of the three primary colors of light may be used in turn.

(Third Embodiment)

Figure 16:
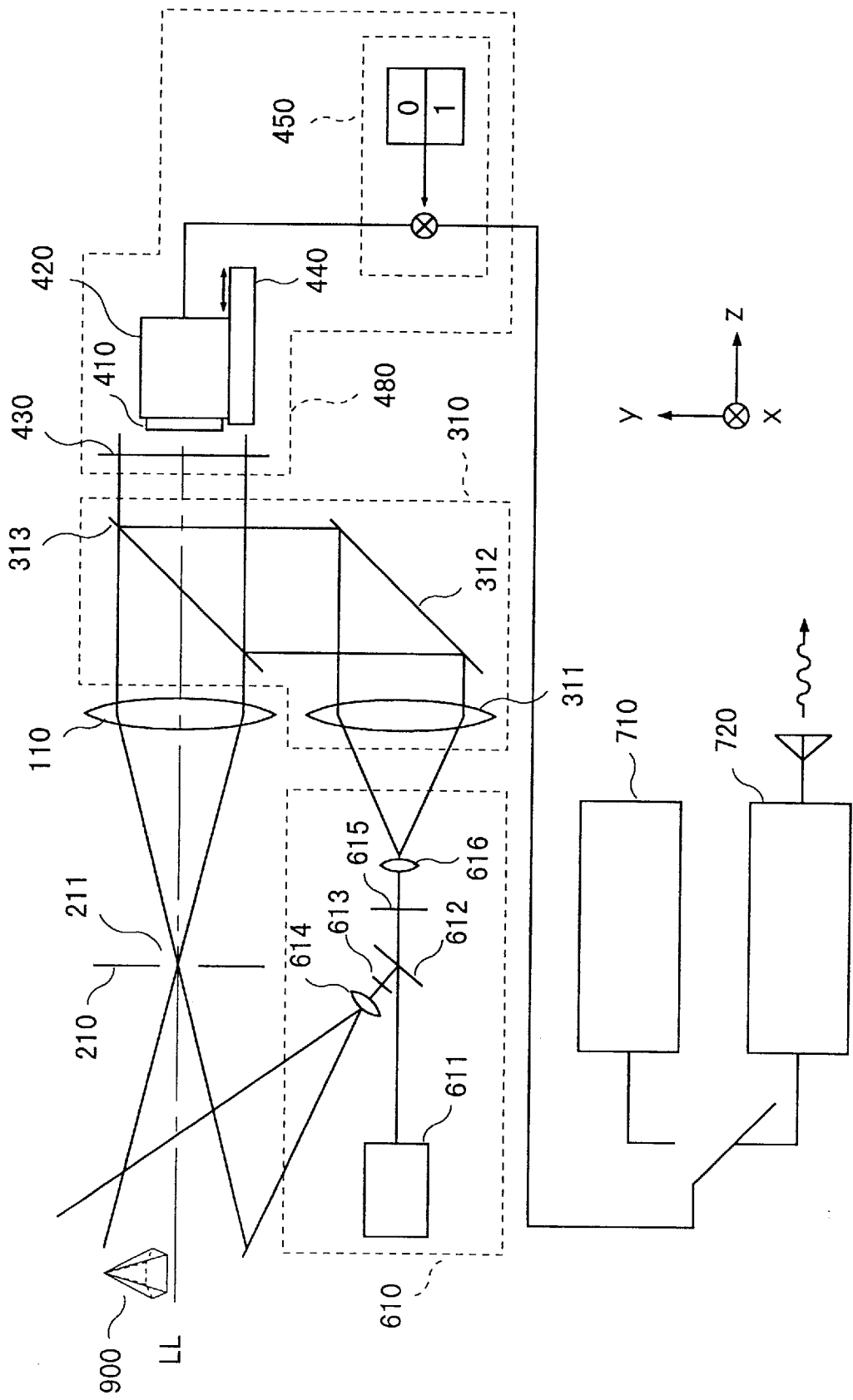
FIG. 16 shows the arrangement of a third embodiment of a holography imaging apparatus according to the present invention.

FIG. 16 is a diagram showing the arrangement of the third embodiment of a holography imaging apparatus according to the present invention. As shown in FIG. 16, this apparatus comprises (a) a light source unit 610 for producing irradiation light to be irradiated onto an object 900 to be sensed present above an optical axis LL on the plane of the drawing of FIG. 16, and reference light, (b) a diaphragm 210 having an aperture 211 which transmits the object light reflected by the object 900 to be sensed as a result of irradiation of light output from the light source unit 610 onto the object 900 to be sensed, (c) an imaging optical system 110 arranged at a position corresponding to the focal plane of the object space of the diaphragm 210 and having a positive refractive index, (d) an interference optical system 310 for bringing the object light via the imaging optical system 110 and the reference light to interference, (e) an image sensing means 480 which has an imaging surface 410 perpendicular to the optical axis of the imaging optical system 110 and senses an image formed by interference light output from the interference optical system 310, (f) a storage means 710 for receiving and storing imaging information output from the image sensing means 480, and (g) a transmission means 720 for receiving the imaging information output from the image sensing means 400 and transmitting it to a holography display apparatus.

When the wavelength of the object light=λ, the aperture size of the aperture of the diaphragm=a, the focal length of the object space of the imaging optical system=f, and the spatial resolution of the image sensing means=p, the following relation holds:

$$a \leq \lambda \cdot f/p \quad (1)$$

The image sensing means 480 comprises (i) an analyzer 430 for receiving interference light output from the interference optical system 310, selecting the direction of polarization, and outputting the light, (ii) an imaging device 420 which has the imaging surface 410 for receiving the light via the analyzer 430, and senses an optical image on the imaging surface 410, (iii) an image processing unit 450 for extracting the imaging result on the imaging surface 410 only below the optical axis LL in the plane of the drawing of FIG. 16, and (iv) a moving means 440 for moving the position of the imaging surface 410 relative to the interference optical system 300.

The image processing unit 450 comprises (i) an image memory 451 for storing a pixel effective value (e.g., 1) in an area corresponding to the lower region in the plane of the drawing of the imaging surface 410, storing a pixel non-effective value (e.g., 0) in an area corresponding to the upper region in the plane of the drawing of the imaging surface 410, and outputting pixel effective/non-effective signals for the respective pixels, and (ii) a multiplier 452 for calculating the products between pixel signals output from the imaging device 420 and the pixel effective/non-effective signals corresponding to the pixel positions output from the image memory 451, and outputting the product values.

The pixel effective/non-effective values are not only expressed by binary values but may be smoothly changed in the vicinity of the boundary to prevent generation of a diffraction image at end points.

A case will be exemplified below wherein the imaging optical system 110 has a convex lens having a focal length f=18 cm, the imaging surface 410 is defined by an array of 512 (=N)×512 imaging devices at a pitch p=11 μm, the light to be used has a wavelength λ=0.628 μm, and the object 900 is set at the position about 46.6 cm ahead of the imaging optical system 110, as in the first embodiment. In this case, the imaging point of the object 900 to be sensed by the imaging optical system 110 corresponds to a position separated by 29.4 cm from the imaging optical system 110. Also, the circular aperture 211 is adopted to have its size a defined by:

$$a=\lambda f/p=1.0 \text{ cm}$$

The optical axis of the object light is defined as the z-axis, the up-and-down direction of the plane of the drawing of FIG. 16 is defined as the y-direction, and the direction perpendicular to the plane of the drawing of FIG. 16 is defined as the x-direction, as in the first embodiment.

The holography imaging apparatus of this embodiment senses an intensity hologram of the object 900 to be sensed as follows.

As in the first embodiment, the imaging surface 410 is set at a position separated by an appropriate distance L from the object 900 to be sensed using the moving means 440 in accordance with the resolution of the image sensing means while maintaining the positional relationship between the diaphragm 210 and the imaging optical system 110 unchanged.

The distance L can be obtained in the same manner as in the first embodiment.

Subsequently, the light source unit 610 outputs irradiation light for the object 900 to be sensed, and reference light. The object 900 to be sensed irradiated with the irradiation light causes reflection, thus producing object light as spherical waves.

Some light components of the object light enter the imaging optical system 110 via the aperture 211, are output toward the imaging point, and enter the interference optical system 310. On the other hand, the reference light output from the light source unit 610 enters the interference optical system 310 and interferes with the object light.

Interference light output from the interference optical system 310 is received by the imaging surface 410 after the object light and the reference light are selected by the analyzer 430. A fringe image formed by the light received by the imaging surface 410 is sensed by the imaging device 420, and the imaging result is stored in the storage means 710 together with the information of the distance L or is transmitted from the transmission means 720 toward the holography display apparatus.

Note that a laser light source that can output the three primary colors of light in turn may be prepared as a laser light source 611, and holograms of the respective colors may be sensed in turn to acquire imaging information that can reconstruct a color image. As the laser light source that can output the three primary colors of light in turn, laser devices which output the respective color beams may be prepared and be driven sequentially, or a laser light source which outputs light including the three primary colors of light may be prepared and filters each for selecting one of the three primary colors of light may be used in turn.

(Fourth Embodiment)

Figure 17:
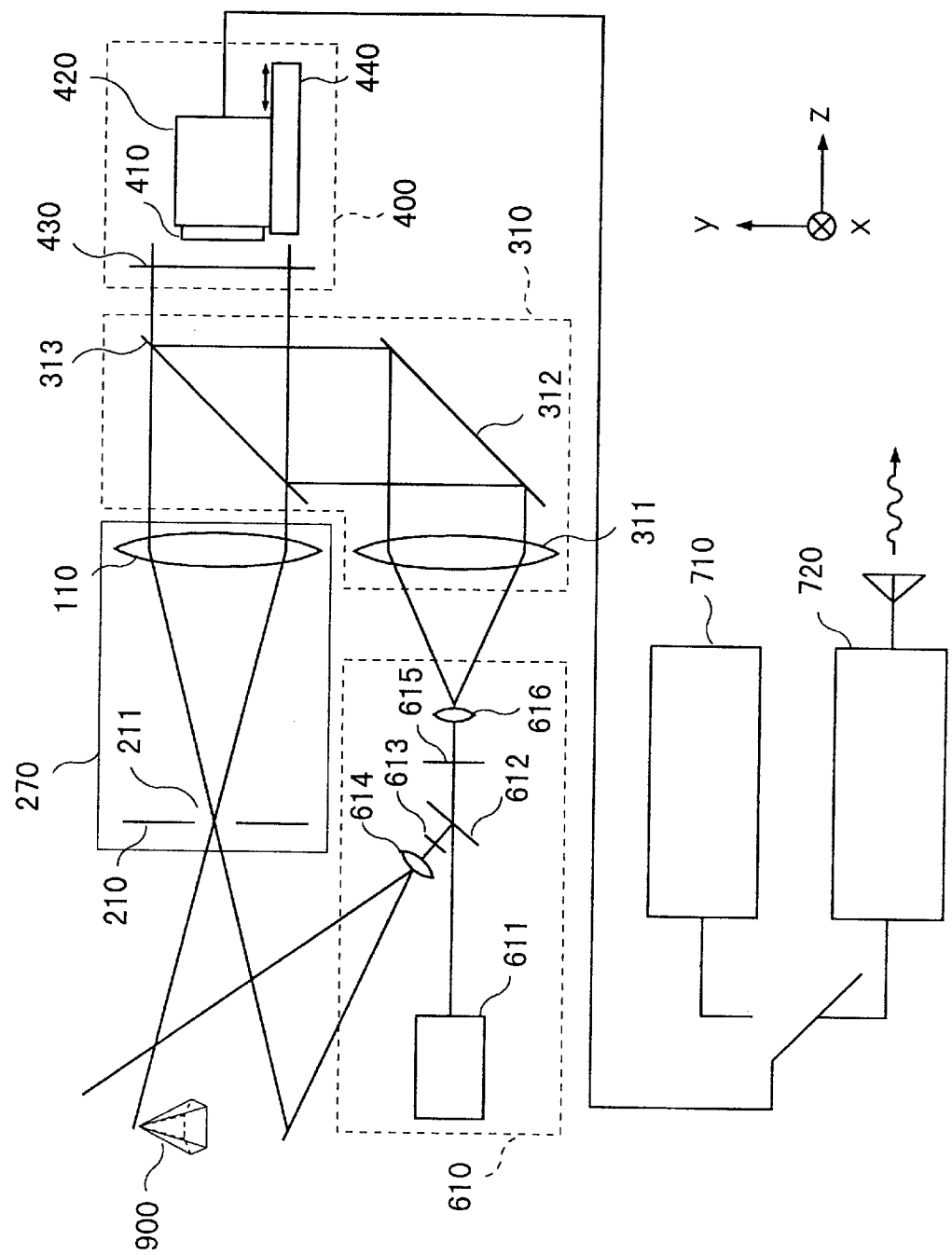
FIG. 17 is a diagram showing the arrangement of the fourth embodiment of a holography imaging apparatus according to the present invention.

FIG. 17 shows the arrangement of the fourth embodiment of a holography imaging apparatus according to the present invention. The holography imaging apparatus of this embodiment is an intensity recording type imaging apparatus. As shown in FIG. 17, this apparatus comprises (a) a light source unit 610 for producing irradiation light to be irradiated onto an object 900 to be sensed and reference light, (b) a diaphragm 210 having an aperture 211 which transmits the object light reflected by the object 900 to be sensed as a result of irradiation of light output from the light source unit 610 onto the object 900 to be sensed, (c) an imaging optical system 110 having a variable focal length, arranged at a position corresponding to the focal plane of the object space of the diaphragm 210 and having a positive refractive index, (d) an interlocking means 270 for setting the focal length of the imaging optical system 110, and changing the distance between the diaphragm 210 and the imaging optical system 110 and the aperture size of the aperture 211 in correspondence with the focal length of the object space, (e) an interference optical system 310 for bringing the object light via the imaging optical system 110 and the reference light to interference, (f) an imaging sensing means 400 which has an imaging surface 410 perpendicular to the optical axis of the imaging optical system 110 and senses an image formed by interference light output from the interference optical system 310, (g) a storage means 710 for receiving and storing imaging information output from the image sensing means 400, and (h) a transmission means 720 for receiving the imaging information output from the image sensing means 400 and transmitting it to a holography display apparatus.

When the wavelength of the object light=$\lambda$, the aperture size of the aperture of the diaphragm=a, the focal length of the object space of the imaging optical system=f, and the spatial resolution of the image sensing means=p, the apparatus satisfies:

$$a \leq \lambda \cdot f/p \quad (1)$$

Figure 18:
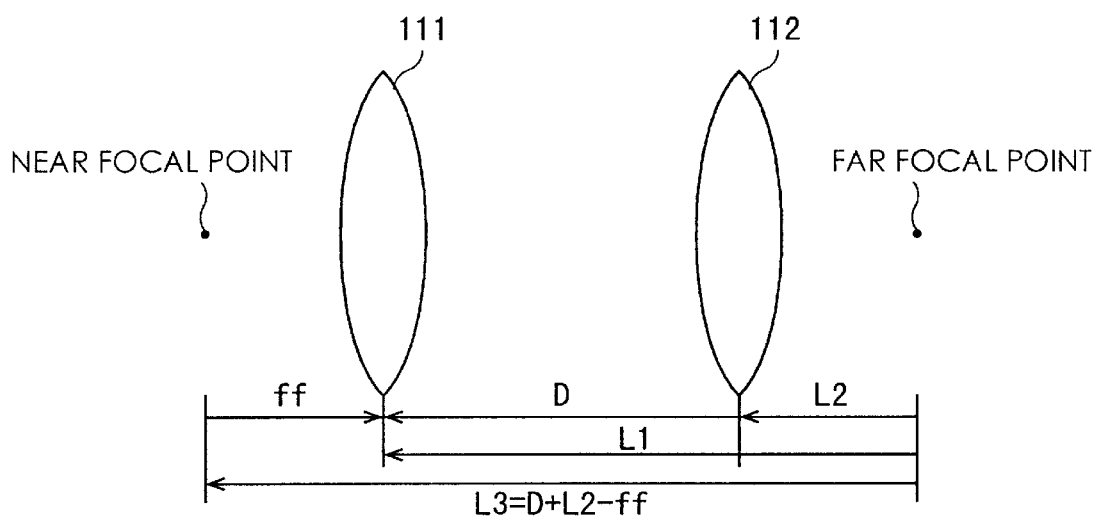
FIG. 18 is a view showing the arrangement of an imaging optical system 120.

FIG. 18 shows the arrangement of the imaging optical system 110. As shown in FIG. 18, the imaging optical system comprises (i) a near-side convex lens 111 having a focal length f1=300 mm, and (ii) a far-side convex lens 112 separated by a distance D from the convex lens 111, and having a focal length f2=150 mm.

A synthesized focal length f of the imaging optical system 110 is given by:

$$f = f1 \cdot f2/(f1+f2-D)$$

the distance, ff, from the near-side focal point to the convex lens 111 is defined by:

$$ff = f1(f2-D)/(f1+f2+D)$$

and the distance, L2, from the far-side focal point to the convex lens 112 is described by:

$$L2 = f2(f1-D)/(f1+f2-D)$$

Figure 19:
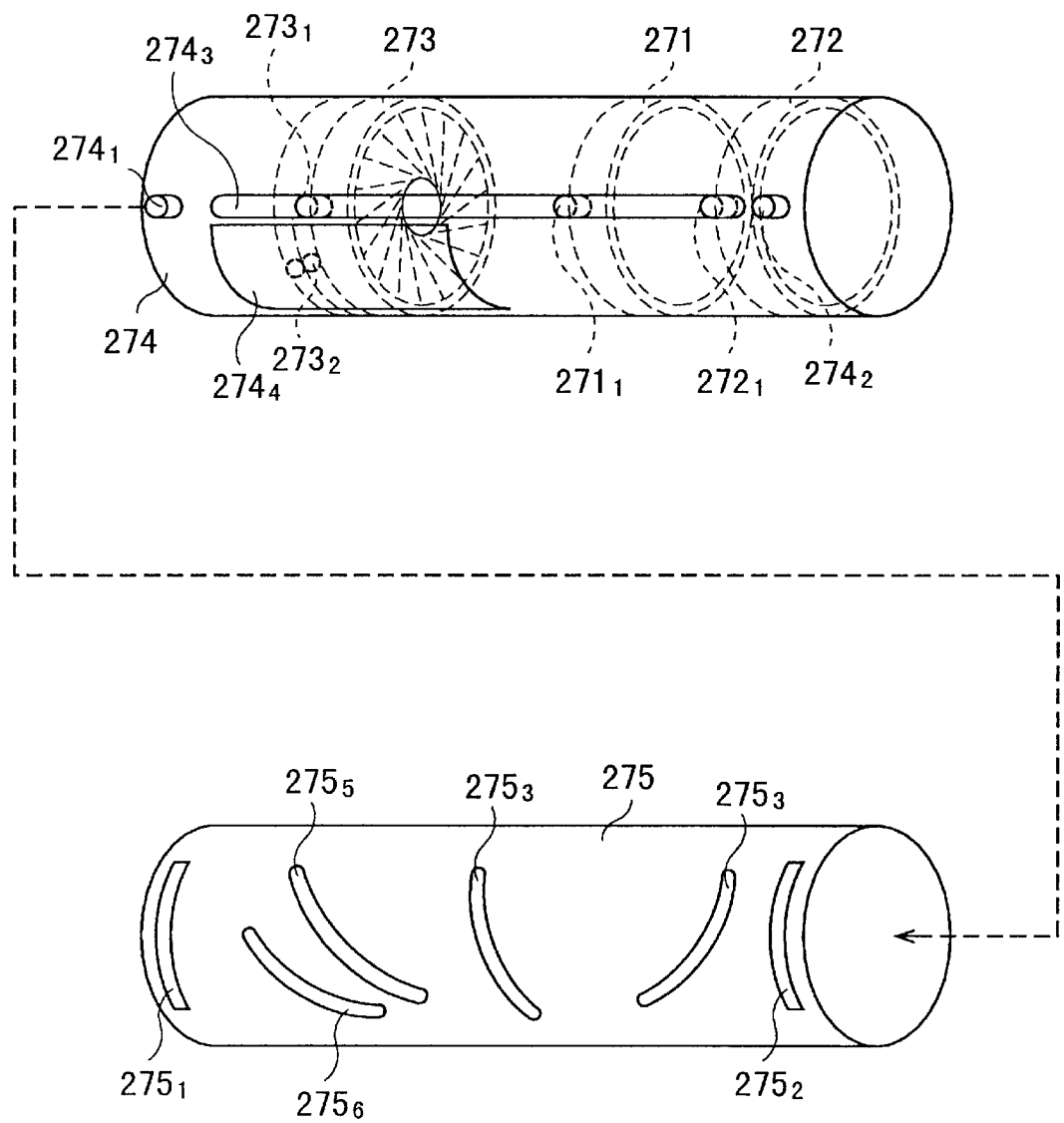
FIG. 19 is a view showing the arrangement of an interlocking means 270.

FIG. 19 shows the arrangement of the interlocking means 270. As shown in FIG. 19, the interlocking means 270 comprises (i) a holder 271 for the convex lens 111, which holder has a collapsible pin $271_1$, (ii) a holder 272 for the convex lens 112, which holder has a collapsible pin $272_1$, (iii) a holder 273 for the diaphragm 210, which holder has a collapsible pin 2731 and a collapsible lever $273_2$ for controlling the aperture size, and (iv) an intermediate holder 274 which has collapsible pins $274_1$ and $274_2$, houses the holders 271, 272, and 273, and also has a notch $274_3$ for limiting the movements of the collapsible pins $271_1$, $272_1$, and $273_1$ in the horizontal direction, and a notch $274_4$ for allowing the movement of the collapsible lever $273_2$ within the moving range of the collapsible lever $273_2$. Furthermore, the interlocking means 270 comprises an external holder $275_6$ which houses the intermediate holder 274, and has a notch $275_1$ for limiting the movement of the collapsible pin $274_1$ to rotation about the optical axis, a notch $275_2$ for limiting the movement of the collapsible pin $274_2$ to rotation about the optical axis, a notch $275_3$ for limiting the movement of the collapsible pin $274_1$, a notch $275_4$ for limiting the movement of the collapsible pin $272_1$, a notch $275_5$ for limiting the movement of the collapsible pin $273_1$, and a notch $275_6$ for limiting the movement of the collapsible lever $273_2$.

In the interlocking means 270, when the external holder 275 is rotated with reference to the intermediate holder 274, the intersections between the notch $274_3$, and notches $275_3$, $275_4$, and $275_5$ define the horizontal positions of the aperture 210 and the convex lenses 111 and 112. The notch $275_6$ defines the position of the collapsible lever $273_2$ to define the aperture size of the aperture 211 of the diaphragm 210.

The interlocking means 270 shown in FIG. 19 is designed under the conditions that the convex lenses 111 and 112 are used to set a minimum value fmin=110 mm and a maximum value fmax=220 mm of the synthesized focal length, and the rotation angle, $\theta$, of the external holder 275 with respect to the intermediate holder 274 falls within the range from 0° to 90° so as to satisfy the following condition and to obtain f=fmin when $\theta$=0° and f=fmax when $\theta$=90°0:

$$f = fmin + k\theta$$

Under these conditions, we have:

$$k = (fmax - fmin)/90° = 1.222 [mm/°]$$

The distance L2 can be expressed using the rotation angle $\theta$ as a variable from the following equation that defines the distance L2 from the far-side focal point to the convex lens 112:

$$L2 = f2(f1-D)/(f1+f2-D)$$

Also, the distance, L1, from the far-side focal point to the convex lens 111 can be expressed using the rotation angle $\theta$ as a variable from the following equation:

$$L1 = D + L2$$

Furthermore, the distance, L3, from the far-side focal point to the near-side focal point, i.e., to the diaphragm 210, can be expressed using the rotation angle $\theta$ as a variable from the following equation:

$$L3 = D + L2 - ff$$

Figure 20:
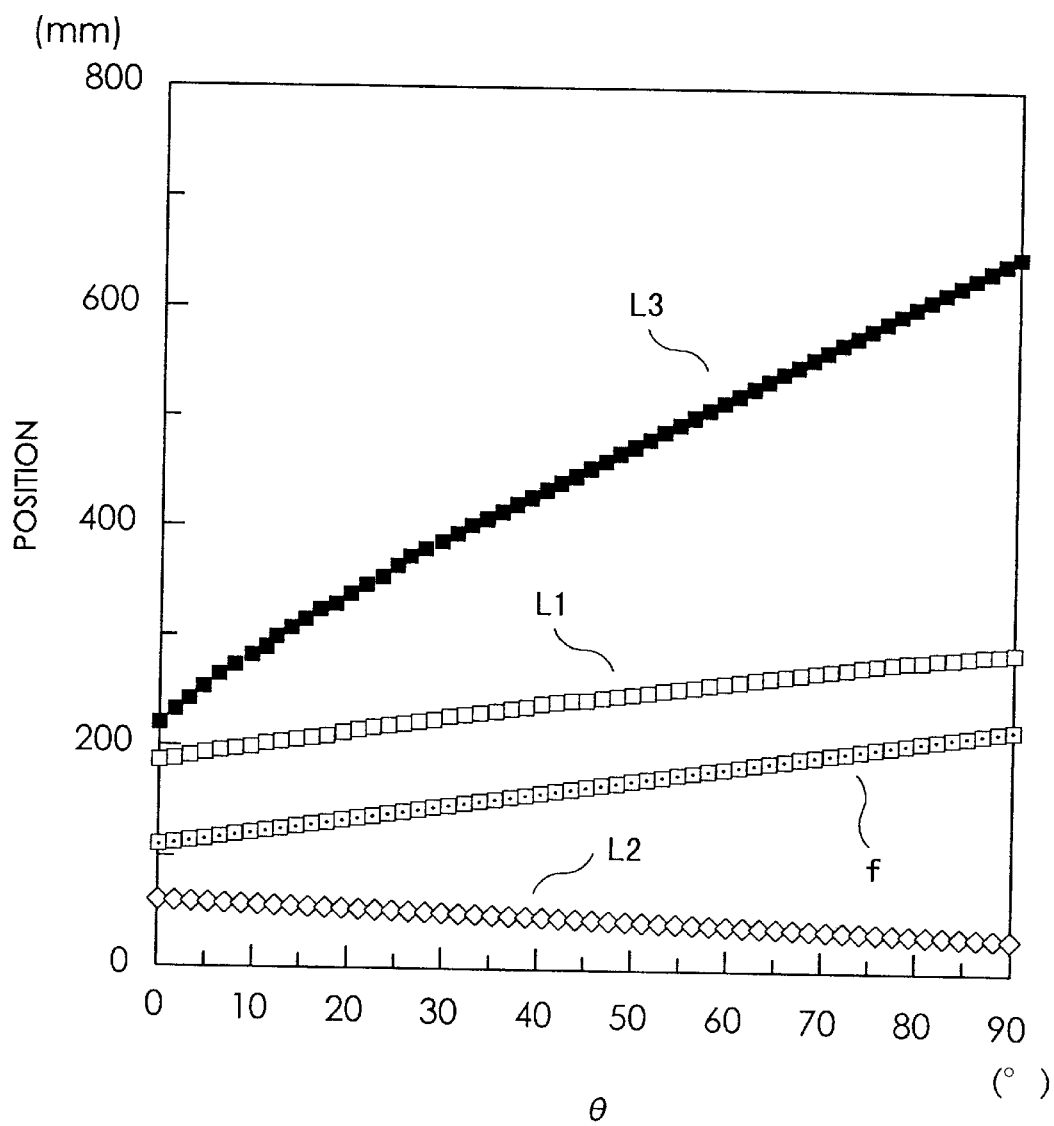
FIG. 20 is a graph showing the relationship among the distances L1, L2, L3, the synthesized focal length f, and the rotation angle θ.

FIG. 20 shows the relationship among the distances L1, L2, and L3, the synthesize focal length f, and the rotation angle $\theta$ when the above-mentioned numerical values are set.

On the other hand, the aperture size a of the aperture 211 is defined by:

$$a = \lambda f/p$$

The rotation angle $\theta m$ of the collapsible lever $273_2$ and the rotation angle $\theta$ are designed to have:

$$\theta m = k2 \cdot \theta + \theta 0$$

and to satisfy:

$$a = amin + k1 \cdot \theta m$$

and they are designed under the conditions that a=0 when $\theta m$=0° and a=38×10$^{-3}$ when $\theta m$=90°.

Under these conditions, we have:

$$k1 = 4.222 \times 10^{-4} [/°]$$

Hence, $\theta m$ is described by:

$$\theta m = \lambda f/(k1 \cdot p)$$

In this way, the rotation angle $\theta m$ can be expressed using the rotation angle $\theta$ as a variable.

Figure 21:
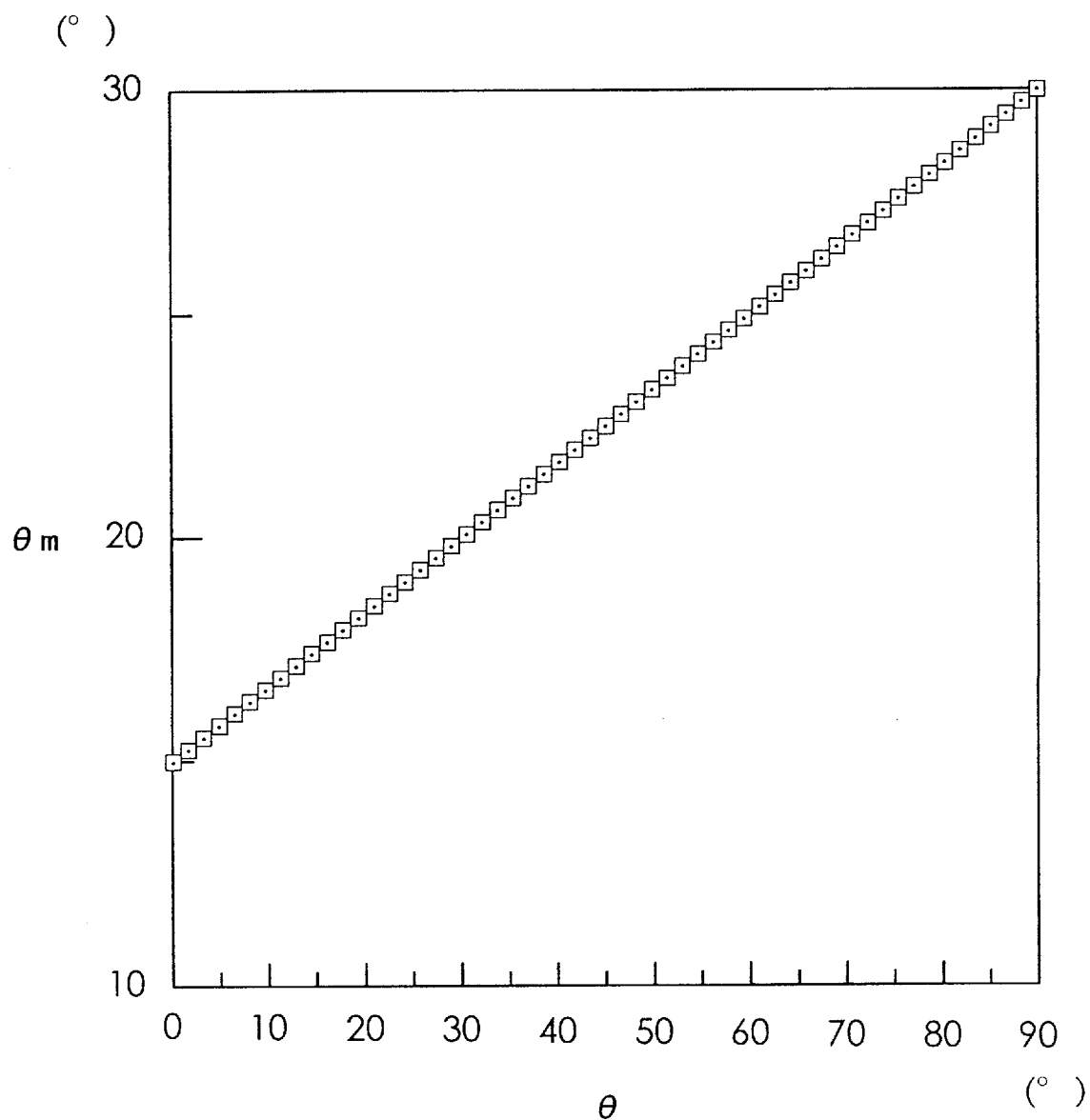
FIG. 21 is a graph showing the relationship between the rotation angles θm and θ.

FIG. 21 shows the relationship between the rotation angles $\theta m$ and $\theta$ when the above-mentioned numerical values are set.

A case will be exemplified below wherein the imaging optical system 110 adopts a convex lens having a focal length f=18 cm, the imaging surface 410 is defined by an array of 512 (=N)×512 imaging devices at a pitch p=11 μm, the light to be used has a wavelength λ=0.628 μm, and the object 900 is set at a position about 46.4 cm ahead of the imaging optical system 110, as in the first embodiment. In this case, the imaging point of the object 900 to be sensed by the imaging optical system 110 corresponds to a position separated by 29.4 cm from the imaging optical system 110. Also, the circular aperture 211 is adopted to have its size a defined by:

$$a = \lambda f/p = 1.0 \text{ cm}$$

Note that the optical axis of the object light is defined as the z-axis, the up-and-down direction of the plane of the drawing of FIG. 17 is defined as the y-direction, and the direction perpendicular to the plane of the drawing of FIG. 17 is defined as the x-direction, as in the first embodiment.

The holography imaging apparatus of this embodiment senses an intensity hologram of the object 900 to be sensed as follows.

The interlocking means sets the positions of the diaphragm 210 and the imaging optical system 110 in correspondence with the resolution of the image sensing means, so that the imaging surface 410 is separated by an appropriate distance L from the object 900 to be sensed.

The distance L can be obtained in the same manner as in the first embodiment.

Thereafter, the interlocking means 270 sets the distance L between the imaging point of the object 900 to be sensed and the imaging surface 410 to be 10 cm, i.e., sets the imaging surface 410 to be separated by 19.4 cm from the imaging optical system 110.

Subsequently, the light source unit 610 outputs irradiation light for the object 900 to be sensed, and reference light. The object 900 to be sensed irradiated with the irradiation light causes reflection, thus producing object light as spherical waves.

Some light components of the object light enter the imaging optical system 110 via the aperture 211, are output toward the imaging point, and enter the interference optical system 310. On the other hand, the reference light output from the light source unit 610 enters the interference optical system 310 and interferes with the object light.

Interference light output from the interference optical system 310 is received by the imaging surface 410 after the object light and the reference light are selected by the analyzer 430. A fringe image formed by the light received by the imaging surface 410 is sensed by the imaging device 420, and the imaging result is stored in the storage means 710 together with the information of the distance L or is transmitted from the transmission means 720 toward the holography display apparatus.

Note that a laser light source that can output the three primary colors of light in turn may be prepared as a laser light source 611, and holograms of the respective colors may be sensed in turn to acquire imaging information that can reconstruct a color image. As the laser light source that can output the three primary colors of light in turn, laser devices which output the respective color beams may be prepared and be driven sequentially, or a laser light source which outputs light including the three primary colors of light may be prepared and filters each for selecting one of the three primary colors of light may be used in turn.

(Fifth Embodiment)

Figure 22:
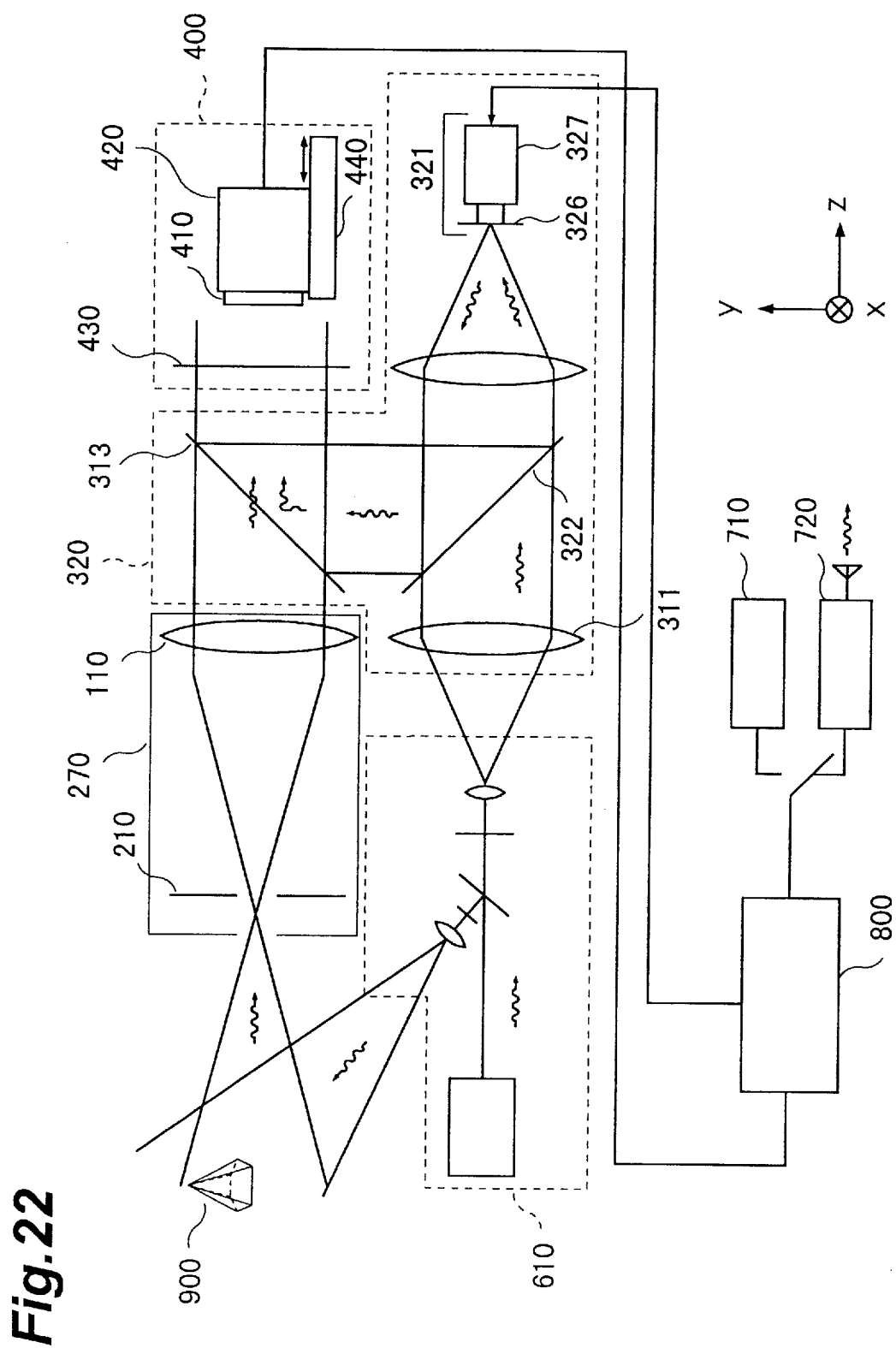
FIG. 22 is a diagram showing the arrangement of the fifth embodiment of a holography imaging apparatus according to the present invention.

FIG. 22 shows the arrangement of the fifth embodiment of a holography imaging apparatus according to the present invention. The holography imaging apparatus of this embodiment is a complex hologram recording type holography imaging apparatus. As shown in FIG. 22, this apparatus comprises (a) a light source unit 610 for producing irradiation light to be irradiated onto an object 900 to be sensed and reference light, (b) a diaphragm 210 having an aperture 211 which transmits the object light reflected by the object 900 to be sensed as a result of irradiation of light output from the light source unit 610 onto the object 900 to be sensed, (c) an imaging optical system 110 arranged at a position corresponding to the focal plane of the object space of the diaphragm 210 and having a positive refractive index, (d) an interlocking means 270 for setting the focal length of the imaging optical system 110, and changing the distance between the diaphragm 210 and the imaging optical system 110 and the aperture size of the aperture 211 in correspondence with the focal length of the object space, (e) an interference optical system 320 for bringing the object light via the imaging optical system 110 and the reference light to interference, (f) an imaging sensing means 400 which has an imaging surface 410 perpendicular to the optical axis of the imaging optical system 110 and senses an image formed by interference light output from the interference optical system 310, (g) a processing unit 800 for receiving and processing the imaging information output from the image sensing means 400 to obtain the intensity and phase of the object light on the imaging surface 410, and instructing the interference optical system 320 of the phase of the reference light, (h) a storage means 710 for storing the intensity information and phase information obtained by the processing unit 800, and (i) a transmission means 720 for receiving the imaging information output from the image sensing means 400 and transmitting it toward the holography display apparatus.

When the wavelength of the object light=θ, the aperture size of the aperture of the diaphragm=a, the focal length of the object space of the imaging optical system=f, and the spatial resolution of the image sensing means=p, the following relation holds:

$$a \leq \lambda \cdot f/p \tag{1}$$

More specifically, in this embodiment, a modification from the first embodiment to the second embodiment is applied to the fourth embodiment.

The interference optical system 320 comprises (i) an optical system 311 for receiving the light via an optical system 616 and converting it into plane waves, (ii) a phase adjuster 321 for receiving the light via the optical system 311, adjusting the phase of output light by the amount instructed from the processing unit 800, and outputting the adjusted light, (iii) a half mirror 322 for setting the optical path of light via the phase adjuster 321, and (iv) a half mirror 313 for receiving the object light via the imaging optical system 110 and the reference light via the half mirror 322, and outputting these two beams in substantially the same directions to bring them to interference. Note that the phase adjuster 321 performs phase adjustment in four steps for every λ/4.

The phase adjuster 321 comprises (i) a mirror 326 for reflecting the incident light, and (ii) a piezoelectric device 327 for moving the mirror 326 in accordance with an instruction from the processing unit 800.

Figure 23:
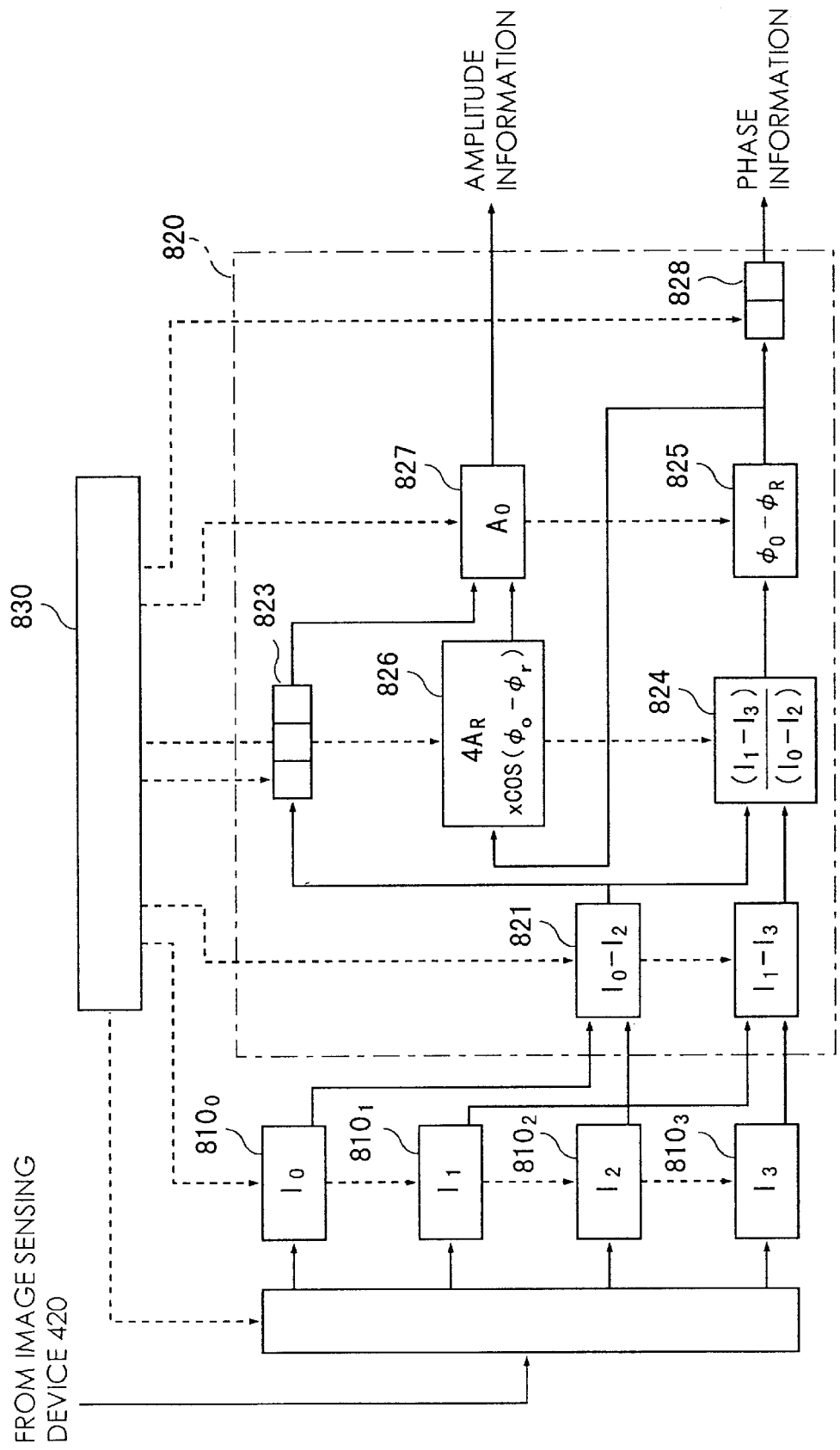
FIG. 23 is a diagram showing the arrangement of the sixth embodiment of a holography imaging apparatus according to the present invention.

FIG. 23 is a block diagram showing the arrangement of the processing unit 800. As shown in FIG. 23, the processing unit 800 comprises (i) frame memories $810_0$ to $810_3$ for storing light intensity data of the respective pixels on the imaging surface 410 in units of phase adjustment amounts, (ii) a calculation unit 820 for calculating the amplitudes and phases of object light at the respective pixel positions on the basis of the data of the pixels stored in the frame memories $810_0$ to $810_3$, and (iii) a control unit 830 for controlling the frame memories $810_0$ to $810_3$ and the calculation unit 820, and issuing a phase adjustment instruction signal of the phase adjuster 321.

The holography imaging apparatus of this embodiment senses a complex hologram as follows.

As in the fourth embodiment, a moving means 440 sets the imaging surface 410 at a position separated by an appropriate distance L from the object 900 to be sensed in correspondence with the resolution of the image sensing means while the interlocking means 270 maintains the positional relationship between the diaphragm 210 and the imaging optical system 110 unchanged.

As in the second embodiment, the processing unit 800 issues a phase adjustment instruction of a phase adjustment amount=0, and the phase adjuster 321 sets the mirror 326 at the position of the phase adjustment amount=0.

Subsequently, the light source unit 610 outputs irradiation light for the object 900 to be sensed, and reference light. The object 900 to be sensed irradiated with the irradiation light causes reflection, thus producing object light as spherical waves.

Some light components of the object light enter the imaging optical system 110 via the aperture 211, are output toward the imaging point, and enter the interference optical system 320. On the other hand, the reference light output from the light source unit 610 enters the interference optical system 320, and interferes with the object light by the phase adjustment amount=0.

Interference light output from the interference optical system 320 is received by the imaging surface 410 after the object light and the reference light are selected by an analyzer 430. A fringe image formed by the light received by the imaging surface 410 is sensed by an imaging device 420, and the imaging result is stored in the frame memory $810_0$ as data ($I_0$) of the phase adjustment amount=0.

As in the second embodiment, the processing unit 800 issues phase adjustment instructions of phase adjustment amounts=$\pi/2$, $\pi$, and $3\pi/2$ in turn, and stores the corresponding imaging results ($I_1$, $I_2$, and $I_3$) in the frame memories $810_1$ to $810_3$.

Then, the phase ($\Omega_O-\Omega_R$) is output as the first calculation result of the calculation unit 820, and the amplitude $A_O$ of the object light is output as the second calculation result of the calculation unit 820.

The calculation results of the calculation unit 820 are stored in the storage means 710 together with the information of the distance L or are transmitted from the transmission means 720 to the holography display apparatus.

As in the fourth embodiment, a laser light source that can output the three primary colors of light in turn may be prepared as the laser light source 611, and holograms of the respective colors may be sensed in turn to acquire imaging information that can reconstruct a color image. As the laser light source that can output the three primary colors of light in turn, laser devices which output the respective color beams may be prepared and be driven sequentially, or a laser light source which outputs light including the three primary colors of light may be prepared and filters each for selecting one of the three primary colors of light may be used in turn.

[Embodiments of Holography Display Apparatus]

(First Embodiment)

Figure 24:
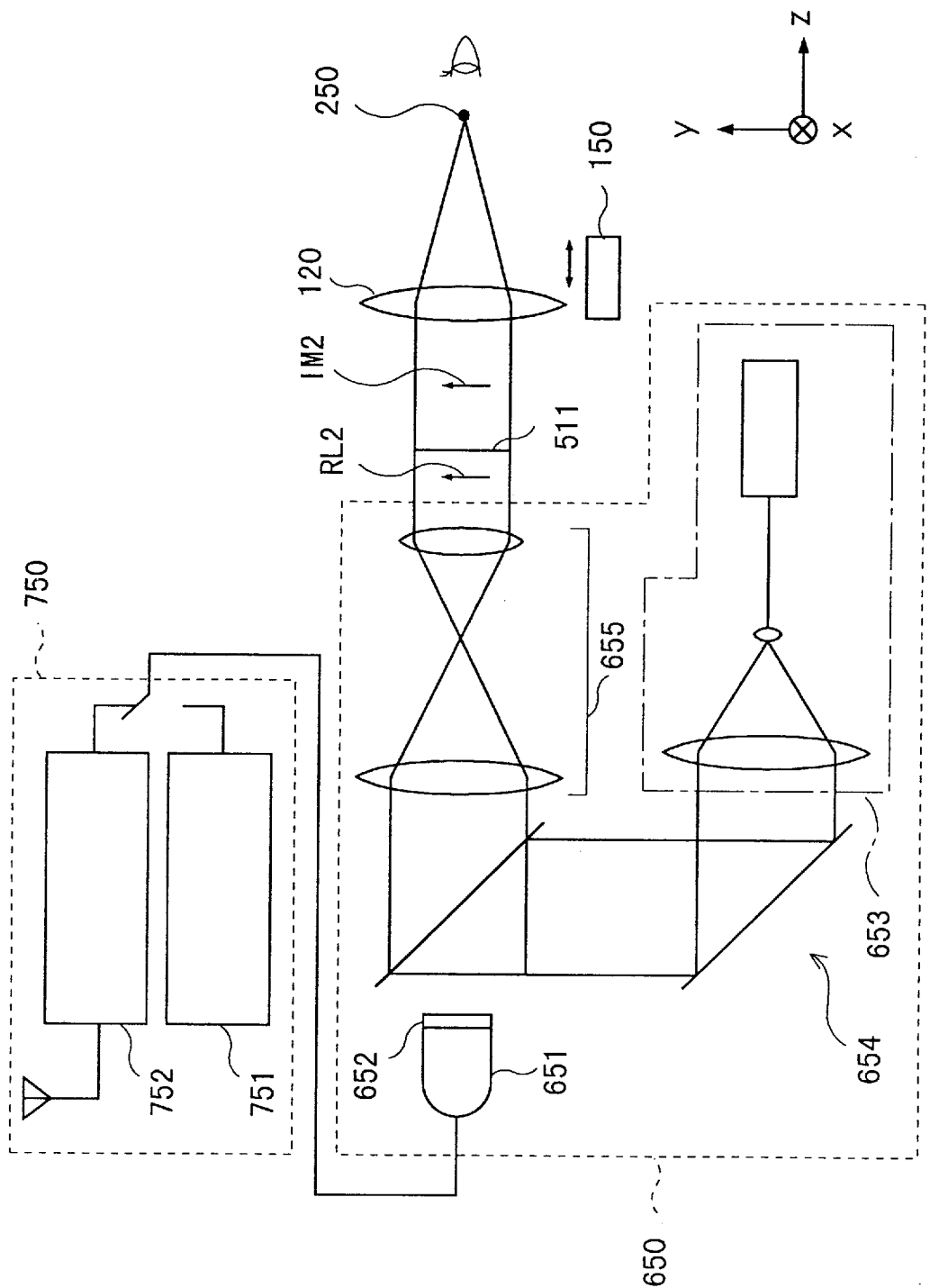
FIG. 24 is a diagram showing the arrangement of the first embodiment of a holography display apparatus according to the present invention.

FIG. 24 is a diagram showing the first embodiment of a holography display apparatus according to the present invention. The holography display apparatus of this embodiment is an apparatus for reconstructing the image of an object 900 to be sensed on the basis of the intensity hologram sensed by the holography imaging apparatus shown in FIG. 12.

As shown in FIG. 24, this apparatus comprises (a) an information input unit 750 for receiving the hologram information sensed by the holography imaging apparatus shown in FIG. 12, (b) a hologram forming unit 650 for receiving the hologram information via the information input unit 750, and forming a hologram 511 on the basis of the received hologram information, (c) an imaging optical system 120 which is equivalent to the imaging optical system 110 in FIG. 12, and forms an image by receiving light of wavefronts that form the hologram 511, (d) a moving means 150 for changing the distance between the hologram 511 and the imaging optical system 120, and (e) a 0th-order light shielding plate 250 arranged at the focal point position of the image space of the imaging optical system 120.

The information input unit 750 comprises (i) an information reading device 751 for reading out stored information from a storage medium of the imaging result of the holography imaging apparatus, and (ii) a receiver 752 for receiving the imaging result transmitted from the holography imaging apparatus.

The hologram forming unit 650 comprises (i) a display device 651 for displaying an image on the basis of information supplied from the information input unit 750, (ii) a spatial light modulator 652 for writing the image displayed on the display device 651, (iii) a laser light source 653 for generating coherent light as plane waves to be irradiated onto the spatial light modulator 652, (iv) a relay optical system 654 for guiding the light output from the laser light source 653 to the spatial light modulator 652, and (v) an afocal optical system 655 for receiving the light phase-modulated by the spatial light modulator 652 and forming the hologram 511 of the spatial light modulator 652 that matches the size on the imaging surface upon imaging.

In order to prevent reflection by protection glass of the spatial light modulator 652, an optical fiber plate having a core diameter equal to or smaller than the imaging resolution is preferably used in place of the normal protection glass.

A case will be exemplified below wherein the imaging optical system 120 adopts a convex lens having a focal length f=18 cm and light to be used has a wavelength $\lambda$=0.628 $\mu$m in correspondence with the holography imaging apparatus shown in FIG. 12.

This holography display apparatus reconstructs and displays the image of the object to be sensed as follows on the basis of the imaging result of the holography imaging apparatus shown in FIG. 12.

The moving means 150 adjusts the forming position of the hologram 511 and the imaging optical system 120 in accordance with the condition given by equation (8). More specifically, since z=1.4 cm in the holography imaging apparatus in FIG. 12, this position is moved by 2.8 cm (=2z) in the direction of the imaging optical system 110 in FIG. 12. As a consequence, the hologram 511 is formed at a position separated by 16.6 cm from the imaging optical system 120.

Image information as hologram information is received from the information input unit 750, and is displayed on the display device 651. The displayed image information is written in the spatial light modulator 652. The display device 651 preferably comprises a compact CRT, and the spatial light modulator 652 preferably comprises an optical writing type liquid crystal spatial light modulation device. Note that the display device 651 displays the imaging result while rotating it through 180° about the optical axis (z-axis).

Subsequently, light output from the laser light source 653 is irradiated onto the spatial light modulator 652 via the relay optical system 654. The light phase-modulated by the spatial light modulator 652 forms the hologram 511 of the spatial light modulator 652 via the a focal optical system 655 to have the same size as that upon imaging. The magnification of the a focal optical system is determined by the ratio of the pixel size of the display device 651 to that upon imaging. For example, when the display device 651 uses a 1.5" compact CRT, the pixel size is about 40 $\mu$m, and the pixel size upon imaging is 11 $\mu$m as described above. Hence, an a focal optical system of about 4:1 is used.

A real image RL2 reconstructed by the hologram 511 is reproduced at the position, on the imaging optical system 120, of the hologram 511 and separated by about 6.6 cm from the imaging optical system 120. Assume that wavefronts that form the real image RL2 are those that form a virtual image IM2 by the imaging optical system 120. The 0th-order light shielding plate 250 set at the focal point position of the imaging optical system 120 shields 0th-order light components of the light output from the imaging optical system 120, and transmits light components of the 1st order or higher.

When the light which is not shielded by the 0th-order light shielding plate 250 is observed from the position behind the 0th-order light shielding plate 250, the reconstructed image of the object 900 to be sensed free from any distortion can be observed.

When holograms are sensed in units of three primary colors of light, the color image of the object 900 to be sensed can be reconstructed by synthesizing the reconstructed images in units of colors as in the above embodiments.

(Second Embodiment)

Figure 25:
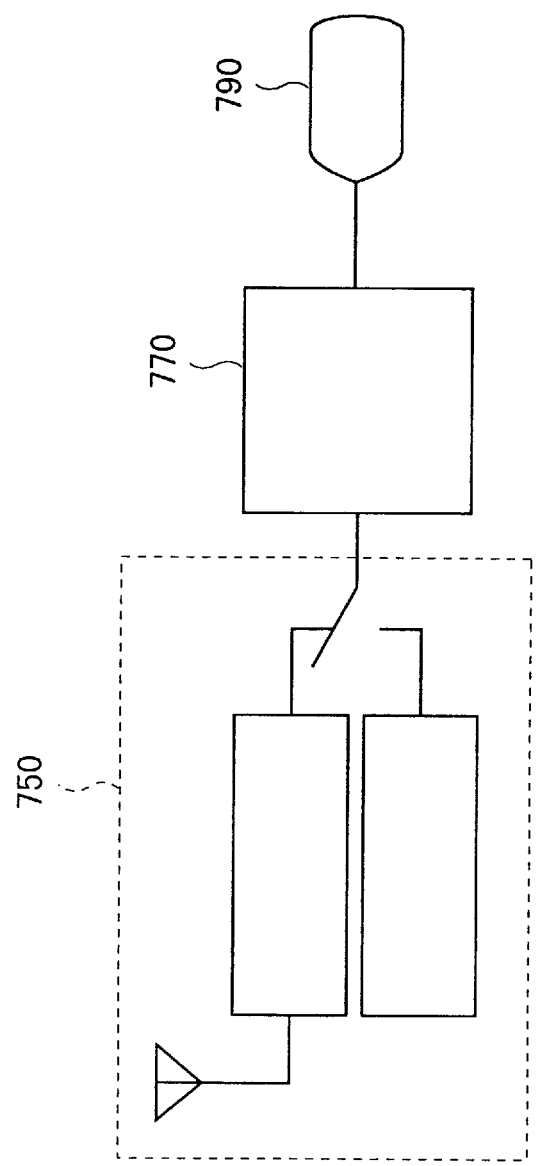
FIG. 25 is a diagram showing the arrangement of the second embodiment of a holography display apparatus according to the present invention.

FIG. 25 is a diagram showing the second embodiment of a holography display apparatus according to the present invention. The holography display apparatus of this embodiment is an apparatus for reconstructing the image of an object 900 to be sensed on the basis of an intensity hologram sensed by the holography imaging apparatus shown in FIG. 12.

As shown in FIG. 25, this apparatus comprises (a) an information input unit 750 for receiving the hologram information sensed by the holography imaging apparatus shown in FIG. 12, (b) a calculation unit 770 for receiving the hologram information via the information input unit 750, and calculating the reconstructed image of the object 900 to be sensed on the basis of the received hologram information, and (c) a display device 790 for displaying the calculation result of the calculation unit 770.

The calculation unit 770 uses a computer that has function calculation performance.

Figure 26:
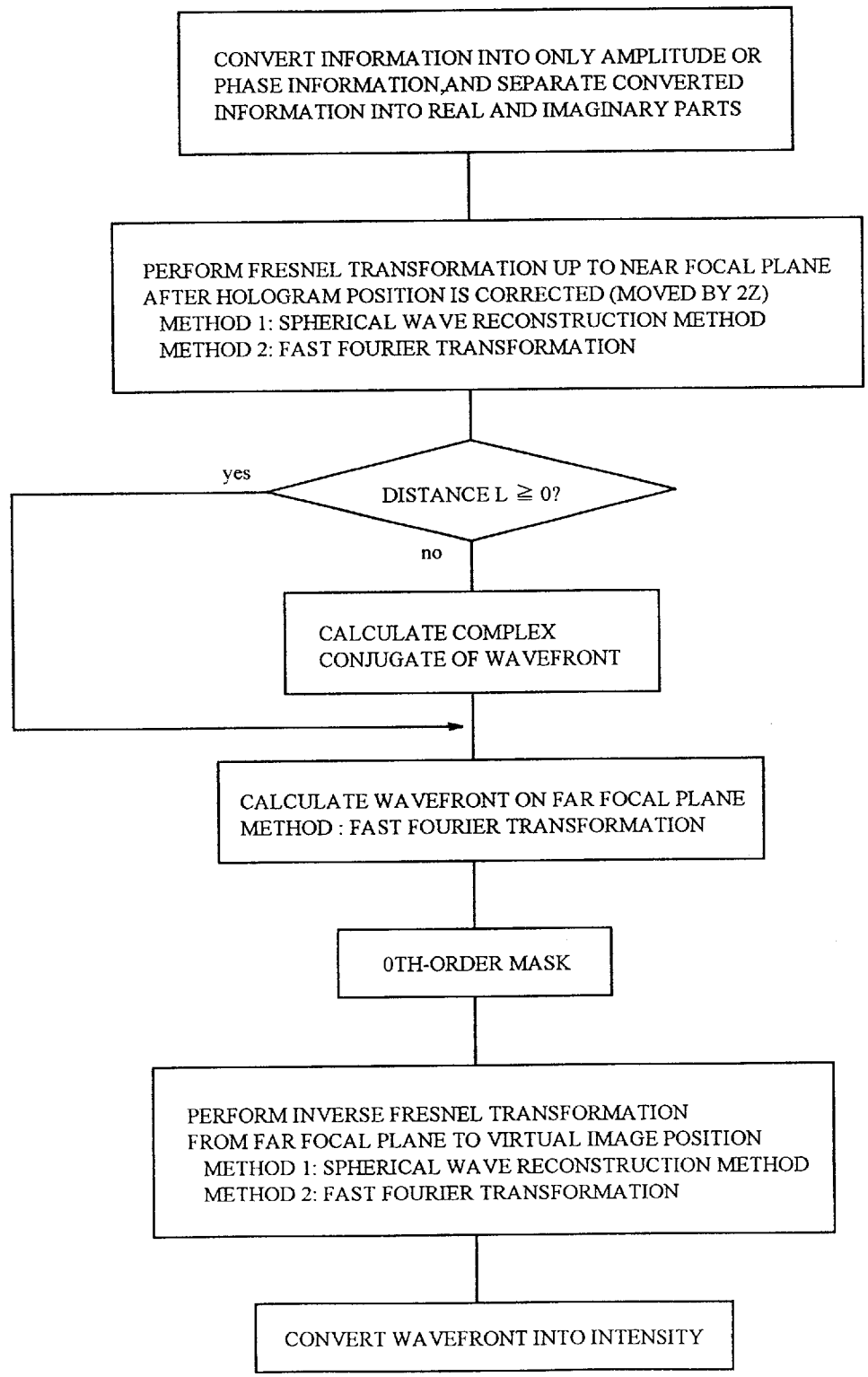
FIG. 26 is a flow chart for explaining the calculation processing in the second embodiment of the holography display apparatus according to the present invention.

This holography display apparatus reconstructs and displays the image of the object to be sensed as follows on the basis of the imaging result of the holography imaging apparatus shown in FIG. 12. FIG. 26 is a flow chart showing the calculation processing of the calculation unit 770 of this embodiment.

The calculation unit 770 receives hologram information from the information input unit. Subsequently, the object to be calculated is determined to be either the amplitude or phase, and is separated into a real number part and an imaginary number part to obtain a complex number distribution H(x, y).

Figure 8:
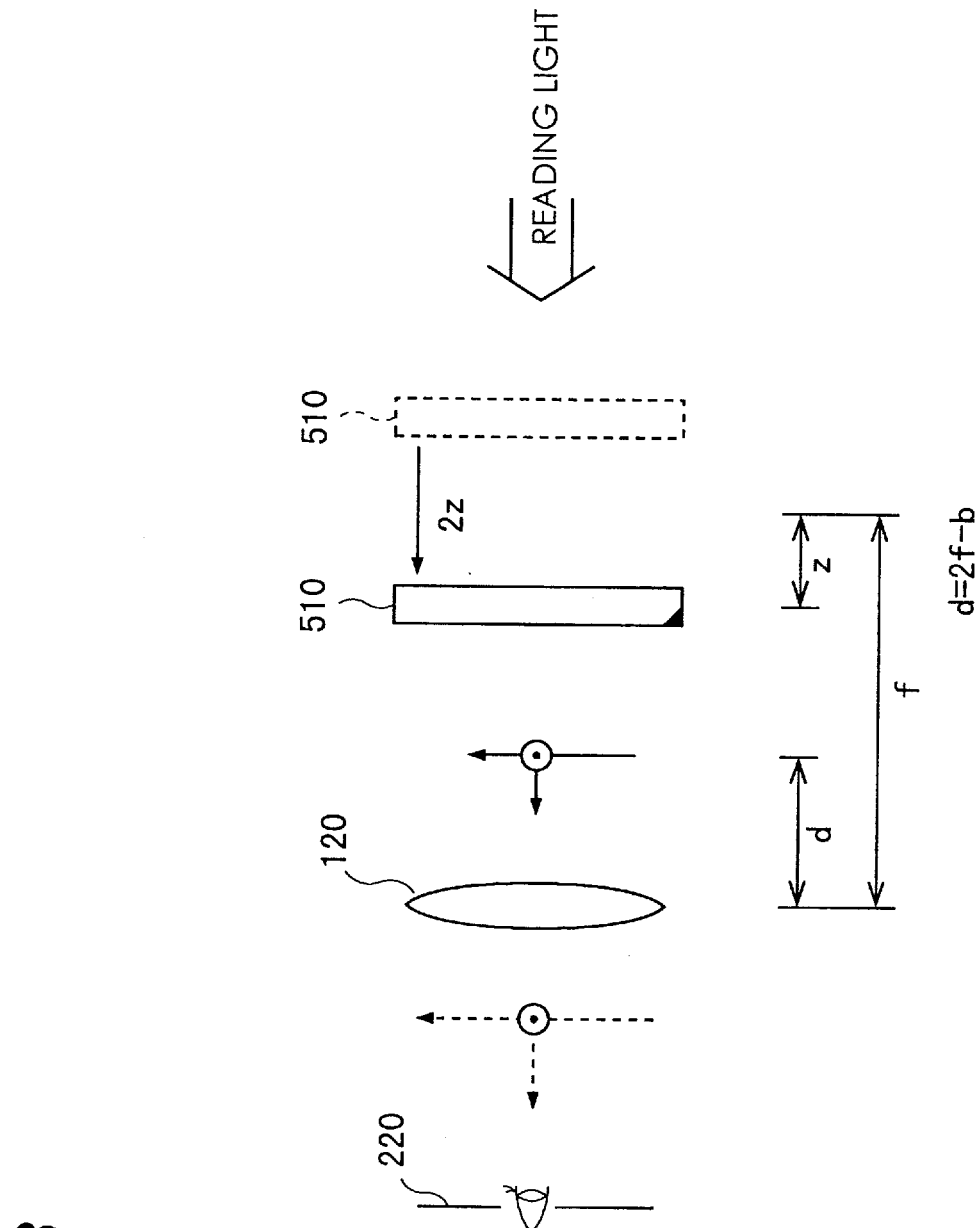
FIG. 8 shows the arrangement of a reconstruction optical system that improves the reconstruction optical system shown in FIG. 7.
Figure 9:
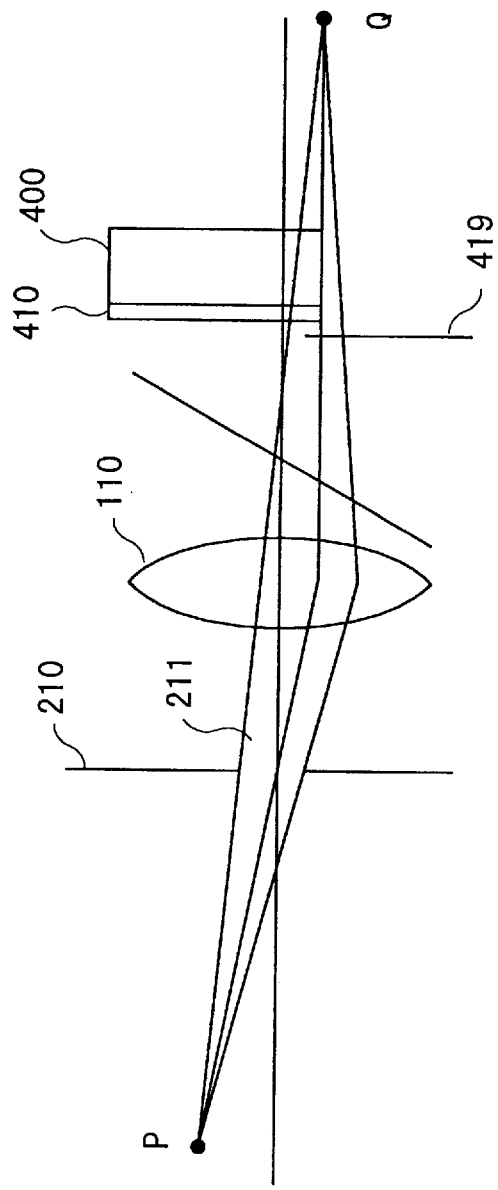
FIG. 9 is a schematic view showing the arrangement of an imaging optical system of a holography imaging apparatus according to the present invention, which does not use any principal ray.
Figure 10:
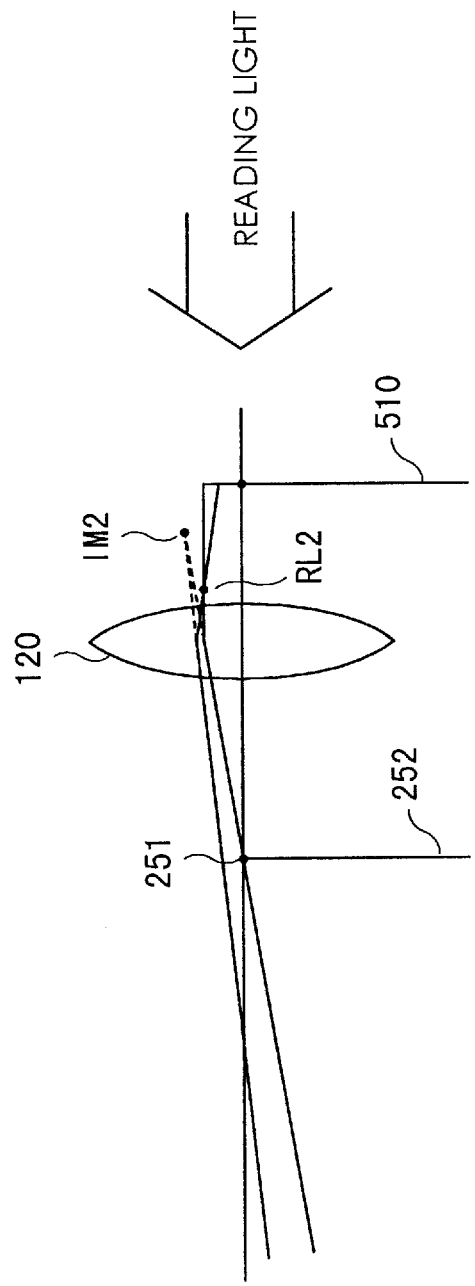
FIG. 10 is a schematic view showing the arrangement of a reconstruction optical system of a holography display apparatus according to the present invention, which does not use any principal ray.
Figure 11:
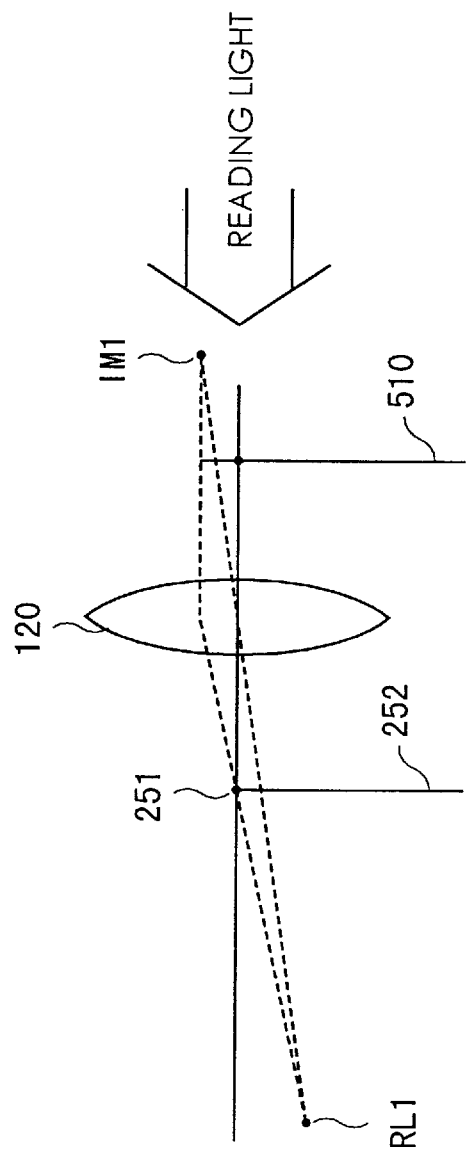
FIG. 11 explains of removal of a conjugate image by the reconstruction optical system shown in FIG. 10.

The position of a hologram is imaginarily set by correcting it in accordance with equation (8), so as to realize the calculation based on the reconstruction optical system model shown in FIG. 8. Since z=1.4 cm in the holography imaging apparatus shown in FIG. 12, the hologram is imaginarily set at the position separated by 16.6 cm from an imaginary imaging optical system equivalent to the imaging optical system 110 as in the first embodiment.

Wavefronts from the imaginarily set hologram are Fresnel-transformed to calculate those on the focal plane of the object space (to be also referred to as the near side hereinafter) of the imaginary imaging optical system.

As the calculation method, a spherical wave reconstruction method and a fast Fourier transformation method are available. These methods will be described below.

(1) Spherical Wave Reconstruction Method

A propagation distance L (=1.4 cm), a pitch p (=11 $\mu$m), and the number N (=512)×N of pixels are set, and wavefronts from all the hologram grating points are added to each other in association with the respective points of the focal plane on the near side of the imaginary imaging optical system.

More specifically, if $h_p$ represents the pitch on the focal plane on the near side, wavefronts $Of(h_p m, h_p n)$ on the focal plane on the near side are calculated by:

$$Of(h_p m, h_p n) = \sum_j \sum_i [H(p_q, p_i) \times \{1/((p_q - h_p m)^2 + (p_i - h_p n)^2 + L^2)^{1/2}\} \times$$

$$\exp[jk((p_q - h_p m)^2 + (p_i - h_p n)^2 + L^2)^{1/2}]]$$

where m=an integer falling within the range from —N/2 to N/2−1 n=an integer falling within the range from —N/2 to N/2−1 q=an integer falling within the range from —N/2 to N/2−1 i=an integer falling within the range from —N/2 to N/2−1 j: imaginary number unit (2) Fast Fourier Transformation Method

A propagation distance L (=1.4 cm), a pitch p (=11 $\mu$m), and the number N (=512)×N of pixels are set, and $h_p$ represents the pitch on the focal plane on the near side. Then, wavefronts $Of(h_p m, h_p n)$ on the focal plane on the near side are obtained by the following calculation:

$$Of(h_p m, h_p n) = F^{-1}[F[H(h_p m, h_p n)] \cdot F[f(h_p m, h_p n)]]$$

where F: fast Fourier transform $F^{-1}$: inverse fast Fourier transform $f(h_p m, h_p n) = (1/r)\exp[jkr]$ $r = (h_p m^2 + h_p n^2 + L^2)^{1/2}$ m=an integer falling within the range from —N/2 to N/2−1 n=an integer falling within the range from —N/2 to N/2−1

Note that the following equation preferably replaces the above-mentioned one depending on the Fresnel propagation distance L:

$$F[f(h_p m, h_p n)] = \exp[2\pi L[(1/\lambda)^2 - (m/h_p N))^2 - (n/(h_p N))^2]^{1/2}]$$

After the wavefronts on the focal plane on the near side are calculated, as described above, the sign of the Fresnel propagation direction is discriminated. The sign of the Fresnel propagation direction is defined so that the direction from the hologram toward the imaginary imaging optical system is positive, and whether the direction to observe the focal plane on the near side from the hologram is positive or negative is discriminated.

When the sign of the Fresnel propagation direction is positive, the wavefronts $Of(h_p m, h_p n)$ are directly used; when it is negative, complex conjugates of wavefronts $Of(h_p m, h_p n)$ are adopted to match the propagation direction of the wavefronts.

In this embodiment, since the sign of the Fresnel propagation direction is negative, complex conjugates are calculated.

The adopted wavefronts on the focal plane on the near side are subjected to two-dimensional Fourier transformation to calculate wavefronts $G(f_p m, f_p n)$ on the focal plane of the image space (to be also referred to as the far side hereinafter) of the imaginary O imaging optical system. Note that $f_p$ is the pixel pitch on the focal plane on the far side. The wavefronts $G(f_p m, f_p n)$ are distributed at grating points falling within the range having the pitch $f_p = \lambda f/(h_p N)$ (=20.22 μm) and one side=$\lambda f/h_p$.

Then, the calculation is executed while setting the 0th-order shielded light to be $G(0, 0)=0$. Note that the range of the 0th-order light shielding operation with $G(x, y)=0$ is appropriately adjusted.

Subsequently, the wavefronts $G(f_p m, f_p n)$ subjected to the 0th-order light shielding processing are subjected to inverse Fresnel transformation to calculate and obtain the wavefront distribution of the virtual image IM2.

In this embodiment, the distance, $L_0$, between the focal point on the far side and the virtual image IM2 is 28.4 cm.

As such calculation method, a spherical wave reconstruction method and a fast Fourier transformation method are available. These methods will be described below.

(1) Spherical Wave Reconstruction Method

A propagation distance $L_0$ (=28.4 cm), a pitch $o_p$ (=11 μm), and the number N (=512)×N of pixels are set, and wavefronts from all the hologram grating points on the focal plane, on the far side, of the imaginary imaging optical system are added to each other in association with the respective points of the virtual image IM2.

That is, wavefronts $O(o_p m, o_p n)$ on the virtual image IM2 are calculated by:
where m=an integer falling within the range from —N/2 to N/2−1

$$O(o_p m, o_p n) = \sum_j \sum_i [H(f_p q, f_p i) \times \{1/((f_p q - o_p m)^2 + (f_p i - o_p n)^2 + L_0^2)^{1/2}\} \times$$
$$\exp[jk((f_p q - o_p m)^2 + (f_p i - o_p n)^2 + L_0^2)^{1/2}]]$$

n=an integer falling within the range from —N/2 to N/2−1
q=an integer falling within the range from —N/2 to N/2−1
i=an integer falling within the range from —N/2 to N/2−1
j: imaginary number unit
Note that $o_p = f_p$ in this embodiment.

(2) Fast Fourier Transformation Method

A propagation distance $L_0$ (=28.4 cm), a pitch $o_p$ (=11 μm), and the number N (=512)×N of pixels are set, and wavefronts $O(o_p m, o_p n)$ on the virtual image IM2 are obtained by the following calculation:

$$O(f_p m, f_p n) = F^{-1}[F[G(h_p m, h_p n)] \cdot F[f(h_p m, h_p n)]]$$

where F: fast Fourier transform
$F^{-1}$: inverse fast Fourier transform
$f(h_p m, h_p n) = (1/r)\exp[jkr]$
$r = (h_p m^2 + h_p n^2 + L^2)^{1/2}$
m=an integer falling within the range from —N/2 to N/2−1
n=an integer falling within the range from —N/2 to N/2−1
Note that the following equation preferably replaces the above-mentioned one depending on the Fresnel propagation distance L:

$$F[f(h_p m, h_p n)] = \exp[2\pi L[(1/\lambda)^2 - (m/h_p N))^2 - (n/(h_p N))^2]^{1/2}]$$

Finally, the wavefronts $O(o_p m, o_p n)$ or $O(f_p m, f_p n)$ are transformed, and the reconstructed image of the object to be sensed is displayed on the display device 790.

Note that the above-mentioned processing generally displays a tomographic image of the virtual image IM2.

When imaging results corresponding to the three primary colors of light are available, a color image can be reconstructed by performing the calculations for the respective colors, and synthesizing the final reconstructed images.

(Third Embodiment)

Figure 27:
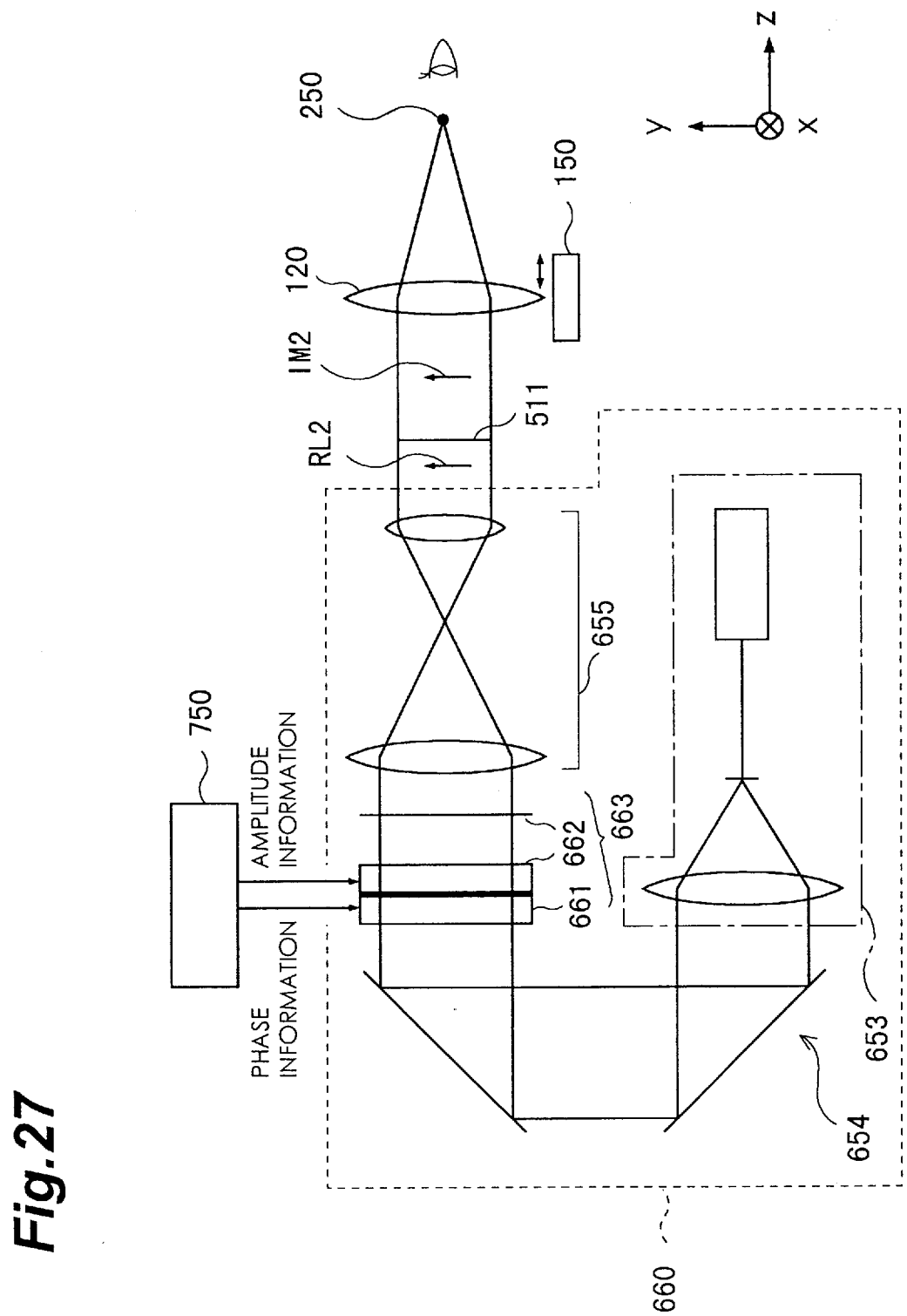
FIG. 27 shows the arrangement of a third embodiment of a holography display apparatus according to the present invention.

FIG. 27 shows a third embodiment of a holography display apparatus according to the present invention. The holography display apparatus of this embodiment is an apparatus for reconstructing the image of an object 900 to be sensed on the basis of a complex hologram sensed by the holography imaging apparatus in FIG. 14.

As shown in FIG. 27, this apparatus comprises (a) an information input unit 750 for receiving the hologram information sensed by the holography imaging apparatus shown in FIG. 14, (b) a hologram forming unit 660 for receiving the hologram information via the information input unit 750, and forming a hologram 511 on the basis of the received hologram information, (c) an imaging optical system 120 which is equivalent to the imaging optical system 110 in FIG. 14, and forms an image by receiving light of wavefronts that form the hologram 511, (d) a moving means 150 for changing the distance between the hologram 511 and the imaging optical system 120, and (e) a 0th-order light shielding plate 250 arranged at the focal point position of the image space of the imaging optical system 120.

The hologram forming unit 660 comprises (i) a phase & amplitude modulation unit 663 having a phase modulator 661 for modulating the phase of input light based on phase information supplied from the information input unit 750, and an amplitude modulator 662 for modulating the amplitude of input light, (ii) a laser light source 653 for producing coherent light as plane waves to be irradiated onto the phase & amplitude modulation unit 663, (iii) a relay optical system 654 for guiding light output from the laser light source 653 toward the phase modulator 661 and amplitude modulator 662, and (iv) an afocal optical system 655 for receiving light via the phase & amplitude modulation unit 663, and forming the hologram 511 of the phase & amplitude modulation unit 663 that matches the size on the imaging surface upon imaging.

A case will be exemplified below wherein the imaging optical system 120 adopts a convex lens having a focal length f=18 cm and light to be used has a wavelength l=0.628 μm in correspondence with the holography imaging apparatus shown in FIG. 14.

This holography display apparatus reconstructs and displays the image of the object to be sensed as follows on the basis of the imaging result of the holography imaging apparatus shown in FIG. 14.

As in the first embodiment, the moving means 150 adjusts the forming position of the hologram 511 and the imaging optical system 120 in accordance with the condition given by equation (8). More specifically, since z=1.4 cm in the holography imaging apparatus in FIG. 14, this position is moved by 2.8 cm (=2z) in the direction of the imaging optical system 110 in FIG. 14. As a consequence, the hologram 511 is formed at the position separated by 16.6 cm from the imaging optical system 120.

The light output from the laser light source 653 is irradiated onto the phase & amplitude modulation unit 663 via the relay optical system 654. The phase & amplitude modulation unit 663 receives phase information and amplitude information as hologram information from the information input unit 750, and the phase and amplitude modulators 661 and 662 respectively execute phase and amplitude modulation.

The phase and amplitude modulators 661 and 662 can be easily realized using liquid crystal panels using the techniques disclosed in Japanese Patent Laid-Open Nos. 5-127139 and 5-119341.

The light phase-modulated by the phase modulator 661 forms the hologram 511 of the phase modulator 661, which has the same size as that upon imaging, via the a focal optical system 655. The magnification of the a focal optical system is determined by the ratio of the pixel size of the display device 651 to that upon imaging.

A real image RL2 reconstructed by the hologram 511 is reproduced at the position, on the imaging optical system 120, of the hologram 511 and separated by about 6.6 cm from the imaging optical system 120. Assume that wavefronts that form the real image RL2 are those that form a virtual image IM2 by the imaging optical system 120. The 0th-order light shielding plate 250 set at the focal point position of the imaging optical system 120 shields 0th-order light components of the light output from the imaging optical system 120, and transmits light components of the 1st order or higher.

When the light which is not shielded by the 0th-order light shielding plate 250 is observed from the position behind the 0th-order light shielding plate 250, the reconstructed image of the object 900 to be sensed free from any distortion can be observed.

If the phase and amplitude can be modulated ideally, the 0th-order light shielding plate 250 is not always required.

When holograms are sensed in units of three primary colors of light, the color image of the object 900 to be sensed can be reconstructed by synthesizing the reconstructed images in units of colors as in the above embodiments.

(Fourth Embodiment)

Figure 28:
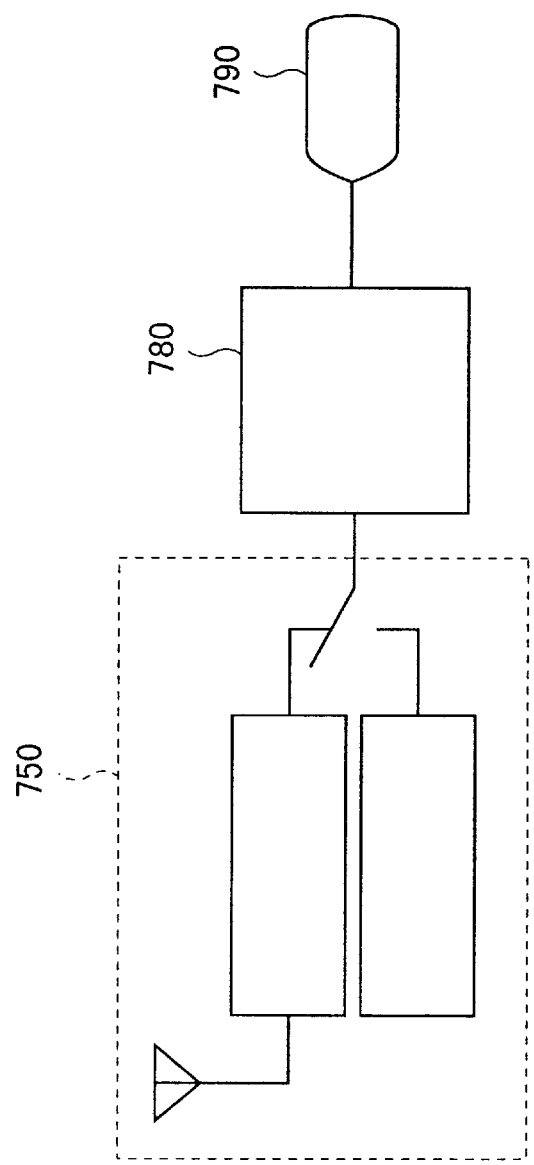
FIG. 28 shows the arrangement of the fourth embodiment of a holography display apparatus according to the present invention.

FIG. 28 shows a fourth embodiment of a holography display apparatus according to the present invention. The holography display apparatus of this embodiment is an apparatus for reconstructing the image of an object 900 to be sensed on the basis of a complex hologram sensed by the holography imaging apparatus shown in FIG. 14.

As shown in FIG. 28, this apparatus comprises (a) an information input unit 750 for receiving the hologram information sensed by the holography imaging apparatus shown in FIG. 14, (b) a calculation unit 780 for receiving the hologram information via the information input unit 750, and calculating the reconstructed image of the object 900 to be sensed on the basis of the received hologram information, and (c) a display device 790 for displaying the calculation result of the calculation unit 780.

The calculation unit 780 uses a computer that has function calculation performance.

Figure 29:
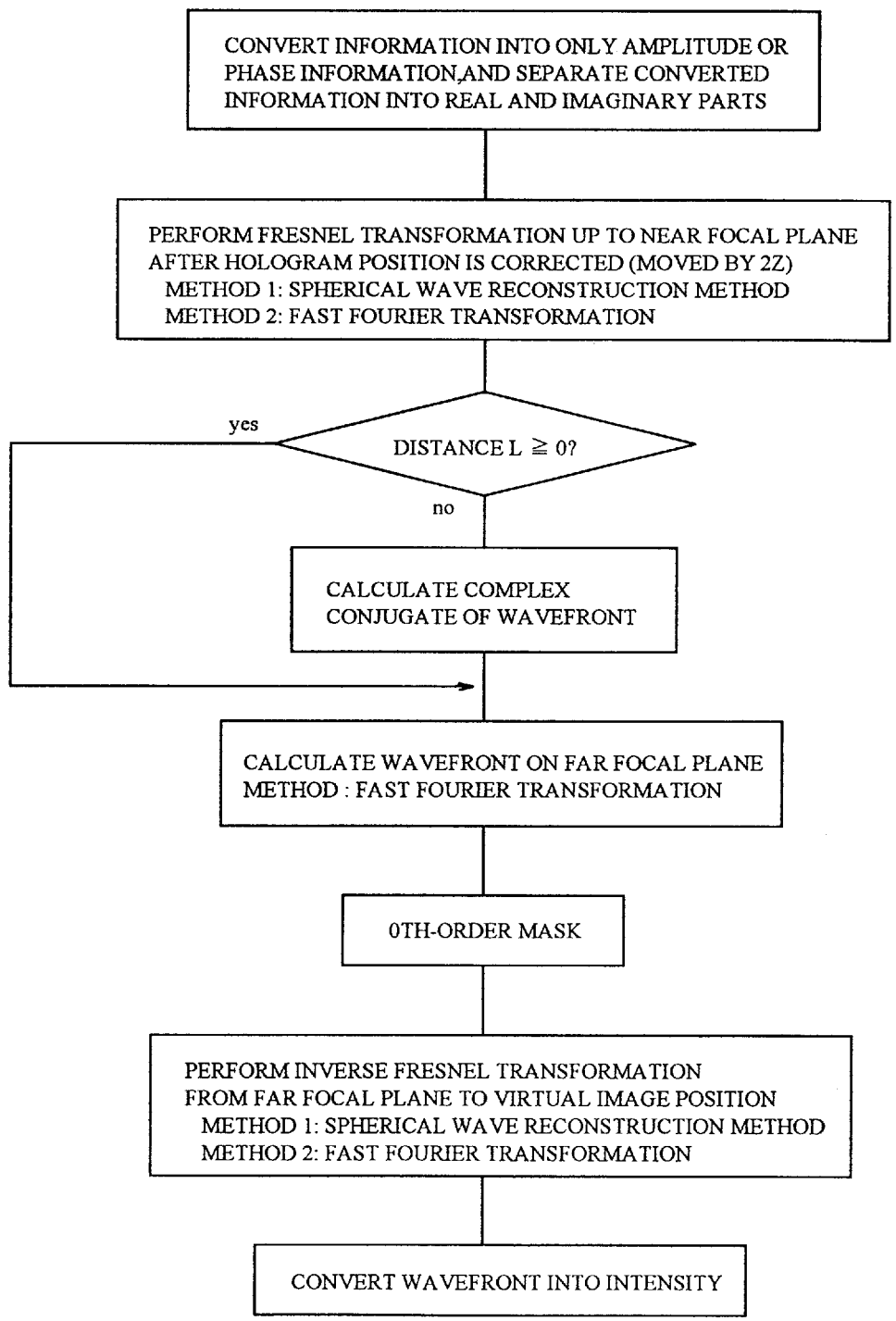
FIG. 29 is a flow chart explaining the calculation processing in the fourth embodiment of the holography display apparatus according to the present invention.

This holography display apparatus reconstructs and displays the image of the object to be sensed as follows on the basis of the imaging result of the holography imaging apparatus shown in FIG. 14. FIG. 29 is a flow chart showing the calculation processing of the calculation unit 770 of this embodiment.

The calculation unit 780 receives hologram information from the information input unit. Subsequently, each of the phase information and amplitude information of the object to be calculated is separated into a real number part and an imaginary number part to obtain a complex number distribution H(x, y).

Thereafter, the same calculations as in the second embodiment are performed to transform finally calculated wavefronts $O(o_p m, o_p n)$ or $O(f_p m, f_p n)$, and the reconstructed image of the object to be sensed is displayed on the display device 790.

Note that the above-mentioned processing generally displays a tomographic image of a virtual image IM2, as in the second embodiment.

(Fifth Embodiment)

Figure 30:
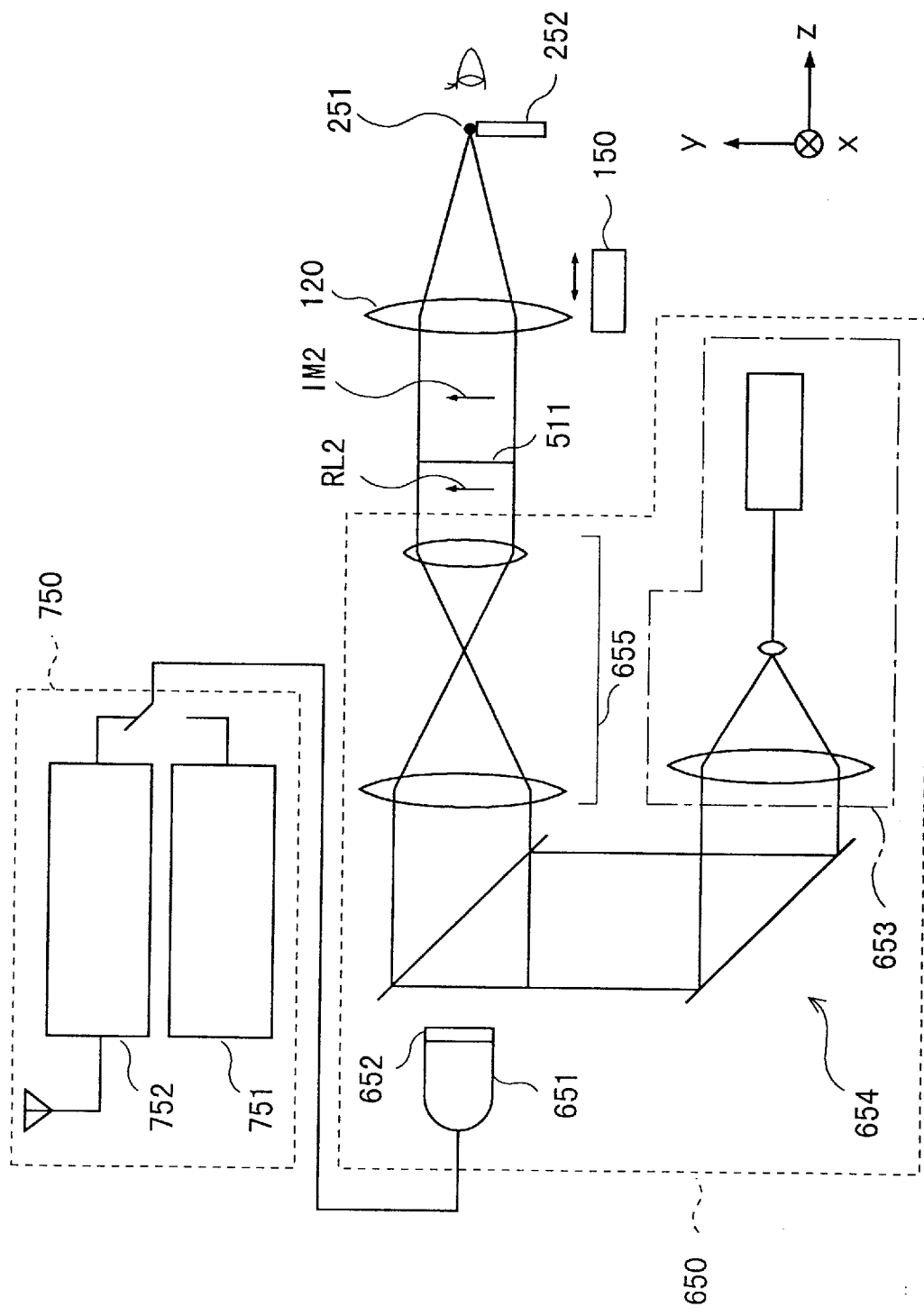
FIG. 30 shows the arrangement of the fifth embodiment of a holography display apparatus according to the present invention.

FIG. 30 is a diagram showing the fifth embodiment of a holography display apparatus according to the present invention. The holography display apparatus of this embodiment is an apparatus for reconstructing the image of an object 900 to be sensed on the basis of an intensity hologram sensed by the holography imaging apparatus in FIG. 16.

As shown in FIG. 30, this apparatus comprises (a) an information input unit 750 for receiving the hologram information sensed by the holography imaging apparatus shown in FIG. 16, (b) a hologram forming unit 650 for receiving the hologram information via the information input unit 750, and forming a hologram 511 on the basis of the received hologram information, (c) an imaging optical system 120 which is equivalent to the imaging optical system 110 in FIG. 16, and forms an image by receiving light of wavefronts that form the hologram 511, (d) a moving means 150 for changing the distance between the hologram 511 and the imaging optical system 120, (e) a 0th-order light shielding plate 251 arranged at the focal point position of the image space of the imaging optical system 120, and (f) a light shielding plate 252 arranged below, on the plane of the drawing of FIG. 30, the focal plane of the image space of the imaging optical system 120.

A case will be exemplified below wherein the imaging optical system 120 adopts a convex lens having a focal length f=18 cm and light to be used has a wavelength $\lambda=0.628 \mu m$ in correspondence with the holography imaging apparatus shown in FIG. 16.

This holography display apparatus reconstructs and displays the image of the object to be sensed as follows on the basis of the imaging result of the holography imaging apparatus shown in FIG. 16.

The moving means 150 adjusts the forming position of the hologram 511 and the imaging optical system 120 in accordance with the condition given by equation (8). More specifically, since z=1.4 cm in the holography imaging apparatus in FIG. 16, this position is moved by 2.8 cm (=2z) in the direction of the imaging optical system 110 in FIG. 16. As a consequence, the hologram 511 is formed at the position separated by 16.6 cm from the imaging optical system 120.

Image information as hologram information is received from the information input unit 750, and is displayed on a display device 651. The displayed image information is written in a spatial light modulator 652. The display device 651 preferably comprises a compact CRT, and the spatial light modulator 652 preferably comprises an optical writing type liquid crystal spatial light modulation device. Note that the display device 651 displays the imaging result while rotating it through 180° about the optical axis (z-axis).

Subsequently, light output from a laser light source 653 is irradiated onto the spatial light modulator 652 via a relay optical system 654. The light phase-modulated by the spatial light modulator 652 forms the hologram 511 of the spatial light modulator 652 via an a focal optical system 655 to have the same size as that upon imaging. The magnification of the a focal optical system is determined by the ratio of the pixel size of the display device 651 to that upon imaging. For example, when the display device 651 uses a 1.5" compact CRT, the pixel size is about 40 $\mu m$, and the pixel size upon imaging is 11 gm as described above. Hence, an a focal optical system of about 4:1 is used.

A real image RL2 reconstructed by the hologram 511 is reproduced at the position, on the imaging optical system 120, of the hologram 511 and separated by about 6.6 cm from the imaging optical system 120. Assume that wavefronts that form the real image RL2 are those that form a virtual image IM2 by the imaging optical system 120. The 0th-order light shielding plate 251 set at the focal point position of the imaging optical system 120 shields 0th-order light components of the light output from the imaging optical system 120, and the light shielding plate 252 shields light of wavefronts that form a conjugate image of the virtual image IM2.

When the light which is not shielded by the 0th-order light shielding plate 251 or the light shielding plate 252 is observed from the position behind the 0th-order light shielding plate 251 and the light shielding plate 252, the reconstructed image of the object 900 to be sensed free from any distortion can be observed.

When holograms are sensed in units of three primary colors of light, the color image of the object 900 to be sensed can be reconstructed by synthesizing the reconstructed images in units of colors as in the above embodiments.

(Sixth Embodiment)

Figure 31:
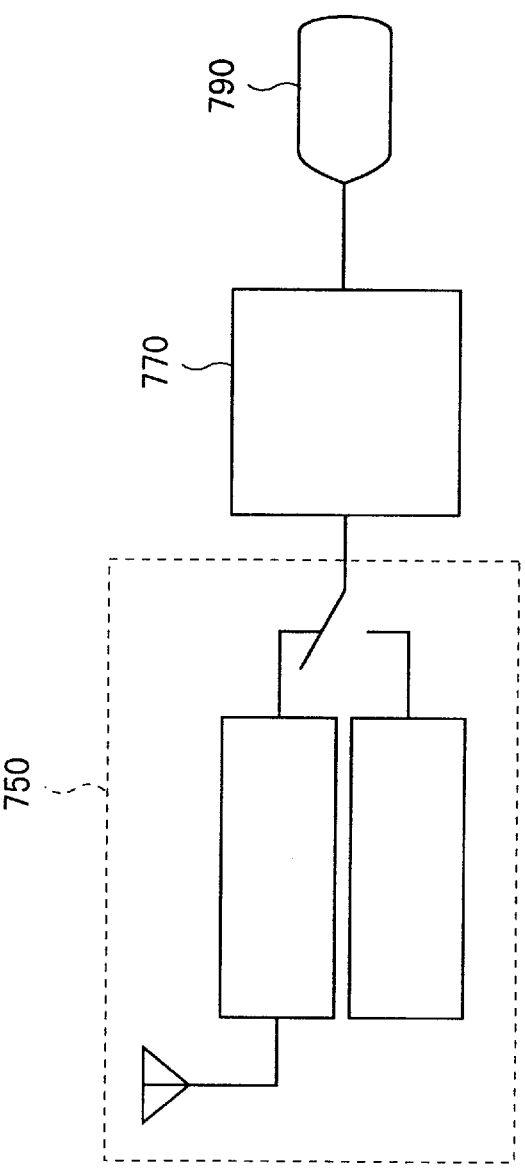
FIG. 31 shows the arrangement of the sixth embodiment of a holography display apparatus according to the present invention.

FIG. 31 is a diagram showing the sixth embodiment of a holography display apparatus according to the present invention. The holography display apparatus of this embodiment is an apparatus for reconstructing the image of an object 900 to be sensed on the basis of an intensity hologram sensed by the holography imaging apparatus shown in FIG. 16.

As shown in FIG. 31, this apparatus comprises (a) an information input unit 750 for receiving the hologram information sensed by the holography imaging apparatus shown in FIG. 16, (b) a calculation unit 770 for receiving the hologram information via the information input unit 750, and calculating the reconstructed image of the object 900 to be sensed on the basis of the received hologram information, and (c) a display device 790 for displaying the calculation result of the calculation unit 770.

The calculation unit 770 uses a computer that has function calculation performance.

Figure 32:
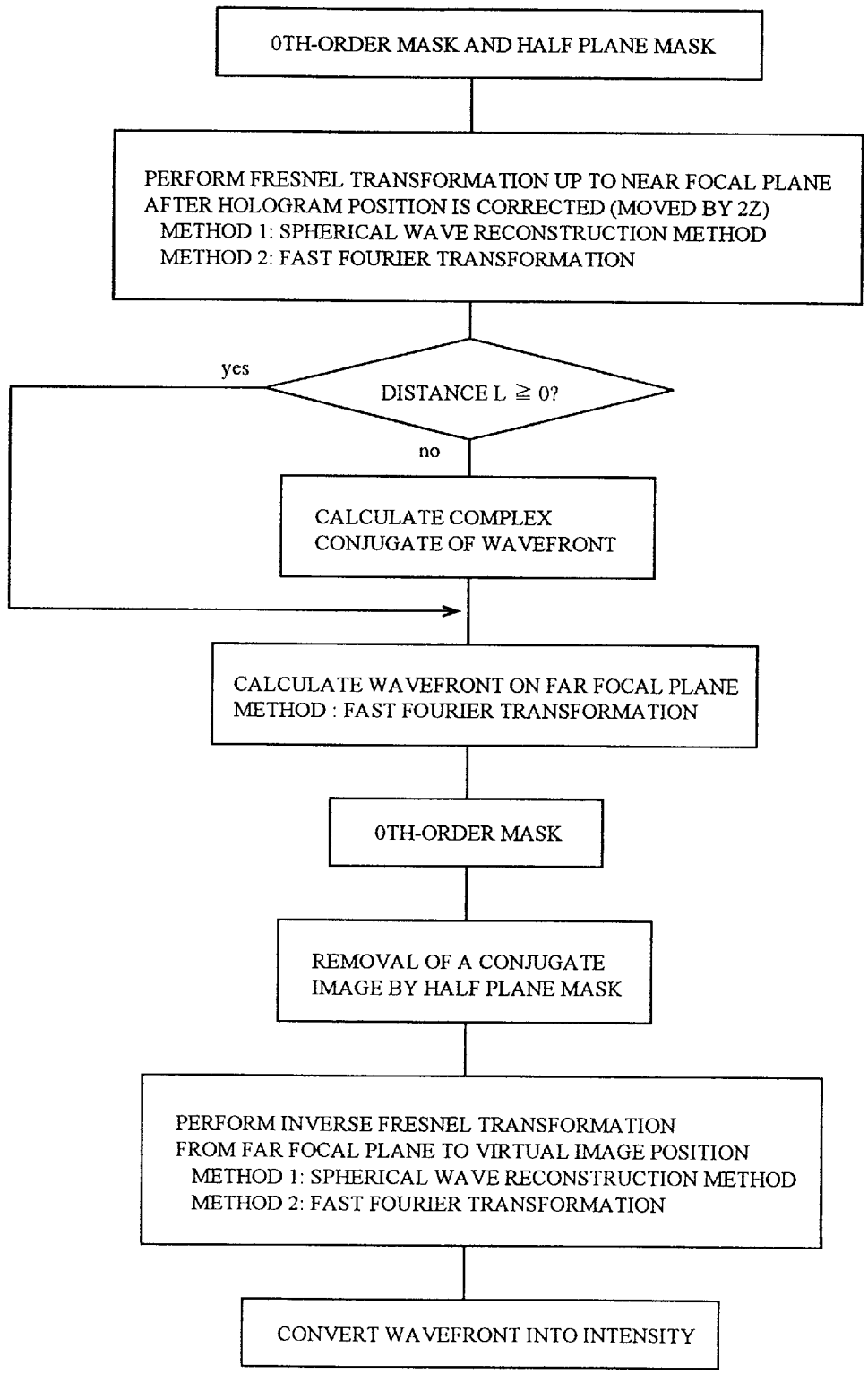
FIG. 32 is a flow chart explaining the calculation processing in the sixth embodiment of the holography display apparatus according to the present invention.

This holography display apparatus reconstructs and displays the image of the object to be sensed as follows on the basis of the imaging result of the holography imaging apparatus shown in FIG. 16. FIG. 32 is a flow chart showing the calculation processing of the calculation unit 770 of this embodiment.

The calculation unit 770 receives hologram information from the information input unit. Subsequently, the object to be calculated is determined to be either the amplitude or phase, and is separated into a real number part and an imaginary number part to obtain a complex number distribution H(x, y).

The position of a hologram is imaginarily set by correcting it in accordance with equation (8), so as to realize the calculation based on the reconstruction optical system model shown in FIG. 8. Since z=1.4 cm in the holography imaging apparatus shown in FIG. 16, the hologram is imaginarily set at the position separated by 16.6 cm from an imaginary imaging optical system equivalent to the imaging optical system 110 as in the first embodiment.

Wavefronts from the imaginarily set hologram are Fresnel-transformed to calculate those on the focal plane of the object space (to be also referred to as the near side hereinafter), of the imaginary imaging optical system.

As the calculation method, a spherical wave reconstruction method and a fast Fourier transformation method are available, as in the second embodiment.

After the wavefronts on the focal plane on the near side are calculated, as described above, the sign of the Fresnel propagation direction is discriminated. The sign of the Fresnel propagation direction is defined so that the direction from the hologram toward the imaginary imaging optical system is positive, and whether the direction to observe the focal plane on the near side from the hologram is positive or negative is discriminated.

When the sign of the Fresnel propagation direction is positive, the wavefronts $Of(h_p m, h_p n)$ are directly used; when it is negative, complex conjugates of wavefronts $Of(h_p m, h_p n)$ are adopted to match the propagation direction of the wavefronts.

In this embodiment, since the sign of the Fresnel propagation direction is negative, complex conjugates are calculated.

The adopted wavefronts on the focal plane on the near side are subjected to two-dimensional Fourier transformation to calculate wavefronts $G(f_p m, f_p n)$ on the focal plane of the image space (to be also referred to as the far side hereinafter) of the imaginary imaging optical system. Note that $f_p$ is the pixel pitch on the focal plane on the far side. The wavefronts $G(f_p m, f_p n)$ are distributed at grating points falling within the range having the pitch $f_p = \lambda f/(h_p N)$ (=20.22 $\mu$m) and one side=$\lambda f/h_p$.

Then, the calculation is executed while setting the 0th-order shielded light to be G(0, 0)=0. Note that the range of the 0th-order light shielding operation with G(x, y)=0 is appropriately adjusted. Removal of a conjugate image is performed by calculating G(x, y ($\leq$0))=0.

Subsequently, the wavefronts $G(f_p m, f_p n)$ subjected to the 0th-order light shielding processing are subjected to inverse Fresnel transformation to calculate and obtain the wavefront distribution of the virtual image IM2.

In this embodiment, the distance, $L_0$, between the focal point on the far side and the virtual image IM2 is 28.4 cm.

As such calculation method, a spherical wave reconstruction method and a fast Fourier transformation method are available, as in the second embodiment.

Finally, the wavefronts $O(o_p m, o_p n)$ or $O(f_p m, f_p n)$ are transformed, and the reconstructed image of the object to be sensed is displayed on the display device 790.

Note that the above-mentioned processing generally displays a tomographic image of the virtual image IM2.

When imaging results corresponding to the three primary colors of light are available, a color image can be reconstructed by performing the calculations for the respective colors, and synthesizing the final reconstructed images.

(Seventh Embodiment)

Figure 33:
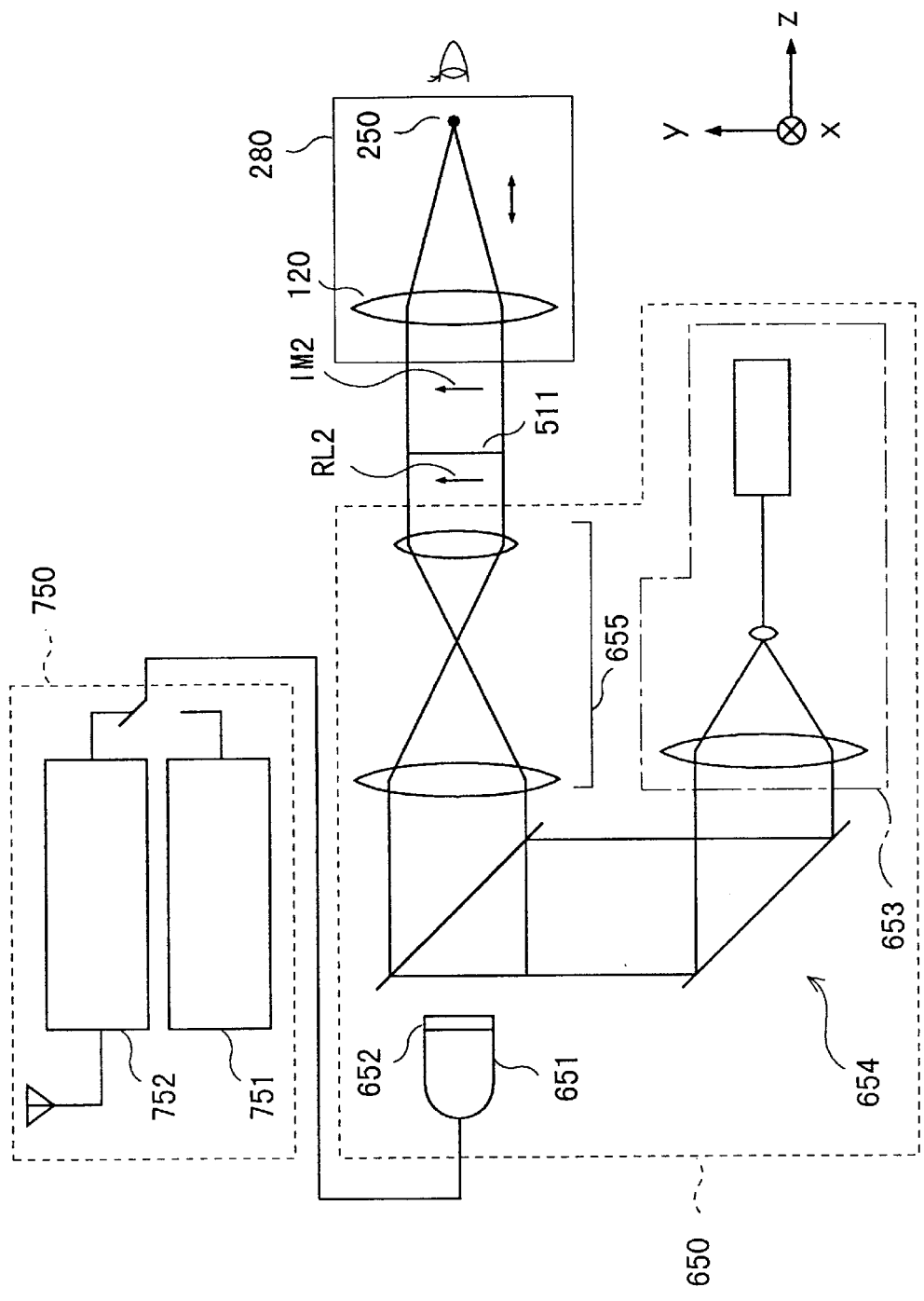
FIG. 33 shows the arrangement of the seventh embodiment of a holography display apparatus according to the present invention.

FIG. 33 is a diagram showing the arrangement of the seventh embodiment of a holography display apparatus according to the present invention. The holography display apparatus of this embodiment is an apparatus for reconstructing the image of an object 900 to be sensed on the basis of an intensity hologram sensed by the holography imaging apparatus in FIG. 17.

As shown in FIG. 33, this apparatus comprises (a) an information input unit 750 for receiving the hologram information sensed by the holography imaging apparatus shown in FIG. 17, (b) a hologram forming unit 650 for receiving the hologram information via the information input unit 750, and forming a hologram 511 on the basis of the received hologram information, (c) an imaging optical system 120 which is equivalent to the imaging optical system 110 in FIG. 17, and forms an image by receiving light of wavefronts that form the hologram 511, (d) a moving means 150 for changing the distance between the hologram 511 and the imaging optical system 120, (e) a 0th-order light shielding plate 250 arranged at the focal point position of the image space of the imaging optical system 120, and (f) an interlocking means 280 for changing the focal length of the image space of the imaging optical system 120, and changing the distance between the imaging optical system 120 and the 0th-order light shielding plate 250 in correspondence with the focal length of the image space of the imaging optical system 120.

The interlocking means 280 has an arrangement similar to that of the interlocking means 270 in FIG. 17, so as to realize the imaging optical system 120 equivalent to the imaging optical system 110 set by the interlocking means 270.

A case will be exemplified below wherein the imaging optical system 120 has a synthesized focal length f=18 cm and light to be used has a wavelength $\lambda$=0.628 $\mu$m in correspondence with the holography imaging apparatus shown in FIG. 17.

This holography display apparatus reconstructs and displays the image of the object to be sensed as follows on the basis of the imaging result of the holography imaging apparatus shown in FIG. 17.

The interlocking means 280 adjusts the forming position of the hologram 511 and the imaging optical system 120 in accordance with the condition given by equation (8). More specifically, since z=1.4 cm in the holography imaging apparatus in FIG. 17, this position is moved by 2.8 cm (=2z) in the direction of the imaging optical system 110 in FIG. 17. As a consequence, the hologram 511 is formed at the position separated by 16.6 cm from the imaging optical system 120.

Image information as hologram information is received from the information input unit 750, and is displayed on a display device 651. The displayed image information is written in a spatial light modulator 652. The display device 651 preferably comprises a compact CRT, and the spatial light modulator 652 preferably comprises an optical writing type liquid crystal spatial light modulation device. Note that the display device 651 displays the imaging result while rotating it through 180° about the optical axis (z-axis).

Subsequently, light output from a laser light source 653 is irradiated onto the spatial light modulator 652 via a relay optical system 654. The light phase-modulated by the spatial light modulator 652 forms the hologram 511 of the spatial light modulator 652 via an a focal optical system 655 to have the same size as that upon imaging. The magnification of the a focal optical system is determined by the ratio of the pixel size of the display device 651 to that upon imaging. For example, when the display device 651 uses a 1.5" compact CRT, the pixel size is about 40 $\mu$m, and the pixel size upon imaging is 11 $\mu$m as described above. Hence, an a focal optical system of about 4:1 is used.

A real image RL2 reconstructed by the hologram 511 is reproduced at the position, on the imaging optical system 120, of the hologram 511 and separated by about 6.6 cm from the imaging optical system 120. Assume that wavefronts that form the real image RL2 are those that form a virtual image IM2 by the imaging optical system 120. The 0th-order light shielding plate 251 set at the focal point position of the imaging optical system 120 shields 0th-order light components of the light output from the imaging optical system 120, and transmits light of the 1st order or higher.

When the light which is not shielded by the 0th-order light shielding plate 250 is observed from the position behind the 0th-order light shielding plate 250, the reconstructed image of the object 900 to be sensed free from any distortion can be observed.

When holograms are sensed in units of three primary colors of light, the color image of the object 900 to be sensed can be reconstructed by synthesizing the reconstructed images in units of colors as in the above embodiments.

(Eighth Embodiment)

Figure 34:
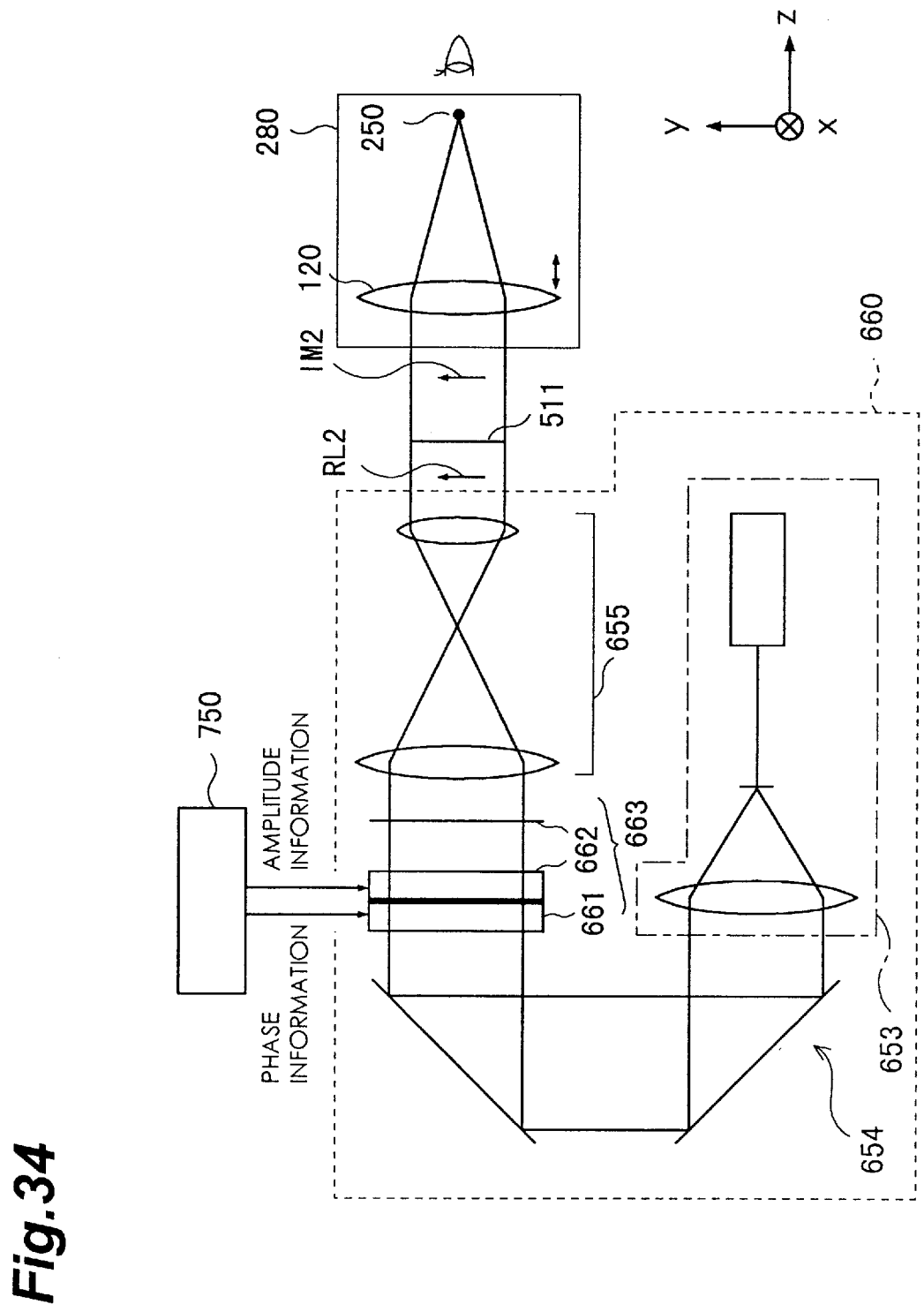
FIG. 34 shows the arrangement of the eighth embodiment of a holography display apparatus according to the present invention.

FIG. 34 is a diagram showing the eighth embodiment of a holography display apparatus according to the present invention. The holography display apparatus of this embodiment is an apparatus for reconstructing the image of an object 900 to be sensed on the basis of a complex hologram sensed by the holography imaging apparatus shown in FIG. 22.

As shown in FIG. 34, this apparatus comprises (a) an information input unit 750 for receiving the hologram information sensed by the holography imaging apparatus shown in FIG. 22, (b) a hologram forming unit 660 for receiving the hologram information via the information input unit 750, and forming a hologram 511 on the basis of the received hologram information, (c) an imaging optical system 120 which is equivalent to the imaging optical system 110 in FIG. 22, and forms an image by receiving light of wavefronts that form the hologram 511, (d) a moving means 150 for changing the distance between the hologram 511 and the imaging optical system 120, (e) a 0th-order light shielding plate 250 arranged at the focal point position of the image space of the imaging optical system 120, and (f) an interlocking means 280 for changing the focal length of the image space of the imaging optical system 120, and changing the distance between the imaging optical system 120 and the 0th-order light shielding plate 250 in correspondence with the focal length of the image space of the imaging optical system 120.

A case will be exemplified below wherein the imaging optical system 120 has a synthesized focal length f=18 cm and light to be used has a wavelength $\lambda$=0.628 $\mu$m in correspondence with the holography imaging apparatus shown in FIG. 22.

This holography display apparatus reconstructs and displays the image of the object to be sensed as follows on the basis of the imaging result of the holography imaging apparatus shown in FIG. 22.

As in the seventh embodiment, the interlocking means 280 adjusts the forming position of the hologram 511 and the imaging optical system 120 in accordance with the condition given by equation (8). More specifically, since z=1.4 cm in the holography imaging apparatus in FIG. 22, this position is moved by 2.8 cm (=2z) in the direction of the imaging optical system 110 in FIG. 22. As a consequence, the hologram 511 is formed at a position separated by 16.6 cm from the imaging optical system 120.

The light output from a laser light source 653 is irradiated onto a phase & amplitude modulation unit 663 via a relay optical system 654. The phase & amplitude modulation unit 663 receives phase information and amplitude information as hologram information from the information input unit 750, and phase and amplitude modulators 661 and 662 respectively execute phase and amplitude modulation.

The light phase-modulated by the phase modulator 661 forms the hologram 511 of the phase modulator 661, which has the same size as that upon imaging, via an a focal optical system 655. The magnification of the a focal optical system is determined by the ratio of the pixel size of the display device 651 to that upon imaging.

A real image RL2 reconstructed by the hologram 511 is reproduced at the position, on the imaging optical system 120, of the hologram 511 and separated by about 6.6 cm from the imaging optical system 120. Assume that wavefronts that form the real image RL2 are those that form a virtual image IM2 by the imaging optical system 120. The 0th-order light shielding plate 250 set at the focal point position of the imaging optical system 120 shields 0th-order light components of the light output from the imaging optical system 120, and transmits light components of the 1st order or higher.

When the light which is not shielded by the 0th-order light shielding plate 250 is observed from the position behind the 0th-order light shielding plate 250, the reconstructed image of the object 900 to be sensed free from any distortion can be observed.

When holograms are sensed in units of three primary colors of light, the color image of the object 900 to be sensed can be reconstructed by synthesizing the reconstructed images in units of colors as in the above embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 043420/1996 filed on Feb. 29, 1996, No .068729/1996 filed on March 25, and No. 068737/1996 filed on March 25 are hereby incorporated by reference.

What is claimed is:

1. A holography imaging apparatus comprising:

a light source for irradiating an object to be sensed;

diaphragm means with an aperture which transmits object light, said object light being that portion of the light irradiated light onto said object that has been reflected by said object;

an imaging optical system having a positive refractive power and variable front focal length and being so arranged to dispose said diaphragm at front focal plane thereof;

interlocking means for changing a distance between said diaphragm means and said imaging optical system and the aperture size of said aperture in response to changes in the front focal length of said imaging optical system;

an interference optical system to interference said object light transmitted through said imaging optical system and reference light as plane waves from said light source; and image sensing means to record an interference image outputted by said interference optical system and formed on the imaging surface which is perpendicular to an optical axis of said imaging optical system and at a first distance from a back focal plane of said first imaging optical system, wherein the following relation holds:

$$a \cdot \lambda \cdot f / p$$

where $\lambda$ is the wavelength of the object light, a is the aperture diameter of said diaphragm means, f is a front focal length of said imaging optical system, and p is the spatial resolution of said image sensing means.

2. An apparatus according to claim 1, further comprising:

moving means for moving the imaging surface of said image sensing means to change the first distance.

3. An apparatus according to claim 1, wherein said interference optical system comprises:

a plane wave conversion optical system for converting the light output from said light source into the plane waves to obtain the reference light; and an optical path setting optical system for setting the propagation direction of the object light via said imaging optical system and a propagation direction of the reference light via said plane wave conversion optical system in substantially the same directions, and bringing the object light and the reference light to interference, and said image sensing means acquires a light intensity distribution on the imaging surface.

4. An apparatus according to claim 1, wherein said interference optical system comprises:

a plane wave conversion optical system for converting the light output from second light source into the plane waves to obtain the reference light;

a phase adjuster for adjusting a phase of the reference light via said plane wave conversion optical system; and an optical path setting optical system for setting the propagation direction of the object light via said imaging optical system and a propagation direction of the reference light via said plane wave conversion optical system in substantially the same directions, and bringing the object light and the reference light to interference, and said image sensing means acquires amplitude and phase distributions of light waves on the imaging surface.

5. A holography display apparatus for displaying an image of an object to be sensed comprising:

information input means for receiving a holographic image data in a predetermined format;

a light source for radiating coherent light which has a plane or curved wavefront;

a hologram forming unit for modulating light output from said light source to include said holographic image data input means as non $0^{th}$-order light and projecting a hologram on an imaging surface;

an imaging optical system having a front focal plane at a given first distance from said hologram; and $0^{th}$-order light shielding means arranged at a back focal point of said imaging optical system.

6. An apparatus according to claim 5, further comprising:

principal ray shielding means, arranged at a back focal plane of said imaging optical system, for shielding a principal ray of light output from said imaging optical system.

7. An apparatus according to claim 5, further comprising:

interlocking means for changing said back focal length of said imaging optical system, and changing a distance between said second imaging optical system.

8. An apparatus according to claim 5, further comprising:

moving means for moving said imaging optical system to change a distance between said front focal plane of said imaging optical system and said imaging surface.

9. An apparatus according to claim 5, wherein said hologram forming unit comprises:

display means for displaying a 2-dimentional image in response to said holographic image data;

a spatial light modulator for modulating light output form said light source corresponding to the optical image displayed on said display means; and a hologram forming optical system for receiving modulated light and projecting the hologram.

10. An apparatus according to claim 5, wherein said hologram forming unit comprises:

a phase and amplitude modulation unit for performing phase modulation and amplitude modulation of incident light in accordance with amplitude information and phase information supplied form said information input means, and outputting the modulated light; and a hologram forming optical system for receiving modulated light and forming the hologram.

11. A holography display method comprising:

the first step of receiving a holographic image data in predetermined format;

the second step of forming a hologram on an imaging surface on the basis of information of the received data;

the third step of passing the light output from the hologram through a imaging optical system having a front focal plane at a given first distance from the hologram;

the fourth step of converting coherent light having the same wavelength as the object light into reference light as plane waves; and the fifth step of shielding a $0^{th}$-order light component of the light passing through the imaging optical system.

* * * * *